(12) United States Patent
Lovett et al.

(10) Patent No.: US 6,753,081 B1
(45) Date of Patent: Jun. 22, 2004

(54) FIBER REINFORCEMENT MATERIAL, PRODUCTS MADE THEREFROM, AND METHOD FOR MAKING THE SAME

(75) Inventors: Jeffrey B. Lovett, Harrisville, PA (US); Daniel T. Biddle, Grove City, PA (US); H. Charles Pitts, Jr., Lake Forest, FL (US)

(73) Assignee: Forta Corporation, Grove City, PA (US)

( * ) Notice: Subject to any disclaimer, the term of this patent is extended or adjusted under 35 U.S.C. 154(b) by 0 days.

(21) Appl. No.: 09/790,353

(22) Filed: Feb. 21, 2001

(51) Int. Cl.[7] .................................................. D02G 3/00
(52) U.S. Cl. ...................... 428/373; 428/359; 428/362; 428/370; 428/374; 428/294.1; 525/240; 52/740.1; 57/204; 57/242; 264/271.1
(58) Field of Search ................................ 428/374, 359, 428/370, 373, 362; 525/240

(56) References Cited

U.S. PATENT DOCUMENTS

| | | | |
|---|---|---|---|
| 3,591,395 A | | 7/1971 | Zonsveid et al. |
| 3,864,903 A | * | 2/1975 | Maki ........................... 57/140 |
| 3,907,478 A | * | 9/1975 | Vernon et al. ............... 425/367 |
| 3,965,229 A | * | 6/1976 | Driscoll ........................ 264/50 |
| 4,261,754 A | | 4/1981 | Krenchel et al. ............. 106/90 |
| 4,346,135 A | | 8/1982 | Amheiter et al. ............ 428/212 |
| 4,483,727 A | | 11/1984 | Eickman et al. |
| 4,557,264 A | * | 12/1985 | Hinsch ..................... 128/335.5 |
| 4,634,739 A | * | 1/1987 | Vassilatos ................... 525/240 |

(List continued on next page.)

FOREIGN PATENT DOCUMENTS

| | | |
|---|---|---|
| EP | 0 006 318 | 1/1980 |
| EP | 0 026 581 | 4/1981 |
| EP | 0 047 158 | 3/1982 |
| EP | 0 081 265 | 6/1983 |
| EP | 0 087 352 | 8/1983 |
| EP | 0 152 490 | 8/1985 |
| EP | 0 212 775 | 3/1987 |
| EP | 0 225 036 | 6/1987 |
| EP | 0 225 404 | 6/1987 |
| EP | 0 227 452 | 7/1987 |
| EP | 0 235 577 | 9/1987 |
| EP | 0 286 112 | 10/1988 |
| GB | 1 537 663 | 1/1979 |
| JP | 60-81052 | 5/1985 |
| WO | WO 89/02879 | 4/1989 |
| WO | WO 99/46214 | 9/1999 |

OTHER PUBLICATIONS

Letter from ZTM Sales & Service, Inc. dated Feb. 6, 1992.
Order Confirmation from SIMA Group w/cover letter dated Mar. 20, 1998.

(List continued on next page.)

Primary Examiner—Cynthia H. Kelly
Assistant Examiner—C Thompson
(74) Attorney, Agent, or Firm—Kirkpatrick & Lockhart LLP

(57) ABSTRACT

The present invention provides a synthetic fiber blend and methods for its use comprising a first fiber component formed of a homopolymer polypropylene fiber and a second fiber component being a copolymer formed of a polypropylene and a high density polyethylene. The first fiber component is fibrillated and the second fiber component is a twisted bundle comprised of multiple strands of a non-fibrillating monofilament. The synthetic fiber blend imparts improved reinforcement properties to the building materials to which they are added. In particular, the synthetic fiber blend when incorporated into a building material provides reduced permeability, increased fatigue strength, improved toughness, and reduced plastic shrinkage. The unique combination of the twisted second fiber component blended with the first fiber component provides improved mixability and uniform distribution of the synthetic fiber blend in cementitious materials.

22 Claims, 26 Drawing Sheets

Comparison Between the Crack Areas for Different Fiber Contents

U.S. PATENT DOCUMENTS

| | | | | |
|---|---|---|---|---|
| 4,917,920 A | * | 4/1990 | Ono et al. | 427/389.9 |
| 4,968,561 A | * | 11/1990 | Mizobe et al. | 428/397 |
| 5,372,885 A | * | 12/1994 | Tabor et al. | 428/373 |
| 5,399,195 A | * | 3/1995 | Hansen et al. | 106/711 |
| 5,456,982 A | * | 10/1995 | Hansen et al. | 428/370 |
| 5,487,943 A | * | 1/1996 | Kozulla | 428/373 |
| 5,582,667 A | * | 12/1996 | Gupta et al. | 156/148 |
| 5,993,537 A | | 11/1999 | Trottier et al. | 106/724 |
| 6,340,522 B1 | | 1/2002 | Burke et al. | |
| 6,423,134 B1 | | 7/2002 | Trottier et al. | |

OTHER PUBLICATIONS

USSR State Construction Committee, Research Institute for Concrete and Reinforced Concrete (NIIZHB), Korolev, pp. 34–40, Publishers of Literature on Constructions, Moscow 1969.

Forta–Fibre is corrosionproof and may substitute secondary steel reinforcement (date unknown).

Fibermesh, Inc. advertisement (date unknown).

Fibermesh Synthetic Fibers Engineered for Concrete and Mortars (date unknown).

Magne Maage, Fracture Energy and Compressive Strength of Concrete Containing Fibermesh (date unknown).

"The Mixing of Concrete", Properties of Concrete $3^{rd}$ Edition, A.M. Neville et al., Longman Scientific & Technical, pp. 226–233.

Magne Maage, Fracture Energy and Compressive Strength of Concrete Containing Fibermesh (revision of preceding article) (date unknown).

"The Effects of Polypropylene Fibres on the Plastic Shrinkage Cracking of Concrete", Rixom et al., Cormix Construction Chemicals, pp. 1–10, (date unknown).

"Comparing the Effect of either Low Volumes of Polypropylene Fibres or Steel Fabric", Davies et al., Cemfiber, 8 pages with synopsis and cover page. No date.

"Prevention is Better than Cure", pp. 10–12, Fibromax Ltd. No date.

Excerpt from Strong, Tough, and Hard Materials, p. 388. No date.

The Layout of the 4 Point Bending Test with Appendix 1 and 2 (date unknown).

"Preparation of Mortars and Concrete Mixtures", USSR Academy of Construction and Architecture Research Institute for the Organization, Mechanization and Technical Assistance to the Construction Industry (NIIOMTP), State Publishers of Literature on Construction, Architecture and Building Materials, Moscow 1960, pp. 163–168.

Page 159 from Trade mark of National Standard Co. Ltd. No date.

* cited by examiner

Comparison Between the Crack Areas for Different Fiber Contents

Comparison of Length to Width Ratios of Cracks for Different Fiber Contents

Comparison of Time of First Crack for Different Fiber Contents
Note: Slabs with 2% Fiber Content Did not Crack Comparison of Crack Areas between Control Slabs and Slabs With Fiber for Different Laboratory Batches Comparison of Crack Areas as a Percentage of Control for Different Fiber Contents Comparison of Crack Area Reduction for Different Fiber Contents First Crack Strength vs. Fiber Content FIG. 11 Japanese Toughness vs. Fiber Content

FIBER REINFORCEMENT MATERIAL, PRODUCTS MADE THEREFROM, AND METHOD FOR MAKING THE SAME

BACKGROUND OF THE INVENTION

1. Field of the Invention

The present invention relates to a synthetic fiber and, more particularly, to a blend of synthetic fibers for providing both structural and crack-controlling reinforcement to building materials.

2. Description of the Background of the Invention

It is well known that the addition of a reinforcement component to building materials such as cementitious materials, brick, asphalt, and the like improves the structural integrity of the material and reduces the likelihood of cracking. When incorporated into cementitious materials such as concrete, for example, the reinforcement component is added to reduce the effect of two main structural deficiencies: 1) low tensile strength; and 2) low strain at fracture. The tensile strength of concrete is relatively low because concrete, when formed, normally contains numerous micro-cracks. It is the rapid propagation of these micro-cracks under applied stress that is responsible for the low tensile strength of the material. Because of the widespread use and applicability of concrete, considerable research has been undertaken to lessen the effects of its deficient structural properties.

Typical reinforcement materials that are added to cementitious materials include, for example, various gauges of wire mesh or reinforcement fibers. A variety of reinforcement fiber additives are known in the art that provide strength characteristics to building materials. Typical reinforcement fibers include asbestos fibers, glass fibers, steel fibers, mineral fibers, and cellulose fibers. Some reinforcement fibers are better suited for particular applications than others. For example, asbestos fibers are known to provide effective reinforcement but, due to environmental and health concerns, are not extensively used. In addition, glass fibers and steel fibers are relatively expensive, and have a tendency to decompose in cementitious materials. Steel fibers typically decompose at the surface of the fiber reinforced material, whereas glass fibers continuously undergo decomposition as a result of the alkaline nature of cement. Also, due to the physical and chemical characteristics of steel fibers, there is some difficulty in uniformly distributing the steel fiber throughout the mixture. Furthermore, there are certain physical and operational deficiencies inherent with steel fiber that reduce its effectiveness. Such deficiencies include, for example, rebound in air-placed concrete applications, and relatively high equipment costs due to equipment wear from contact with the steel fibers.

It is known that concrete has a tendency to shrink after it has been cast due to the evaporation of excess mixing water. Plastic shrinkage causes the formation of shrinkage cracks shortly after the casting of the concrete, that weakens the matrix thereof. Unlike other fibrous materials, synthetic fibers are known to reduce such cracking caused by early plastic shrinkage. For example, a fibrillated fiber formed from a polyolefin film has been successfully used to prevent or reduce cracking. The fibers are stretched multiple times and then cut along lines at least partially transverse to the direction of orientation. The fibers are thereby fibrillated. When mixed within cementitious materials, in such a manner that they provide deformations to improve anchoring and bonding within the concrete matrix, the cut fibers are dispersed through the mixture, open to form webs nets, and thereby improve the strength and binding characteristics of the cementitious matrix.

Some advances have been made in the area of fiber reinforcement to provide increased toughness and durability, and reduce cracking in the matrix of building materials, such as concrete. However, the prior art reinforced fibers have a number of disadvantages that weaken or, otherwise, limit their effectiveness. Accordingly, there is a need for an improved reinforcement fiber that imparts improved structural properties to the building materials to which they are added. In particular, the need exists for a synthetic reinforcement fiber that when added to, for example, cementitious materials, provides a building material that exhibits reduced permeability, increased fatigue strength, improved toughness, and reduced plastic shrinkage.

SUMMARY OF THE INVENTION

The present invention provides a synthetic fiber blend that includes a first fiber component formed of a homopolymer polypropylene fiber, and a second fiber component. The second fiber component is a copolymer, formed of a polypropylene and a high density polyethylene. The polypropylene portion of the second fiber component is preferably present in a major amount, most preferably about 70 to 80 percent by weight, and the high density polyethylene portion is preferably present in a minor amount relative to the polypropylene, most preferably about 20 to 30 percent by weight.

In the preferred embodiment of the synthetic fiber blend, the first fiber component is fibrillated and the second fiber component is present in the form of a twisted bundle of nonfibrillating monofilaments. The twisted bundle is comprised of multiple strands of the nonfibrillating monofilament. Each of the first and second fiber components preferably has a fiber length of about 19 to about 60 mm, and most preferably, has substantially the same fiber length. The first fiber component is preferably about 100 to about 20,000 denier per filament and is preferably present in the synthetic fiber blend in amounts ranging from about 5 to about 50 by total weight percent, and more preferably about 6.7 percent by total weight percent. The second fiber component is preferably about 350 to about 6000 denier per filament, and is preferably present in amounts ranging from about 50 to about 95, and more preferably about 93.3, percent by total weight percent.

The present invention also provides a reinforced cementitious material, such as concrete, comprising the synthetic fiber blend distributed through a matrix of the cementitious material. The synthetic fiber blend may be present in the cementitious material in amounts ranging from about 0.1 to about 2.0 percent by volume, and preferably in amounts ranging from about 0.3 to about 2.0 percent by volume, and most preferably from 0.5 to about 2.0 percent by volume.

The invention also provides a method of forming the synthetic fiber blend. The method includes blending a first fiber component with a second fiber component, wherein the first fiber component is formed of a homopolymer polypropylene fiber and the second fiber component is a nonlibrillating copolymer of a polypropylene and a high density polyethylene. The second fiber component is most preferably twisted to form a non-interconnected bundle of multiple strands of a nonfibrillating monofilament.

A method of reinforcing a material is also provided. The reinforcing method comprises mixing the synthetic fiber blend of the present invention with a cementitious material.

A sufficient amount of synthetic fiber may be added to the cementitious material to increase the material's impact strength. The synthetic fiber is preferably added to the cementitious material in amounts ranging from about 0.1 to about 2.0 percent by total volume, preferably about 0.3 to about 2.0 percent by volume, and more preferably in amounts ranging from about 0.5 to about 2.0 percent by total volume. An addition of synthetic fiber to the material in amounts ranging from about 0.5 to about 2.0 percent by total volume provides an impact strength improvement of at least 6 times that of plain concrete. It is believed that the twisting of the second fiber component into a unique twisted bundle aids in uniform fiber mixing because the twisted bundles separate into untwisted nonfibrillating monofilaments during the mixing process, which in turn is believed to aid in the uniform distribution of the synthetic fiber blend in the cementitious material. The unique twisted bundles permit the fiber blend to be added to the cementitious material at various volume percentages without the clumping and mixing problems experienced with standard monofilament products.

BRIEF DESCRIPTION OF THE DRAWINGS

The characteristics and advantages of the present invention may be better understood by reference to the accompanying drawings, wherein like reference numerals designate like elements and in which.

DETAILED DESCRIPTION OF THE PREFERRED EMBODIMENTS

Figure 1:
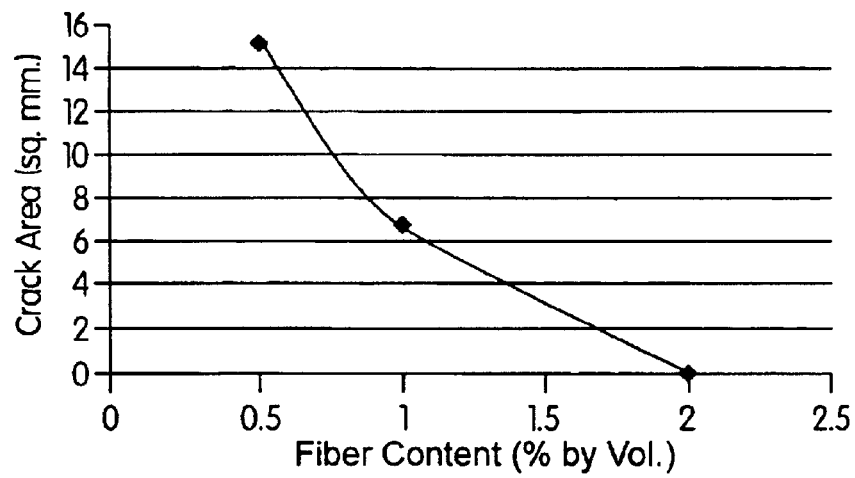
FIG. 1 illustrates a comparison between the crack areas in slabs containing different amounts of the synthetic fiber blend of the present invention based on percent by volume.
Figure 2:
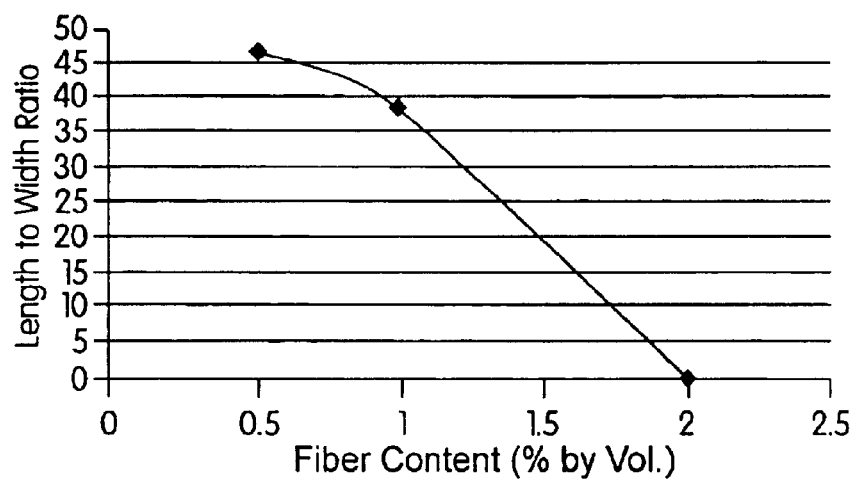
FIG. 2 illustrates a comparison between the length to width ratios of cracks in slabs containing different amounts of the synthetic fiber blend of the present invention based on percent by volume.
Figure 3:
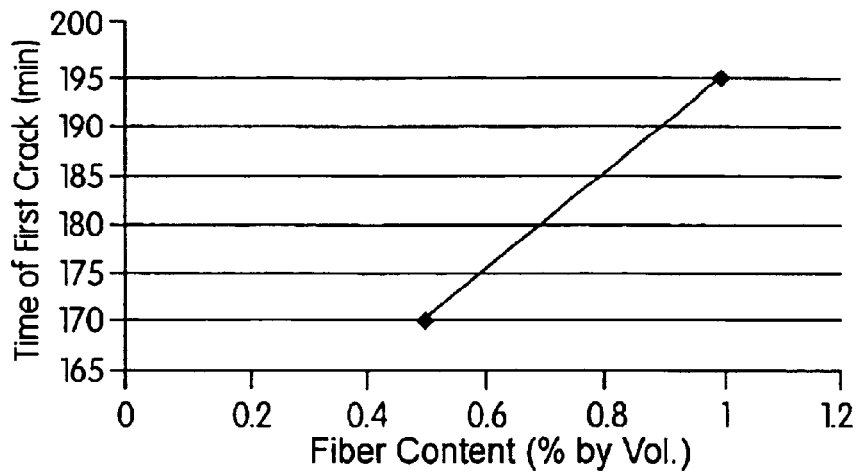
FIG. 3 illustrates a comparison between the time of the appearance of the first crack in slabs containing different amounts of the synthetic fiber blend of the present invention based on percent by volume.

It is to be understood that the figures and descriptions of the present invention have been simplified to illustrate elements that are relevant for a clear understanding of the present invention. Those of ordinary skill in the art will recognize that associated elements and other items may be employed in the implementation of the present invention. However, because many such associated elements and items are well known in the art, they will not be discussed herein.

In the present detailed description of the invention, the invention will be illustrated in the form of a synthetic fiber reinforcement material for incorporation into a cementitious material. It will be understood, however, that the invention is not limited to embodiment in such form and may be used with any building materials and compositions relating thereto that use fibrous materials to improve structural strength or integrity. Such materials and compositions include, but are not limited to, cement, concrete, shotcrete, mortar, grout, asphalt, and the like. Thus, while the present invention is capable of embodiment in many different forms, for ease of description this detailed description and the accompanying drawings disclose only specific forms as examples of the invention. Those having ordinary skill in the relevant art will be able to adapt the invention to application in other forms not specifically presented herein based upon the present description.

Relative to wire mesh, the synthetic fiber reinforcement materials of the present invention provide a more effective and cost efficient means of reinforcement. This is so because even relatively small amounts of fiber, when added to the cementitious mixture, are distributed throughout the mixture to significantly reinforce the entire matrix material, reduce permeability, increase fatigue strength, and improve toughness. In addition, application of wire mesh reinforcement is relatively time and labor intensive due to the placement demands associated therewith.

By way of example, the synthetic fibers of the present invention may be incorporated into various cementitious building materials and products used for building or construction such as, for example, structural pavements, airport runways and tarmacs, bridge deck overlays and barriers, structural floor slabs, pre-cast concrete products such as pipes and tanks, tilt-up wall panels, shotcrete for rockfill stabilization, tunnel linings and dome structures. The synthetic fiber blend of the present invention may also be used for repair, rehabilitation, retrofit and renovation of existing products or structures such as, for example, in overlays, whitetoppings, and repairs of airport pavements and bridge decks. It will be understood, however, that only a limited number of applications are present herein, and that the present invention may be used in connection with the construction of all materials that employ reinforcing fiber material.

In addition to structural reinforcement, the incorporation of the synthetic fiber blend of the present invention in, for example, cast cementitious material modifies the cracking mechanism and reduces the propagation of micro-cracking caused by concrete shrinkage. Accordingly, relative to non-reinforced cement, the resultant cracks of fiber reinforced concrete of the present invention are smaller in width, the permeability of the material is reduced, and the ultimate cracking strain is enhanced. Furthermore, the blended fibers of the present invention are capable of carrying a load across the crack. In addition, as will be discussed below, tests of the fiber reinforced concrete of the present invention indicate that the concrete material has improved toughness or residual load carrying ability after the first crack, and may have substantially improved impact resistance.

The present invention is directed to a hybrid blend of high performance synthetic fibers and, more particularly, to a blend of synthetic fibers to reduce the effects of plastic shrinkage and improve hardened concrete properties. As will be discussed in greater detail below, it has been discovered that the combination of a first component fiber and a second component fiber to form the hybrid fiber blend of the present invention achieves surprising reinforcement properties and a variety of performance benefits greater than that of which each fiber component is individually capable. In particular, the fiber of the present invention improves control of plastic and settlement shrinkage cracking while improving impact strength, concrete toughness and other structural and long-term durability properties.

The first fiber component is a homopolymer polypropylene fibrous reinforcement material. The first fiber component is a collated, fibrillated (network) fiber that may be approximately 100 to about 20,000 denier per filament. For example, in one embodiment of the present invention the first fiber component is approximately 10,000 denier per filament and includes the following physical properties:

| PHYSICAL PROPERTIES OF THE FIRST FIBER COMPONENT | | | |
|---|---|---|---|
| Material | Virgin Homopolymer Polypropylene | Color | Gray |
| Form | Collated Fibrillated Fiber | Acid/Alkali Resistance | Excellent |
| Specific Gravity | 0.91 | Absorption | Nil |
| Tensile Strength | 28–40 ksi. (200–272 Mpa) | Compliance | A.S.T.M. C-1116 |
| Lengths | 2¼" (54 mm) | | |

The first fiber component may, but need not, be formed of 100 percent virgin polypropylene, and may be a color blended and fully oriented fiber that is substantially non-corrosive, non-magnetic, and alkaline resistant. When used alone as a fiber reinforcement additive (i.e. not as a hybrid blend in combination with the second fiber component, discussed below, as disclosed herein), the first component is typically added at a dosage rate of 1.5 pounds per cubic yard (0.9 kilograms per cubic meter) of cementitious material directly to the mixing system during, or after, the batching of the other ingredients and mixed at a time and speed recommended by the mixer manufacturer (typically four to five minutes). The first fiber component exhibits good mixing and uniform distribution properties. The resultant fiber reinforced material provides relatively good long term durability and secondary/temperature control for temperature/shrinkage cracking.

When used in the present invention, the first fiber component may be added to the hybrid mixture in amounts of about 5 to about 50 by total weight percent. For example, in one embodiment of the present invention, the first fiber component may be added in amounts of about 6.7 total weight percent. In addition, the first fiber component may, but need not, be the same length as the second fiber component. When used in the present invention the first fiber component may be added to the hybrid mixture in lengths of about 19 to about 60 mm. For example, in one embodiment of the present invention, the first fiber component may be added in lengths of about 54 mm.

The second fiber component is a high strength fibrous reinforcement copolymer, such as, but not limited to, one formed of embossed monofilaments. The second fiber component is preferably a copolymer formed of major amounts, preferably about 75–80 percent by weight, polypropylene, preferably a low melt polypropylene (2-melt homopolymer), and minor amounts, preferably about 20–25 percent by weight, high-density polyethylene. The second fibers do not fibrillate; i.e., they do not pull apart to form a net like structure in the cementitious material.

The second fiber component is a high tenacity, polyolefinic thread having high resistance, and excellent flexibility. As incorporated in the hybrid blend of the present invention, the second fiber component includes monofilaments of approximately 350 to about 6000 denier per filament. The preferred embodiment of the second fiber component is preferably twisted to form a non-interconnected bundle of multiple strands of a nonfibrillating monofilament. In one embodiment of the present invention, the second fiber component exhibits the following properties:

| PHYSICAL PROPERTIES OF THE SECOND FIBER COMPONENT | | | |
|---|---|---|---|
| Material | Virgin Copolymer | Color | Gray |
| Form | Collated Hybrid-Twisted Monofilaments | Acid/Alkali Resistance | Excellent |
| Specific Gravity | 0.91 | Absorption | Nil |
| Tensile Strength | 70–106 ksi. (485–730 Mpa) | Compliance | A.S.T.M. C-1116 |
| Length | 2¼" (54 mm) | | |

For example, in one embodiment of the present invention the second component is approximately 750 denier per filament. When used alone (not as a hybrid blend in combination with the first component, discussed above, and disclosed herein), the second component is typically added at a dosage rate of about 4 to about 30 pounds per cubic yard (1.8 to 13.6 kilograms per cubic meter) of cementitious material directly to the mixing system during, or after, the batching of the other ingredients and distributed therethrough. The resultant fiber reinforced material exhibits long term durability. It should be noted, however, that the second fiber component, by itself, when not twisted, exhibits less than optimum distribution properties in the building material during mixing operation. However, when the monofilaments of the second fiber component are twisted, as used in the preferred embodiment of the synthetic fiber blend of the present invention, to form the non-interconnected bundle, the synthetic fiber blend is easier to mix and is uniformly distributed throughout the cementitious material.

When used in the synthetic fiber blend of the present invention, the second fiber component may be added to the hybrid mixture in amounts of about 50 to about 95 by total weight percent. For example, in one embodiment of the present invention, the second fiber component may be added in amounts of about 93.3 total weight percent. In addition, the second fiber component may, but need not, be the same length as the first fiber component. When used in the present invention the second fiber component may be added to the hybrid mixture in lengths of about 19 to 60 mm. For example, in one embodiment of the present invention, the second fiber component may be added in lengths of about 54 mm.

The first fiber component and the second fiber component may be blended in the amounts discussed above to form the hybrid fiber blend of the present invention. The first fiber component and the second fiber component may be blended by any means known in the art, such as, for example, by combining the two fiber components in the cutting process.

The hybrid fibers may be cut into useable strips either before of after blending the first fiber component and the second fiber component. When the hybrid fibers of the present invention are cut into useable strips after blending the first fiber component and the second fiber component, the hybrid fiber strips may be cut into any length that is dispersible and pumpable, but may be cut into a length of about 19 to 60 mm, such as, for example, a length of about 54 mm. It is contemplated that the fiber length may be adjusted according to specification. In one form of the present invention the resultant hybrid fiber has the following physical properties:

| PHYSICAL PROPERTIES OF THE FIBER BLEND | | | |
|---|---|---|---|
| Material | Virgin Polypropylene Virgin Copolymer | Color | Gray |
| Form | Collated Hybrid- Fibrillated/ Twisted Monofilament Bundle Fiber System | Acid/Alkali Resistance | Excellent |
| Specific Gravity | 0.91 | Absorption | Nil |
| Tensile Strength | 90–110 ksi. (620–758 Mpa) | Compliance | A.S.T.M. C-1116 |
| Length | ¾" (19 mm), 1½" (38 mm), 2¼" (54 mm), 2½" (60 mm) | | |

When incorporated into a building material such as concrete, the hybrid fiber blend of the present invention may be added to the mixture in amounts ranging from about 0.1 percent to about 2.0 percent by volume of concrete, and typically in amounts ranging from about 0.5 to about 2.0 percent by volume of concrete, to impart improved reinforcement characteristics thereto. The hybrid fiber blend may be added directly to the mixing system during, or after, the batching of the other ingredients and mixed at the time and speed recommended by the mixer manufacturer (typically four to five minutes).

The hybrid fiber blend of the present invention may be used to reduce plastic and hardened concrete shrinkage and settlement shrinkage prior to initial set that leads to cracking. Furthermore, the hybrid fiber blend improves impact strength, and increases fatigue resistance and concrete toughness as an alternate secondary/temperature/structural reinforcement. Moreover, in addition to the twisting of the second fiber component, it has been found that the combination of the first fiber component with the second fiber component substantially increases the ability of the second fiber component to be more evenly distributed throughout the mixture. It is believed that the improved distribution properties of the second fiber component, in part, account for the increase in improved reinforcement properties exhibited by the synthetic fiber blend of the present invention. In addition, the fiber of the present invention is non-corrosive, non-magnetic, and substantially resistant to the effects of the alkaline nature of conventional building materials, such as, for example, Portland cement concrete.

As illustrated in the examples below, the present invention provides advantages in cost, operation, and structural reinforcement over known reinforcement components. The fiber component combination of the present invention, as compared to wire mesh or conventional steel fibers are not corrosive, are easily mixed with the building material, reduce plastic shrinkage cracking, and provide cost efficiencies and structural advantages to the resultant formed material. The synthetic fibers replace steel fibers for reinforcement of cementitious materials and eliminate the damage to equipment caused by steel fibers. When compared to other synthetic fibers, the fibers of the present invention provide more effective mixing operation and increased structural advantages to the building material in which they are added.

In order that those skilled in the art may better understand how the invention may be practiced, the following examples are given by way of illustration and not by way of limitation on the invention as defined by the claims. As will be apparent upon inspection of the test results below, the synthetic hybrid fiber blend of the present invention substantially and impressively improves the reinforcement characteristics of the building material to which it is added, as compared to the conventional fiber reinforcement materials. A series of tests were performed to evaluate various amounts of a synthetic fiber blend of the present invention. The results are provided hereinbelow.

EXAMPLES

Example 1

The hybrid synthetic fibers of the present invention were tested to determine plastic shrinkage reduction of concrete using cement-rich mixes, known to exhibit a high potential for shrinkage cracking. The dosages of fiber used were 0.5, 1.0 and 2.0 percent by volume of concrete. Three different batches of concrete were made and a total of 15 slabs were tested. The tests were conducted using a 2.0 inch thick slab that was 3 ft long and 2 ft wide. The crack development was enhanced by using fans that can produce a wind velocity of 14 mph. The performance of these fibers was compared using the crack areas of control slab with no fibers and fiber reinforced slabs.

As illustrated below, the results of the tests indicate that the fibers of the present invention, at the dosages used, significantly reduced the plastic shrinkage in concrete. The crack area reduction varied from 100 to 92 percent of the plain concrete. No cracking was observed when a fiber dosage of 2.0 percent by volume of concrete was used. There was 98 percent and 92 percent reduction of plastic shrinkage cracking when the fiber dosages were respectively 1.0 percent and 0.5 percent by volume of concrete.

Test Method

Tests were conducted using 2 inch thick slabs that were 3 ft. long and 2 ft. wide. The slabs were restrained around the perimeter using wire meshes. After casting, the slabs were placed on a flat surface and subjected to a wind velocity of 14 mph, using high-velocity fans.

The development of cracks were observed within two to three and one half hours after casting. Although, typically, cracking is complete within about six to eight hours, the crack widths and lengths were measured after 24 hrs. The longer duration was chosen to ensure all cracks developed and stabilized. The crack width was measured at a number of locations along the length of the crack. The length of the crack was measured for each crack and multiplied by the average width. Thus the total crack area for a given slab is calculated.

The control slab (no fibers) crack value was set at 100 percent. The crack area of the other panels was expressed as a percentage of the control and the percent reduction of crack area due to the addition of fibers is obtained.

Materials

The materials consisted of ASTM Type I cement, concrete sand and coarse aggregate. The coarse aggregate had a maximum size of 0.75 in. Both fine and coarse aggregates satisfied ASTM aggregate requirements.

The chemical and physical properties of the hybrid synthetic fibers used were those as described herein.

Mix Proportions

Because the objective of this test was to study the influence of fiber addition on the plastic shrinkage, it was necessary to make the concrete with a very high potential for shrinkage cracking. The testing conditions, such as the ambient temperature, the humidity, and the wind velocity (14 mph) were kept constant for each batch. Three different batches of concrete were made with the same water contents, cement contents and maximum size of coarse aggregates. A higher cement content was used, to increase the cracking potential. The basic mixture proportion used was as follows:

| | |
|---|---|
| Cement (lbs) | 855 |
| Water (lbs) | 427 |
| Water/Cement Ratio | 0.5 |
| Concrete Sand (lbs) | 1062 |
| Coarse Aggregates (lbs) | 1062 |
| Maximum Size of Aggregates (inches) | 0.75 |

Mixing Procedure and Casting the Specimens

All mixing was done in a nine cubic feet capacity mixer. The fibers were weighed and stored in a separate container. First the buffer mix was prepared. Thereafter, coarse aggregates were introduced into the mixer. Sand and two thirds of the water were then added and mixed for one minute. Cement was then added along with the remaining one third of the water. Thereafter, the fibers of the present invention were added and the ingredients were mixed for three minutes. Following mixing, the mixture was subject to a three minute rest period, followed by a final mixing stage for 2 minutes for proper fiber distribution.

Because the fiber reinforced cementitious mixes were of a flowing consistency, both mixing and placing were carried out without any problems. No segregation or balling of the fibers was observed in any of the mixes. In order to maintain consistency in placing, consolidating, and finishing the slabs, an experienced concrete contractor and finisher performed the placing, consolidating and finishing for all the slabs.

Three batches were made on three separate days. After each batch of reinforced cementitious material was prepared, the mixing drum was thoroughly cleaned. A buffer mix was prepared before preparing a subsequent mix. All of the mixes were prepared under identical conditions.

Test Results and Discussion

Three cylinders were prepared for each of the six mixes with and without fibers according to the ASTM procedures. The cylinders were tested after 14 days of curing. The results are provided in Table 1, below. As illustrated in Table 1, the cylinder strengths in all the mixes were consistently close. The 14-day compressive strength results of all 18 specimens were approximately the same.

The measured crack lengths, widths, and areas for the control and fiber reinforced slabs are given in Tables A1 to A3, B1 and B2, and C1 to C2 respectively for batches A, B, and C. Each table compares the mixes prepared on a particular day. The influences of various fiber dosages on the plastic shrinkage cracking are shown in illustrated in FIGS. 1 to 6. The summary of the test results and the percentage reduction in plastic shrinkage cracking are given in Table 2. The comparison of various parameters for different fiber contents is shown in Table 3.

Three specimens were tested for each of the three fiber contents and the average crack areas were calculated. The results of these calculation are provided in Table 2. Table 2 includes the average crack area of two control slabs without fibers, as well as the crack areas of FRC, and are expressed as the percent of the crack area of the control slabs and the percentage reduction of the plastic shrinkage cracking due to the addition of three fiber dosages.

Figure 4:
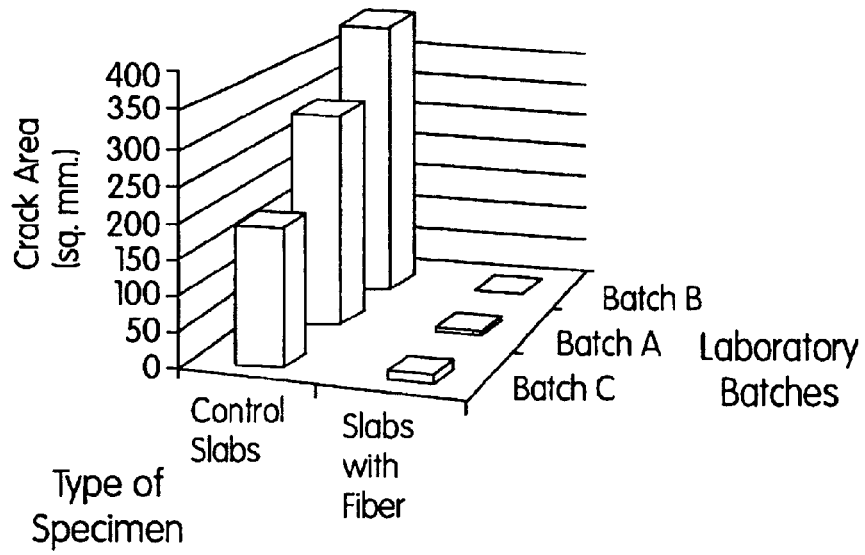
FIG. 4 illustrates a comparison between crack areas between control slabs and slabs containing different amounts of the synthetic fiber blend of the present invention based on percent by volume.
Figure 5:
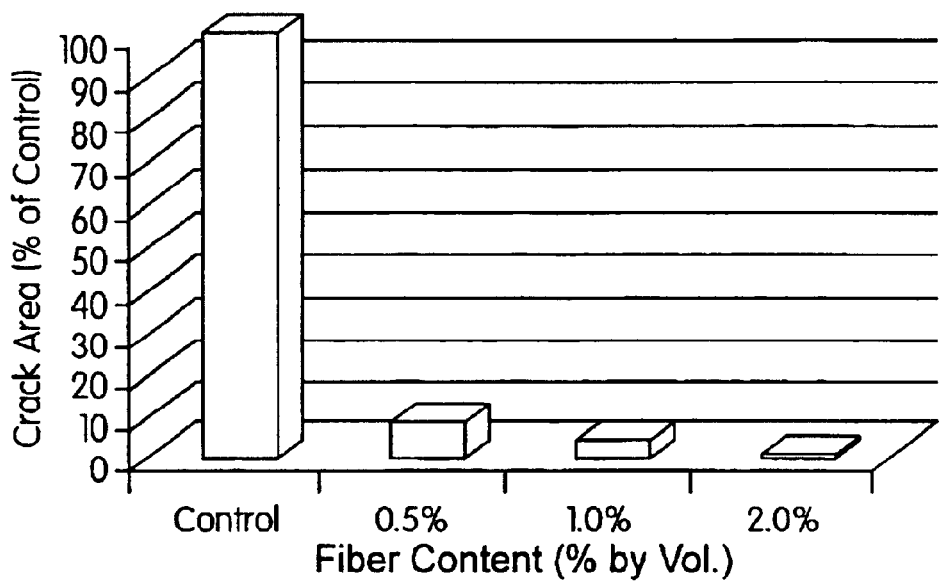
FIG. 5 illustrates a comparison between crack area as a percentage of control in slabs containing different amounts of the synthetic fiber blend of the present invention based on percent by volume.
Figure 6:
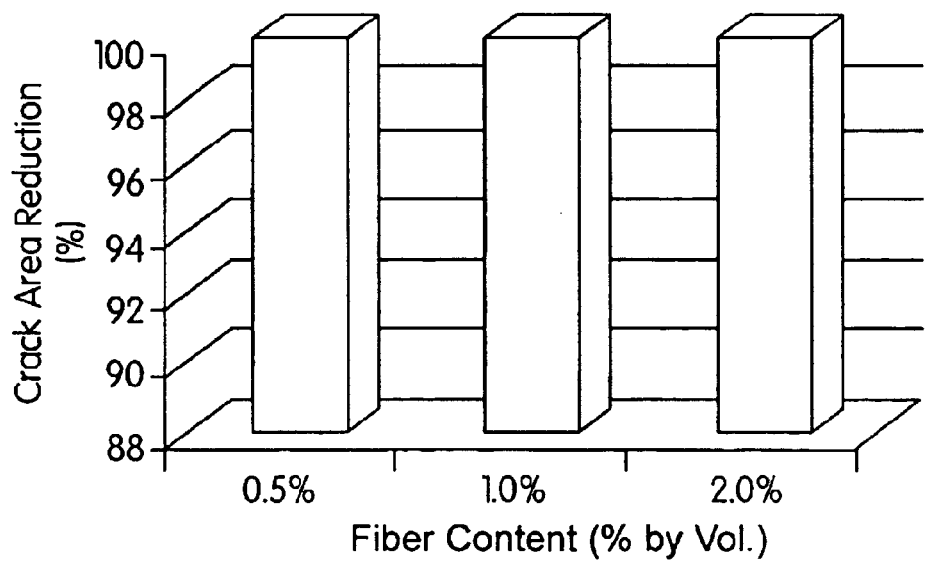
FIG. 6 illustrates a comparison of rack area reduction in slabs containing different amounts of the synthetic fiber blend of the present invention based on percent by volume.

FIGS. 1–4 graphically illustrate the crack areas of different fiber contents (FIG. 1), crack length of different fiber content (FIG. 2), the time observed for crack formation based on fiber content (FIG. 3), and crack areas between control slabs and reinforced fiber slabs (FIG. 4). An overall comparison of the plastic shrinkage crack reduction potential of the three fiber contents is shown in FIGS. 5 and 6.

No cracks were observed in any of the three slabs reinforced with 2.0 percent by volume of the synthetic fiber blend of the present invention. The results indicate that all three fiber contents were effective in reducing the plastic shrinkage cracking in concrete. However the amount of crack reduction is different for different fiber dosages. The crack reduction potential varies from about 92 to 100% for these fiber contents.

Conclusions

The test results on the control slabs and the fiber reinforced slabs confirm that the fibers of the present invention are very efficient in reducing the plastic shrinkage cracking in concrete. The tests revealed that even at very low addition levels, the synthetic hybrid fiber of the present invention provided extremely high crack reduction. At fiber dosages of 0.5 percent by volume, a crack reduction of 92% was achieved. At fiber dosages of 1.0 percent by volume, a crack reduction of 98% was achieved. Furthermore, there was no observed plastic shrinkage cracking when 2.0% by volume of fibers were used.

TABLE 1

14-Day Compression Strength for Shrinkage Test Specimens

| Batch No. | Fiber Content (% by Vol.) | Specimen No. | Comp. Strength (psi) | Average (psi) |
|---|---|---|---|---|
| A | 0 (control) | FEP1-1 | 4725.97 | 4740.38 |
|   |   | FEP1-2 | 4793.98 |   |
|   |   | FEP1-3 | 4701.19 |   |
|   | 1 | FEF1-1 | 4722.22 | 4753.76 |
|   |   | FEF1-2 | 4754.36 |   |
|   |   | FEF1-3 | 4784.69 |   |
| B | 0 (control) | FEP2-1 | 4754.36 | 4805.09 |
|   |   | FEP2-2 | 4833.59 |   |
|   |   | FEP2-3 | 4827.31 |   |
|   | 2 | FEF2-1 | 4924.54 | 4944.47 |
|   |   | FEF2-2 | 4964.26 |   |
|   |   | FEF2-3 | 4944.62 |   |
| C | 0 (control) | FEP3-1 | 4793.97 | 4640.42 |
|   |   | FEP3-2 | 4361.62 |   |
|   |   | FEP3-3 | 4765.68 |   |
|   | 0.5 | FEF3-1 | 4733.49 | 4729.74 |
|   |   | FEF3-2 | 4769.47 |   |
|   |   | FEF3-3 | 4686.25 |   |

TABLE 2

Plastic Shrinkage Reduction due to addition of Hybrid Fiber Blend

| Type | Crack Area ($mm^2$) | Crack Area (% of Control) | Crack Area (Reduction %) |
|---|---|---|---|
| BATCH A |   |   |   |
| Control Slab 1 | 413.93 |   |   |
| Control Slab 2 | 195.76 | 100 |   |
| Average | 304.85 |   |   |
| Hybrid Fiber |   |   |   |
| 1% by Volume |   |   |   |
| Slab 1 | 5.68 |   |   |
| Slab 2 | 1.45 | 2 | 98 |
| Slab 3 | 13.06 |   |   |
| Average | 6.73 |   |   |
| BATCH B |   |   |   |
| Control Slab 1 | 373.81 |   |   |
| Control Slab 2 | 424.97 | 100 |   |
| Average | 399.39 |   |   |
| Hybrid Fiber |   |   |   |
| 2% by Volume |   |   |   |
| Slab 1 | No Crack |   |   |
| Slab 2 | No Crack | 0 | 100 |
| Slab 3 | No Crack |   |   |
| BATCH C |   |   |   |
| Control Slab 1 | 210.47 |   |   |
| Control Slab 2 | 175.07 | 100 |   |
| Average | 192.77 |   |   |
| Hybrid Fiber |   |   |   |
| 0.5% by Volume |   |   |   |
| Slab 1 | 26.42 |   |   |
| Slab 2 | 13.59 | 8 | 92 |
| Slab 3 | 5.26 |   |   |
| Average | 15.09 |   |   |

TABLE 3

Comparison of Various Parameters for Different Fiber Contents

| Slabs with Fiber | Lab Batch | Fiber Content (% by Vol.) | Crack Area (mm$^2$) | Crack Length (mm) | Crack Width (mm) | L/W | Time of First Crack (min) | Casting Conditions Humidity (%) | Casting Conditions Temperature (Deg F.) |
|---|---|---|---|---|---|---|---|---|---|
| | Batch C | 0.5 | 15.09 | 47.10 | 1.02 | 46.176 | 170 | 38 | 75 |
| | Batch A | 1.0 | 6.73 | 52.73 | 1.37 | 38.489 | 195 | 15 | 104 |
| | Batch B | 2.0 | | | | | | 39 | 82 |

| Control Slabs | Lab Batch | Crack Area (mm$^2$) | Crack Length (mm) | Crack Width (mm) | L/W | Time of First Crack (min) | Casting Conditions Humidity (%) | Casting Conditions Temperature (Deg F.) |
|---|---|---|---|---|---|---|---|---|
| | Batch C | 192.77 | 238.8 | 5.35 | 44.67 | 120 | 38 | 75 |
| | Batch A | 304.85 | 431.3 | 9.99 | 43.19 | 125 | 20 | 99 |
| | Batch B | 399.39 | 317.8 | 9.13 | 34.82 | 120 | 35 | 87 |

Notes:
1. The values under Crack area, Crack length and Crack width for the slabs with fiber are the average of values from three slabs.
2. The values under Crack area, Crack length and Crack width for the control slabs are the average of values from two slabs.
3. All the three slabs in Batch B did not crack.

TABLE A1

Details of Crack Lengths, Widths & Areas; Batch A; Control Slab 1.

| Crack No. | Length (mm) | Width (mm) | Avg. Width (mm) | Area (mm$^2$) |
|---|---|---|---|---|
| 1 | 11.20 | 0.50 | 0.59 | 6.61 |
| | | 0.80 | | |
| | | 0.80 | | |
| | | 0.45 | | |
| | | 0.40 | | |
| 2 | 6.70 | 0.35 | 0.28 | 1.84 |
| | | 0.35 | | |
| | | 0.25 | | |
| | | 0.15 | | |
| 3 | 6.80 | 0.50 | 0.55 | 0.55 |
| | | 0.80 | | |
| | | 0.80 | | |
| | | 0.50 | | |
| | | 0.15 | | |
| 4 | 11.90 | 0.80 | 0.51 | 6.07 |
| | | 0.80 | | |
| | | 0.50 | | |
| | | 0.30 | | |
| | | 0.15 | | |
| 5 | 10.90 | 0.45 | 0.26 | 2.83 |
| | | 0.10 | | |
| | | 0.15 | | |
| | | 0.45 | | |
| | | 0.15 | | |
| 6 | 12.70 | 0.30 | 0.36 | 4.55 |
| | | 0.45 | | |
| | | 0.50 | | |
| | | 0.45 | | |
| | | 0.15 | | |
| | | 0.30 | | |
| 7 | 115.20 | 0.80 | 1.87 | 215.7 |
| | | 0.80 | | |
| | | 2.00 | | |
| | | 2.00 | | |
| | | 1.00 | | |
| | | 3.00 | | |
| | | 3.00 | | |
| | | 3.00 | | |
| | | 2.00 | | |
| | | 2.00 | | |
| | | 1.00 | | |
| 7A | 7.60 | 0.80 | 0.92 | 6.99 |

TABLE A1-continued

Details of Crack Lengths, Widths & Areas; Batch A; Control Slab 1.

| Crack No. | Length (mm) | Width (mm) | Avg. Width (mm) | Area (mm$^2$) |
|---|---|---|---|---|
| | | 1.00 | | |
| | | 1.00 | | |
| | | 1.00 | | |
| | | 0.80 | | |
| 7B | 19.30 | 0.80 | 0.82 | 15.83 |
| | | 1.00 | | |
| | | 1.00 | | |
| | | 0.80 | | |
| | | 0.50 | | |
| 7C | 27.20 | 2.00 | 1.47 | 39.89 |
| | | 2.00 | | |
| | | 2.00 | | |
| | | 1.00 | | |
| | | 1.00 | | |
| | | 0.80 | | |
| 8 | 6.20 | 0.50 | 0.43 | 2.64 |
| | | 0.45 | | |
| | | 0.45 | | |
| | | 0.30 | | |
| 9 | 13.90 | 0.50 | 0.34 | 4.73 |
| | | 0.50 | | |
| | | 0.30 | | |
| | | 0.20 | | |
| | | 0.20 | | |
| 10 | 11.70 | 0.40 | 0.29 | 3.36 |
| | | 0.40 | | |
| | | 0.20 | | |
| | | 0.15 | | |
| 11 | 11.50 | 0.40 | 0.29 | 3.34 |
| | | 0.35 | | |
| | | 0.35 | | |
| | | 0.20 | | |
| | | 0.15 | | |
| 12 | 53.60 | 0.80 | 1.18 | 63.43 |
| | | 1.00 | | |
| | | 2.00 | | |
| | | 2.00 | | |
| | | 0.80 | | |
| | | 0.50 | | |
| 13 | 4.80 | 0.50 | 0.58 | 2.78 |
| | | 0.80 | | |
| | | 0.80 | | |

TABLE A1-continued

Details of Crack Lengths, Widths & Areas; Batch A; Control Slab 1.

| Crack No. | Length (mm) | Width (mm) | Avg. Width (mm) | Area (mm$^2$) |
|---|---|---|---|---|
| | | 0.50 | | |
| | | 0.30 | | |
| 14 | 23.40 | 0.80 | 1.40 | 32.76 |
| | | 1.00 | | |
| | | 2.00 | | |
| | | 2.00 | | |
| | | 2.00 | | |
| | | 1.00 | | |
| | | 1.00 | | |
| Total Area | | | | 413.93 |

TABLE A2

Details of Crack Lengths, Widths & Areas; Batch A; Control Slab 2.

| Crack No. | Length (mm) | Width (mm) | Avg. Width (mm) | Area (mm$^2$) |
|---|---|---|---|---|
| 1 | 19.60 | 0.80 | 0.84 | 16.42 |
| | | 1.00 | | |
| | | 1.00 | | |
| | | 1.00 | | |
| | | 0.80 | | |
| | | 0.80 | | |
| | | 0.80 | | |
| | | 0.50 | | |
| 2 | 38.40 | 0.40 | 1.03 | 39.68 |
| | | 0.80 | | |
| | | 0.80 | | |
| | | 1.00 | | |
| | | 2.00 | | |
| | | 2.00 | | |
| | | 1.00 | | |
| | | 0.80 | | |
| | | 0.50 | | |
| 3 | 9.20 | 0.80 | 0.73 | 6.67 |
| | | 0.80 | | |
| | | 0.80 | | |
| | | 0.50 | | |
| 4 | 22.60 | 0.20 | 0.69 | 15.50 |
| | | 0.50 | | |
| | | 0.80 | | |
| | | 1.00 | | |
| | | 1.00 | | |
| | | 0.80 | | |
| | | 0.50 | | |
| 5 | 15.20 | 0.20 | 0.33 | 5.02 |
| | | 0.35 | | |
| | | 0.40 | | |
| | | 0.35 | | |
| | | 0.35 | | |
| 6 | 9.90 | 0.20 | 0.24 | 2.35 |
| | | 0.20 | | |
| | | 0.35 | | |
| | | 0.20 | | |
| 7 | 31.30 | 0.40 | 0.46 | 14.35 |
| | | 0.45 | | |
| | | 0.50 | | |
| | | 0.45 | | |
| | | 0.50 | | |
| | | 0.45 | | |
| 8 | 40.70 | 0.35 | 0.39 | 15.87 |
| | | 0.30 | | |
| | | 0.35 | | |
| | | 0.50 | | |
| | | 0.45 | | |
| 9 | 43.40 | 0.20 | 0.26 | 11.21 |
| | | 0.20 | | |
| | | 0.20 | | |
| | | 0.35 | | |

TABLE A2-continued

Details of Crack Lengths, Widths & Areas; Batch A; Control Slab 2.

| Crack No. | Length (mm) | Width (mm) | Avg. Width (mm) | Area (mm$^2$) |
|---|---|---|---|---|
| | | 0.40 | | |
| | | 0.20 | | |
| 10 | 15.20 | 0.20 | 0.20 | 3.04 |
| | | 0.20 | | |
| | | 0.20 | | |
| | | 0.20 | | |
| 11 | 23.40 | 0.40 | 0.36 | 8.42 |
| | | 0.45 | | |
| | | 0.45 | | |
| | | 0.30 | | |
| | | 0.20 | | |
| 12 | 54.40 | 0.20 | 0.28 | 14.96 |
| | | 0.20 | | |
| | | 0.20 | | |
| | | 0.30 | | |
| | | 0.45 | | |
| | | 0.45 | | |
| | | 0.20 | | |
| | | 0.20 | | |
| 13 | 12.90 | 0.20 | 0.20 | 2.58 |
| | | 0.20 | | |
| | | 0.20 | | |
| | | 0.20 | | |
| 14 | 12.70 | 0.20 | 0.25 | 3.18 |
| | | 0.30 | | |
| | | 0.20 | | |
| | | 0.30 | | |
| 15 | 24.20 | 0.20 | 0.28 | 6.66 |
| | | 0.20 | | |
| | | 0.30 | | |
| | | 0.45 | | |
| | | 0.30 | | |
| | | 0.20 | | |
| 16 | 26.40 | 0.20 | 0.22 | 5.81 |
| | | 0.20 | | |
| | | 0.30 | | |
| | | 0.20 | | |
| | | 0.20 | | |
| 17 | 22.80 | 0.20 | 0.23 | 5.13 |
| | | 0.20 | | |
| | | 0.20 | | |
| | | 0.30 | | |
| 18 | 14.40 | 0.20 | 0.22 | 3.17 |
| | | 0.20 | | |
| | | 0.30 | | |
| | | 0.20 | | |
| | | 0.20 | | |
| 19 | 23.80 | 0.20 | 0.22 | 5.16 |
| | | 0.20 | | |
| | | 0.20 | | |
| | | 0.30 | | |
| | | 0.20 | | |
| | | 0.20 | | |
| 20 | 28.30 | 0.20 | 0.23 | 6.60 |
| | | 0.20 | | |
| | | 0.30 | | |
| | | 0.30 | | |
| | | 0.20 | | |
| | | 0.20 | | |
| 21 | 19.20 | 0.15 | 0.21 | 4.00 |
| | | 0.20 | | |
| | | 0.20 | | |
| | | 0.20 | | |
| | | 0.30 | | |
| | | 0.20 | | |
| Total Area | | | | 195.76 |

TABLE A3

Details of Crack Lengths, Widths & Areas; Batch A; Slabs Reinforced with Hybrid Fiber Blend (1%)

| Crack No. | Length (mm) | Width (mm) | Avg. Width (mm) | Area (mm$^2$) |
|---|---|---|---|---|
| | | Slab 1 | | |
| 1 | 6.30 | 0.20 | 0.18 | 1.13 |
| | | 0.15 | | |
| | | 0.20 | | |
| | | 0.20 | | |
| | | 0.15 | | |
| 2 | 3.90 | 0.20 | 0.23 | 0.88 |
| | | 0.30 | | |
| | | 0.20 | | |
| | | 0.20 | | |
| 3 | 4.20 | 0.15 | 0.19 | 0.79 |
| | | 0.20 | | |
| | | 0.20 | | |
| | | 0.20 | | |
| 4 | 5.50 | 0.20 | 0.25 | 1.38 |
| | | 0.30 | | |
| | | 0.30 | | |
| | | 0.20 | | |
| 5 | 8.20 | 0.20 | 0.18 | 1.50 |
| | | 0.15 | | |
| | | 0.15 | | |
| | | 0.20 | | |
| | | 0.20 | | |
| | | 0.20 | | |
| Total Area | | | | 5.68 |
| | | Slab 2 | | |
| 1 | 8.60 | 0.20 | 0.20 | 1.72 |
| | | 0.25 | | |
| | | 0.15 | | |
| | | 0.20 | | |
| 2 | 7.70 | 0.15 | 0.21 | 1.62 |
| | | 0.20 | | |
| | | 0.30 | | |
| | | 0.20 | | |
| | | 0.20 | | |
| 3 | 19.90 | 0.20 | 0.22 | 4.38 |
| | | 0.20 | | |
| | | 0.20 | | |
| | | 0.30 | | |
| | | 0.20 | | |
| 4 | 7.90 | 0.20 | 0.22 | 1.74 |
| | | 0.30 | | |
| | | 0.20 | | |
| | | 0.20 | | |
| | | 0.20 | | |
| 5 | 10.60 | 0.15 | 0.21 | 2.23 |
| | | 0.20 | | |
| | | 0.30 | | |
| | | 0.20 | | |
| | | 0.20 | | |
| 6 | 5.90 | 0.20 | 0.18 | 1.03 |
| | | 0.20 | | |
| | | 0.15 | | |
| | | 0.15 | | |
| 7 | 5.50 | 0.15 | 0.21 | 1.16 |
| | | 0.30 | | |
| | | 0.20 | | |
| | | 0.20 | | |
| | | 0.20 | | |
| Total Area | | | | 1.45 |
| | | Slab 3 | | |
| 1 | 5.70 | 0.15 | 0.19 | 1.08 |
| | | 0.20 | | |
| | | 0.20 | | |
| | | 0.20 | | |
| | | 0.20 | | |
| 2 | 6.40 | 0.30 | 0.21 | 1.34 |
| | | 0.20 | | |
| | | 0.20 | | |
| | | 0.15 | | |
| | | 0.20 | | |
| 3 | 5.40 | 0.20 | 0.21 | 1.13 |
| | | 0.30 | | |
| | | 0.20 | | |
| | | 0.20 | | |
| | | 0.15 | | |
| 4 | 10.60 | 0.25 | 0.26 | 2.76 |
| | | 0.30 | | |
| | | 0.20 | | |
| | | 0.30 | | |
| | | 0.25 | | |
| 5 | 14.20 | 0.15 | 0.17 | 2.41 |
| | | 0.20 | | |
| | | 0.20 | | |
| | | 0.15 | | |
| | | 0.15 | | |
| 6 | 5.60 | 0.30 | 0.24 | 1.34 |
| | | 0.30 | | |
| | | 0.20 | | |
| | | 0.20 | | |
| | | 0.20 | | |
| 7 | 8.70 | 0.30 | 0.19 | 1.65 |
| | | 0.20 | | |
| | | 0.15 | | |
| | | 0.15 | | |
| | | 0.15 | | |
| 8 | 7.40 | 0.20 | 0.18 | 1.33 |
| | | 0.20 | | |
| | | 0.15 | | |
| | | 0.20 | | |
| | | 0.15 | | |
| Total Area | | | | 13.06 |

TABLE B1

Details of Crack Lengths, Widths & Areas; Batch B; Control Slab 1.

| Crack No. | Length (mm) | Width (mm) | Average Width (mm) | Area (mm$^2$) |
|---|---|---|---|---|
| 1 | 66.90 | 0.40 | 1.13 | 75.45 |
| | | 0.80 | | |
| | | 1.00 | | |
| | | 2.00 | | |
| | | 2.00 | | |
| | | 2.00 | | |
| | | 1.00 | | |
| | | 0.45 | | |
| | | 0.50 | | |
| 2 | 57.80 | 1.00 | 1.87 | 107.89 |
| | | 2.00 | | |
| | | 2.00 | | |
| | | 2.00 | | |
| | | 3.00 | | |
| | | 3.00 | | |
| | | 2.00 | | |
| | | 1.00 | | |
| | | 0.80 | | |
| 3 | 40.70 | 0.80 | 1.20 | 48.84 |
| | | 1.00 | | |
| | | 2.00 | | |
| | | 2.00 | | |
| | | 0.80 | | |
| | | 1.00 | | |
| | | 0.80 | | |
| 4 | 32.40 | 1.00 | 1.76 | 56.88 |
| | | 2.00 | | |

TABLE B1-continued

Details of Crack Lengths, Widths & Areas; Batch B; Control Slab 1.

| Crack No. | Length (mm) | Width (mm) | Average Width (mm) | Area (mm$^2$) |
|---|---|---|---|---|
|   |        | 2.00 |      |       |
|   |        | 3.00 |      |       |
|   |        | 3.00 |      |       |
|   |        | 2.00 |      |       |
|   |        | 1.00 |      |       |
|   |        | 1.00 |      |       |
|   |        | 0.80 |      |       |
| 5 | 55.80  | 0.80 | 1.08 | 59.99 |
|   |        | 1.00 |      |       |
|   |        | 1.00 |      |       |
|   |        | 1.00 |      |       |
|   |        | 2.00 |      |       |
|   |        | 1.00 |      |       |
|   |        | 1.00 |      |       |
|   |        | 0.80 |      |       |
| 6 | 13.40  | 0.80 | 0.82 | 10.99 |
|   |        | 1.00 |      |       |
|   |        | 1.00 |      |       |
|   |        | 0.80 |      |       |
|   |        | 0.50 |      |       |
| 7 | 5.20   | 0.45 | 0.33 | 1.72  |
|   |        | 0.30 |      |       |
|   |        | 0.30 |      |       |
|   |        | 0.35 |      |       |
|   |        | 0.25 |      |       |
| 8 | 10.30  | 0.30 | 0.37 | 3.81  |
|   |        | 0.45 |      |       |
|   |        | 0.50 |      |       |
|   |        | 0.30 |      |       |
|   |        | 0.30 |      |       |
| 9 | 26.30  | 0.20 | 0.23 | 6.14  |
|   |        | 0.30 |      |       |
|   |        | 0.30 |      |       |
|   |        | 0.20 |      |       |
|   |        | 0.20 |      |       |
|   |        | 0.20 |      |       |
| 10| 8.80   | 0.20 | 0.24 | 2.11  |
|   |        | 0.20 |      |       |
|   |        | 0.30 |      |       |
|   |        | 0.30 |      |       |
|   |        | 0.20 |      |       |
| Total Area |   |      |      | 373.81 |

TABLE B2

Details of Crack Lengths, Widths & Areas; Batch B; Control Slab 2.

| Crack No. | Length (mm) | Width (mm) | Average Width (mm) | Area (mm$^2$) |
|---|---|---|---|---|
| 1 | 61.60 | 1.00 | 1.88 | 115.50 |
|   |       | 2.00 |      |        |
|   |       | 2.00 |      |        |
|   |       | 2.00 |      |        |
|   |       | 2.00 |      |        |
|   |       | 3.00 |      |        |
|   |       | 2.00 |      |        |
|   |       | 1.00 |      |        |
| 2 | 9.40  | 0.80 | 0.64 | 5.99   |
|   |       | 0.80 |      |        |
|   |       | 0.50 |      |        |
|   |       | 0.45 |      |        |
| 3 | 19.30 | 0.45 | 0.42 | 8.04   |
|   |       | 0.50 |      |        |
|   |       | 0.50 |      |        |
|   |       | 0.50 |      |        |
|   |       | 0.30 |      |        |
|   |       | 0.25 |      |        |
| 4 | 25.40 | 0.80 | 0.63 | 16.09  |
|   |       | 1.00 |      |        |

TABLE B2-continued

Details of Crack Lengths, Widths & Areas; Batch B; Control Slab 2.

| Crack No. | Length (mm) | Width (mm) | Average Width (mm) | Area (mm$^2$) |
|---|---|---|---|---|
|   |       | 0.80 |      |        |
|   |       | 0.50 |      |        |
|   |       | 0.40 |      |        |
|   |       | 0.30 |      |        |
| 5 | 80.60 | 1.00 | 2.09 | 168.53 |
|   |       | 1.00 |      |        |
|   |       | 2.00 |      |        |
|   |       | 3.00 |      |        |
|   |       | 1.00 |      |        |
|   |       | 3.00 |      |        |
|   |       | 3.00 |      |        |
|   |       | 3.00 |      |        |
|   |       | 3.00 |      |        |
|   |       | 2.00 |      |        |
|   |       | 1.00 |      |        |
| 5A| 20.10 | 2.00 | 2.17 | 43.55  |
|   |       | 3.00 |      |        |
|   |       | 2.00 |      |        |
|   |       | 2.00 |      |        |
|   |       | 2.00 |      |        |
|   |       | 2.00 |      |        |
| 6 | 71.60 | 0.50 | 0.81 | 58.30  |
|   |       | 0.80 |      |        |
|   |       | 1.00 |      |        |
|   |       | 1.00 |      |        |
|   |       | 0.80 |      |        |
|   |       | 0.80 |      |        |
|   |       | 0.80 |      |        |
| 7 | 16.70 | 0.45 | 0.30 | 5.01   |
|   |       | 0.45 |      |        |
|   |       | 0.20 |      |        |
|   |       | 0.20 |      |        |
|   |       | 0.20 |      |        |
| 8 | 13.20 | 0.50 | 0.30 | 3.96   |
|   |       | 0.30 |      |        |
|   |       | 0.20 |      |        |
|   |       | 0.20 |      |        |
|   |       | 0.30 |      |        |
| Total Area |  |    |      | 424.97 |

TABLE C1

Details of Crack Lengths, Widths & Areas; Batch C; Control Slab 1.

| Crack No. | Length (mm) | Width (mm) | Average Width (mm) | Area (mm$^2$) |
|---|---|---|---|---|
| 1 | 49.90 | 0.80 | 1.20 | 59.88 |
|   |       | 1.00 |      |       |
|   |       | 1.00 |      |       |
|   |       | 2.00 |      |       |
|   |       | 2.00 |      |       |
|   |       | 0.80 |      |       |
|   |       | 1.00 |      |       |
|   |       | 1.00 |      |       |
| 2 | 46.40 | 1.00 | 1.37 | 63.63 |
|   |       | 2.00 |      |       |
|   |       | 2.00 |      |       |
|   |       | 2.00 |      |       |
|   |       | 1.00 |      |       |
|   |       | 0.80 |      |       |
|   |       | 0.80 |      |       |
| 2A| 20.70 | 0.80 | 0.54 | 11.18 |
|   |       | 0.80 |      |       |
|   |       | 0.50 |      |       |
|   |       | 0.40 |      |       |
|   |       | 0.20 |      |       |
| 2B| 14.20 | 0.50 | 0.36 | 5.11  |
|   |       | 0.50 |      |       |
|   |       | 0.30 |      |       |

TABLE C1-continued

Details of Crack Lengths, Widths & Areas; Batch C; Control Slab 1.

| Crack No. | Length (mm) | Width (mm) | Average Width (mm) | Area (mm$^2$) |
|---|---|---|---|---|
| 3 | 15.60 | 0.30 | 0.47 | 7.28 |
|   |       | 0.20 |      |      |
|   |       | 0.50 |      |      |
|   |       | 0.80 |      |      |
|   |       | 0.50 |      |      |
|   |       | 0.50 |      |      |
|   |       | 0.30 |      |      |
|   |       | 0.20 |      |      |
| 4 | 68.60 | 0.80 | 0.70 | 48.02 |
|   |       | 1.00 |      |      |
|   |       | 1.00 |      |      |
|   |       | 1.00 |      |      |
|   |       | 0.80 |      |      |
|   |       | 0.50 |      |      |
|   |       | 0.30 |      |      |
|   |       | 0.20 |      |      |
| 5 | 19.70 | 0.20 | 0.31 | 6.19 |
|   |       | 0.40 |      |      |
|   |       | 0.50 |      |      |
|   |       | 0.50 |      |      |
|   |       | 0.20 |      |      |
|   |       | 0.20 |      |      |
|   |       | 0.20 |      |      |
| 6 | 11.40 | 0.20 | 0.26 | 2.96 |
|   |       | 0.40 |      |      |
|   |       | 0.30 |      |      |
|   |       | 0.20 |      |      |
|   |       | 0.20 |      |      |
| 7 | 15.30 | 0.20 | 0.22 | 3.32 |
|   |       | 0.20 |      |      |
|   |       | 0.30 |      |      |
|   |       | 0.20 |      |      |
|   |       | 0.20 |      |      |
|   |       | 0.20 |      |      |
| 8 | 11.60 | 0.30 | 0.25 | 2.90 |
|   |       | 0.20 |      |      |
|   |       | 0.40 |      |      |
|   |       | 0.20 |      |      |
|   |       | 0.20 |      |      |
|   |       | 0.20 |      |      |
| Total Area |  |  |  | 210.47 |

TABLE C2

Details of Crack Lengths, Widths & Areas; Batch C; Control Slab 2.

| Crack No. | Length (mm) | Width (mm) | Average Width (mm) | Area (mm$^2$) |
|---|---|---|---|---|
| 1 | 20.10 | 0.20 | 0.30 | 6.03 |
|   |       | 0.30 |      |      |
|   |       | 0.40 |      |      |
|   |       | 0.50 |      |      |
|   |       | 0.20 |      |      |
|   |       | 0.20 |      |      |
| 2 | 16.60 | 0.20 | 0.27 | 4.43 |
|   |       | 0.40 |      |      |
|   |       | 0.30 |      |      |
|   |       | 0.30 |      |      |
|   |       | 0.20 |      |      |
|   |       | 0.20 |      |      |
| 3 | 19.70 | 0.20 | 0.30 | 5.91 |
|   |       | 0.40 |      |      |
|   |       | 0.40 |      |      |
|   |       | 0.40 |      |      |
|   |       | 0.20 |      |      |
|   |       | 0.30 |      |      |
|   |       | 0.20 |      |      |
| 4 | 10.20 | 0.20 | 0.23 | 2.38 |
|   |       | 0.30 |      |      |
|   |       | 0.30 |      |      |
|   |       | 0.20 |      |      |
|   |       | 0.20 |      |      |
|   |       | 0.20 |      |      |
|   |       | 0.20 |      |      |
| 5 | 29.40 | 0.50 | 0.31 | 9.24 |
|   |       | 0.40 |      |      |
|   |       | 0.30 |      |      |
|   |       | 0.40 |      |      |
|   |       | 0.20 |      |      |
|   |       | 0.20 |      |      |
|   |       | 0.20 |      |      |
| 6 | 63.20 | 1.00 | 2.10 | 132.72 |
|   |       | 2.00 |      |      |
|   |       | 3.00 |      |      |
|   |       | 2.00 |      |      |
|   |       | 2.00 |      |      |
|   |       | 3.00 |      |      |
|   |       | 3.00 |      |      |
|   |       | 2.00 |      |      |
|   |       | 2.00 |      |      |
|   |       | 1.00 |      |      |
| 6A | 11.40 | 0.20 | 0.24 | 2.74 |
|    |       | 0.30 |      |      |
|    |       | 0.30 |      |      |
|    |       | 0.20 |      |      |
|    |       | 0.20 |      |      |
| 6B | 12.80 | 0.40 | 0.37 | 4.75 |
|    |       | 0.50 |      |      |
|    |       | 0.80 |      |      |
|    |       | 0.30 |      |      |
|    |       | 0.20 |      |      |
|    |       | 0.20 |      |      |
|    |       | 0.20 |      |      |
| 6C | 15.40 | 0.20 | 0.22 | 3.34 |
|    |       | 0.20 |      |      |
|    |       | 0.30 |      |      |
|    |       | 0.20 |      |      |
|    |       | 0.20 |      |      |
|    |       | 0.20 |      |      |
| 6D | 5.30  | 1.00 | 0.67 | 3.53 |
|    |       | 0.80 |      |      |
|    |       | 0.80 |      |      |
|    |       | 0.50 |      |      |
|    |       | 0.50 |      |      |
|    |       | 0.40 |      |      |
| Total Area |  |  |  | 175.07 |

TABLE C3

Details of Crack Lengths, Widths & Areas; Batch C; Slabs Reinforced with Hybrid Fiber Blend (0.5%)

| Crack No. | Length (mm) | Width (mm) | Avg. Width (mm) | Area (mm$^2$) |
|---|---|---|---|---|
| Slab 1 | | | | |
| 1 | 5.30 | 0.20 | 0.22 | 1.17 |
|   |      | 0.30 |      |      |
|   |      | 0.20 |      |      |
|   |      | 0.20 |      |      |
| 2 | 24.70 | 0.20 | 0.25 | 6.18 |
|   |       | 0.20 |      |      |
|   |       | 0.30 |      |      |
|   |       | 0.30 |      |      |
|   |       | 0.20 |      |      |
|   |       | 0.20 |      |      |
|   |       | 0.30 |      |      |
| 3 | 32.30 | 0.50 | 0.51 | 16.61 |
|   |       | 0.80 |      |      |

TABLE C3-continued

Details of Crack Lengths, Widths & Areas; Batch C; Slabs Reinforced with Hybrid Fiber Blend (0.5%)

| Crack No. | Length (mm) | Width (mm) | Avg. Width (mm) | Area (mm²) |
|---|---|---|---|---|
| | | 0.80 | | |
| | | 0.50 | | |
| | | 0.40 | | |
| | | 0.30 | | |
| | | 0.30 | | |
| 4 | 6.40 | 0.30 | 0.23 | 1.44 |
| | | 0.20 | | |
| | | 0.20 | | |
| | | 0.20 | | |
| 5 | 4.30 | 0.20 | 0.24 | 1.03 |
| | | 0.20 | | |
| | | 0.30 | | |
| | | 0.30 | | |
| | | 0.20 | | |
| Total Area | | | | 26.42 |
| Slab 2 | | | | |
| 1 | 6.60 | 0.20 | 0.26 | 1.72 |
| | | 0.30 | | |
| | | 0.40 | | |
| | | 0.20 | | |
| | | 0.20 | | |
| 2 | 14.40 | 0.30 | 0.38 | 5.52 |
| | | 0.50 | | |
| | | 0.50 | | |
| | | 0.50 | | |
| | | 0.20 | | |
| | | 0.30 | | |
| 3 | 25.40 | 0.30 | 0.25 | 6.35 |
| | | 0.30 | | |
| | | 0.30 | | |
| | | 0.20 | | |
| | | 0.20 | | |
| | | 0.20 | | |
| Total Area | | | | 13.59 |
| Slab 3 | | | | |
| 1 | 6.70 | 0.20 | 0.22 | 1.452 |
| | | 0.20 | | |
| | | 0.20 | | |
| | | 0.30 | | |
| | | 0.20 | | |
| | | 0.20 | | |
| 2 | 7.40 | 0.20 | 0.23 | 1.727 |
| | | 0.20 | | |
| | | 0.30 | | |
| | | 0.30 | | |
| | | 0.20 | | |
| | | 0.20 | | |
| 3 | 7.80 | 0.30 | 0.27 | 2.08 |
| | | 0.30 | | |
| | | 0.40 | | |
| | | 0.20 | | |
| | | 0.20 | | |
| | | 0.20 | | |
| Total Area | | | | 5.258 |

Example 2

A study was conducted to evaluate the reformulated experimental synthetic hybrid fiber of the present invention at three addition rates in wet-mix shotcrete. The discrete fibers were approximately 60 mm long by 0.3 mm thick by 0.3 mm wide. The fibrillating fiber was collated. The fibers had a specific bulk density of 910 kg/m³.

Three shotcrete mixtures with nominally 1.0, 1.5, and 2.0% by volume fiber addition rate were produced for the purpose of the evaluation. In all mixes, the collated fibrillating fibers were proportioned for 0.1% by volume addition rate, and the balance being the discrete 60 mm long fiber. The three mixtures were tested for fresh shotcrete properties, rebound data were determined, and one standard ACI shotcrete test panel, one Australian Round Panel and one South African Panel per mixture were produced.

Three beams for ASTM C1018 beam testing were diamond saw cut from each standard ACI shotcrete test panel. Cores were also extracted from these test panels for the determination of compressive strength. Permeability data were determined on diamond saw cut beam ends. The South African Panels were tested with uniformly distributed loading on a water bed test assembly, while the Australian Round Panels were tested in centre point loading with determinate support at three points on custom built testing machine made by AGRA Earth & Environmental Limited, Burnaby, B.C., Canada.

Shotcrete Mixture Design and Batching

The base wet-mix shotcrete mixture design used is shown in the table in Technical Report No. 1, below. This mixture design is similar to mixtures typically used for permanent shotcrete linings in tunnels and mines, slope stabilization and infrastructure rehabilitation projects in North America. In the ternary blend of cementing material (portland cement, fly ash and silica fume) the silica fume enhances adhesion and cohesion of the mix and reduces rebound; the fly ash increases paste volume which improves pumpability and shootability.

In order to maintain tight control over mixture proportions, the base shotcrete mix was drybatched. Bone-dry materials were used and all the ingredients were precision mass batched with monitoring. The materials were premixed in a rotary pan mixer with counter rotating paddles, before being discharged into 30 kg paper bags. Shotcrete was supplied on pallets and protected by shrink-wrap and covered under tarps for moisture protection prior to use.

Shotcrete was batched in a modified Allentown Powercrete Pro mixer unit, attached to a 75 mm swing valve pump. Typically fourteen, 30 kg bags were batched at a time. Water was added to maintain a constant water/cement ratio between all mixes. The fibers were added directly to the mixer unit during the mixing cycle and mixed for approximately 5 minutes to provide uniform fiber distribution prior to shotcrete discharge.

The following mixtures were produced: 1) Mixture F10 (nominally 1.0% by volume fiber content); 2) Mixture F15 (nominally 1.5% by volume fiber content); and 3) Mixture F20 (nominally 2.0% by volume fiber content, increased paste volume).

The superplasticizer dosage was adjusted as necessary to provide the required slump for shooting. Mix F20 received a supplementary dose of fly ash and water to increase the paste volume in order to maintain good pumping properties in spite of the high fiber addition rate. Actual admixture dosages for the three mixtures are shown in Technical Reports No. 1a to 1c, below.

Shotcrete Plastic Properties

1. Slump and Air Content

Details regarding the prevailing ambient conditions (temperature, wind speed, precipitation) and plastic shotcrete properties are given in the table in Technical Report No. 2, below. The dosages of the admixtures required to produce the desired slump and as-batched air content are also shown in this table. The table in Report No. 2 also details properties of the as-batched and as-shot fresh shotcrete, and the operating hydraulic pressure of the shotcrete pump as a measure of ease of pumping.

Slumps of the different mixtures ranged from 30 to 50 mm. As-batched air contents of the mixtures, as discharged into the shotcrete pump, varied between 8 and 9%. For the determination of the as-shot air content, the shotcrete was shot into an ASTM C231 air pressure meter base. The as-shot air content was in the 2 to 3% range. This is a higher than usual loss of air content indicating that the fibers help entrap air which releases upon impact when the shotcrete is placed.

2. Pumpability and Shootability

The as-batched shotcrete was discharged into the pump hopper of the pump provided by Polycrete Restorations Ltd. The pump had a 75 mm diameter swing valve which discharged into a 50 mm internal diameter 15 m long hose and through a metal reducing section to a 38 mm internal diameter, 30 m long hose when shooting mixtures F10 and F15. The respective hose lengths were approximately 8 m (50 mm diameter) plus 20 m (38 mm diameter) when shooting mixture F20.

The table in Technical Report No. 2 shows that the mixtures required between 11 and 13 MPa hydraulic operating pressure of the pump to be shot, which is considered an acceptable pressure. The shotcrete pump used in this testing program had a maximum operating pressure of approximately 16 MPa. The mixture with nominally 2.0% by volume fiber type F20 could be pumped generally satisfactory after the addition of the fly ash and water described above. Mix F20, however, approached the limit of pumpability with the existing equipment and modified base mixture. Several blockages of the shotcrete hoses occurred due to pressure-induced paste starvation near the 50 mm to 38 mm reducer piece with mix F20.

All fibers dispersed well in the shotcrete. No balling was observed. The shotcrete mixes adhered well to the substrates to which they were applied and did not slough.

3. Rebound Testing

Rebound testing was conducted on all mixes in a 2.5 m cube timber framed box, lined with form-ply, open on one vertical face. Shotcrete was applied on a vertical face at the back of the box to an area about 600×600 square×100 mm deep, with four shooting nails demarcating the shooting area. Material which fell to the floor of the rebound chamber was recovered and weighed as rebound. The in-place material was then removed and weighed. Fiber wash-out testing was conducted on the entire rebound sample and on a representative sample of similar mass, taken from the in-place material. The following parameters were calculated: 1) as batched fiber content in kg/m$^3$, percent by volume and percent by mass; 2) in-place fiber content in kg/m$^3$, percent by volume and percent by mass; 3) fiber in rebound in kg/m$^3$, percent by volume and percent by mass; 4) fiber rebound (=mass of all rebounded fibers/mass of all batched fibers×100%); and 5) fiber retention (=in-place fiber content/as-batched fiber content×100%).

Test results are provided in the attached Technical Report No. 3, below. The total rebound of shotcreting materials varied from 12 to 19% by mass, which is not atypical for shotcrete with a high content of synthetic fibers. A trend towards increasing rebound with increasing fiber addition rate was observed. The fiber retention varied from 94% for the mix with nominally 1.0% by volume of fiber addition rate to approximately 80% for the other two mixes. This is a relatively favorable fiber retention and consistent with the rebound behavior of other high volume synthetic fiber shotcretes tested elsewhere.[1]

[1] Morgan, D. R., Heere, R., McAskill, N., Chan, C.: Comparative Evaluation of System Ductility of Mesh and Fiber Reinforced Shotcrete, presented at Engineering Foundation, Shotcrete for Underground Support VIII Conference, Campos do Jordão, Brazil, Apr. 11–15, 1999

Shotcrete Production

1. ACI Test Panels

One standard 600×600×125 mm test panel per mix was shot at a slightly inclined angle from vertical. The panels had 45° sloped edges to facilitate escape of rebound and stripping of the panel from the form. The panels were moist cured in the field under plastic sheeting for 2 days. At that time, core specimens for compressive strength testing and ASTM C642 boiled absorption and volume of permeable voids testing were procured by diamond coring from these panels. In addition, a set of three 100×100×350 mm beams for toughness testing per ASTM C1018 were diamond saw cut from these panels. The specimens were moved to the fog room in the laboratory at age 4 days, where they were moist cured at 23+/−2° C. until the time of testing.

2. Australian Round Panel Test

One Australian Round Panel was shot for each mixture. The panels had a diameter of 800 mm and were approximately 80 mm thick. After shooting, the panel surface was struck off with a wooden two-by-four and finished to a smooth finish with a steel trowel. The panels were moist cured under plastic sheeting in the field for 4 days, then moved into the fog room and stored at 23+/−2° C. and 100% Relative Humidity until the time of testing.

3. South African Water Bed Test

One test panel with dimensions of 1600×1600×80 mm thick was shot for each mixture. Void formers were placed at 1000 mm apart, i.e. at the locations where rock bolts would penetrate to restrain the panel from free vertical movement during the test on the water bed station. The panel was shot in a vertical orientation and finished to an equivalent to cast-concrete surface finish, using a two-by-four for strike-off and steel trowel finishing.

After initial set, the shotcrete panels were covered with plastic sheets and kept moist and protected for 7 days. The panels were stripped from the forms at age 21 days and allowed to field cure for a further 8 days prior to testing at age 28 days.

Hardened Shotcrete Properties

1. ASTM Standard Tests a. Compressive Strength

Six, 75 mm diameter by about 110 mm long cores were extracted from each of the standard ASTM test panels and tested for compressive strength to CSA A23.2-14C (which is equivalent to ASTM C42). Test results are given in Technical Reports No. 4, below. All three shotcrete mixtures achieved approximately 48 MPa compressive strength at 7 days. The following table shows the ratio of achieved vs. predicted (based on the mixture proportions and as-shot air content) compressive strength to illustrate any influence of the fiber addition rate on the compressive strength of the mixture.

| Mixture | Volumetric Fiber Addition Rate | Predicted Compressive Strength (Popovic) [MPa] | Achieved Compressive Strength [MPa] | Ratio Achieved vs. Predicted Compressive Strength |
|---|---|---|---|---|
| F10 | 1.0% | 50 at 7 d | 48 at 7 d | 95% |
| F15 | 1.5% | 50 at 7 d | 48 at 7 d | 96% |
| F20 | 1.9% | 45 at 7 d | 48 at 7 d | 106% |

No clear effect of fiber addition rate on compressive strength was evident.

b. Boiled Absorption and Volume of Permeable Voids

The results of the tests conducted on three beam-end saw-off portions at 10 days are given in the attached Technical Report No. 5, below. The values of Boiled Absorption ranged from 4.4% to 4.9%, and the Volume of Permeable Voids ranged from 9.5% to 10.6%. These results are very low compared to the maximum limits of 8.0% for Boiled Absorption and 17.0% for Volume of Permeable Voids commonly specified for structural quality shotcrete. These results are indicative of dense and durable shotcrete of low permeability.

c. Flexural Strength and Toughness

Flexural strength and toughness tests were conducted per ASTM C1018[2] for all mixtures at 7 days on sets of three nominally 100×100×350 mm beams, tested on a 300 mm load span with third point loading. Results of the tests are given in FIGS. 15–26 and tabulated in Technical Reports Nos. 6a to 6f, below. The results show the first crack and ultimate flexural strength and the ASTM C1018 toughness indices and Residual Strength Factors calculated from these indices. Also shown are the Japanese Toughness Parameters and Toughness Performance Levels[3].

[2] With the exception of an open-loop control loading regime
[3] Morgan, D. R., Chen, L., and Beaupré, D., Toughness of Fiber reinforced Shotcrete, ASCE Shotcrete for Underground Support VII, Telfs, Austria, 1995, pp. 66–87

Figure 27:
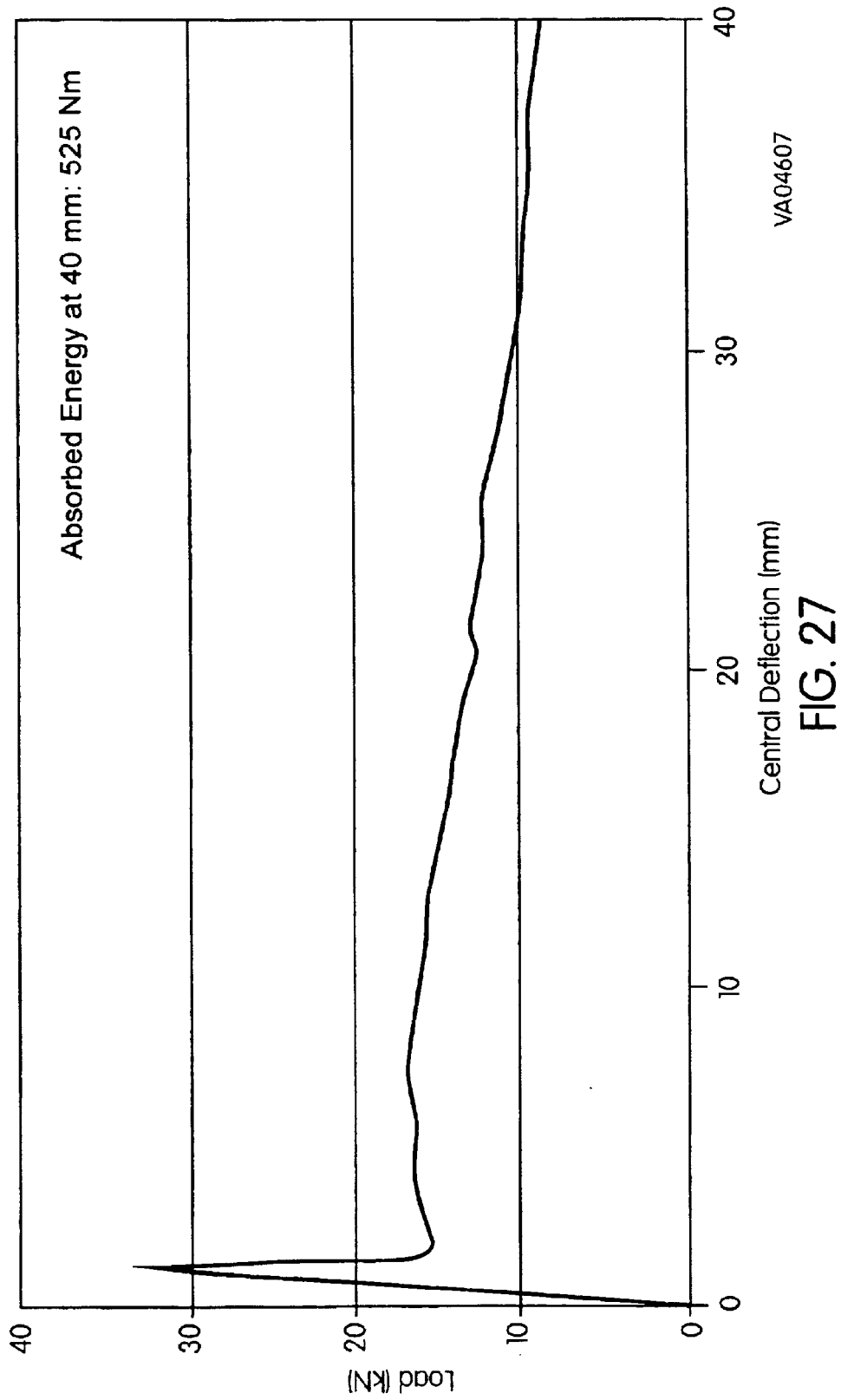
FIG. 27 illustrates a load deflection plot comparing load versus central deflection of the synthetic fiber blends of the present invention in a shotcrete panel at 1.0% by volume.
Figure 28:
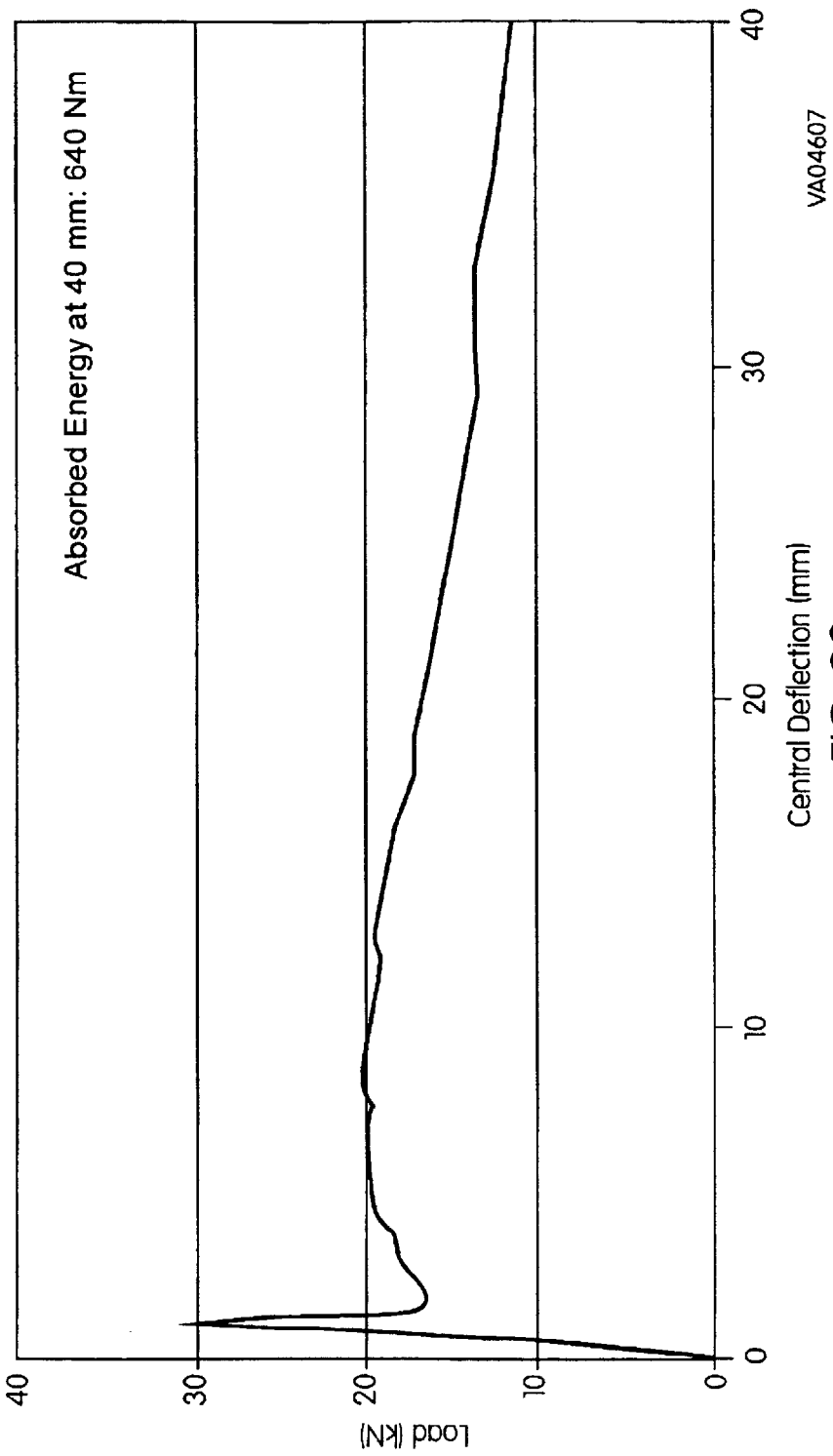
FIG. 28 illustrates a load deflection plot comparing load versus central deflection of the synthetic fiber blends of the present invention in a shotcrete panel at 1.5% by volume.
Figure 29:
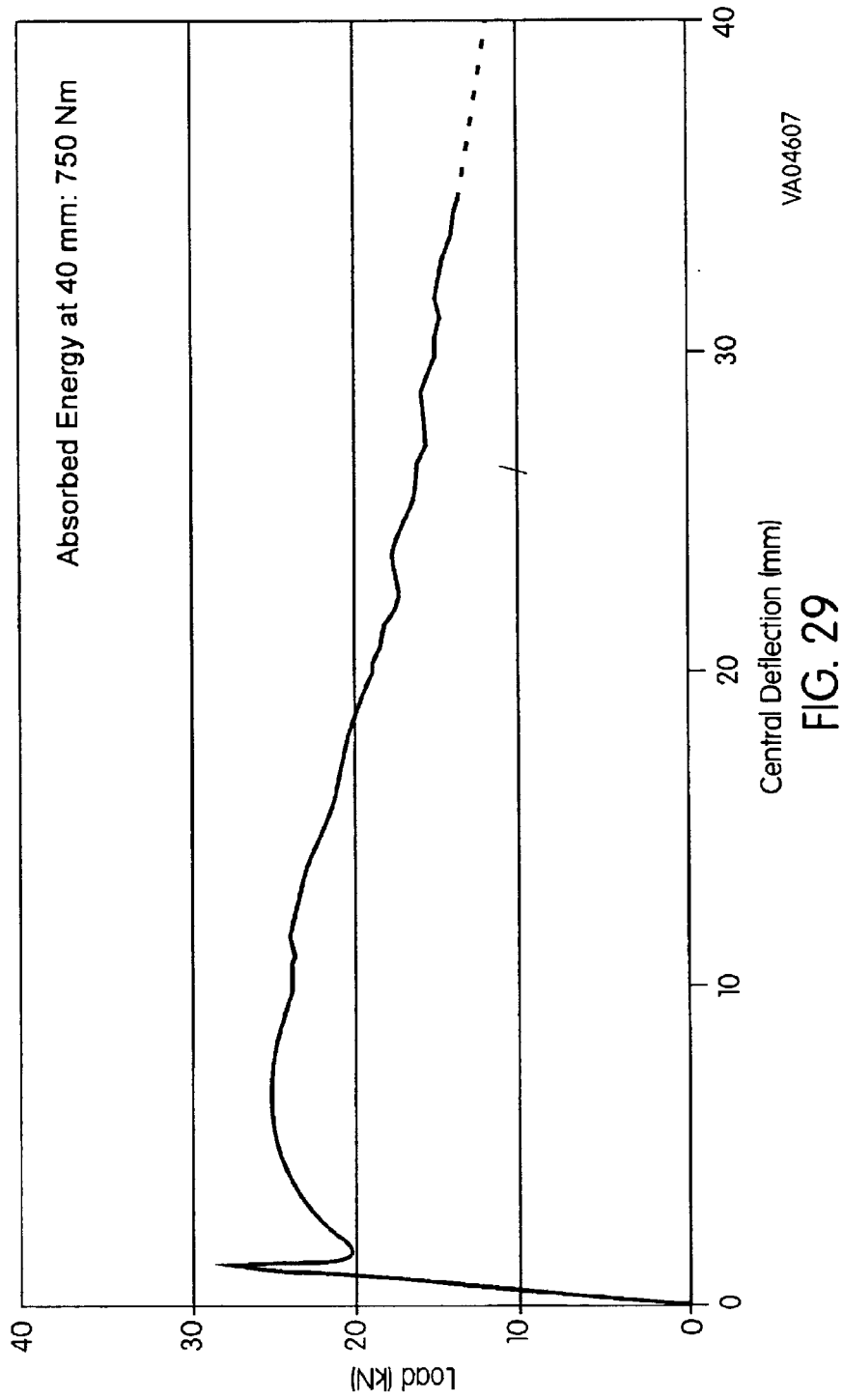
FIG. 29 illustrates a load deflection plot comparing load versus central deflection of the synthetic fiber blends of the present invention in a shotcrete panel at 1.9% by volume.

The results show that there was some instability in the load versus deflection response at deformations up to about 0.5 mm. This is primarily attributed to operation of the test machine in the open loop mode. The following table summarizes the flexural strength and toughness properties of the three mixtures tested.

test apparatus and test method, see Reference 1. FIGS. 27–29 provide the load deflection plot and Technical Report No. 7, below, provides the test results.

The following table summarizes important test data and compares them to published data of shotcrete reinforced with commercially available synthetic fibers. (Reference 1)

| Specimen | As-batched Fiber Volume Dosage | Peak Load [kN] | Maximum Post-Crack Load [kN] | Absorbed Energy (0–40 mm Deflection) [Nm]or [J] |
|---|---|---|---|---|
| Forta - F10 | 1.0% | 31.2 | 16.8 | 525 |
| Forta - F15 | 1.5% | 29.8 | 20.0 | 640 |
| Forta - F20 | 1.9% | 27.9 | 25.2 | 750 |
| *S152-HPP* | *1.0%* | *34.7* | *15.2* | *290* |

Italics: Data from reference in footnote 1, test age > 28 days

Test results showed that increasing the addition rate of fibers or the present invention reduces the ultimate load capacity of the shotcrete. An increase in the as-batched present invention fiber volume addition rate from 1.0% to 1.5% and 1.9% by volume increased the maximum post-crack load of the specimens by 20% and 50% respectively, and increased the overall absorbed energy to 40 mm central deflection by 22% and 43% respectively.

The test results further showed that when compared to the Synthetic Industries S-152HPP fiber, the hybrid synthetic

| Mixture | Fiber Type and As-Batched Volumetric Addition Rate | Average Flexural Strength [MPa] | Ratio Flexural vs. Compressive Strength at 7 Days | Japanese Toughness Factor [MPa] | Toughness Performance Level |
|---|---|---|---|---|---|
| F10 | 2$^{nd}$ generation, 1.0% | 6.8 | 14% | 1.7 | III |
| F15 | 2$^{nd}$ generation, 1.5% | 6.1 | 13% | 2.4 | III |
| F20* | 2$^{nd}$ generation, 1.9% | 6.1 | 13% | 4.0 | IV |
| F2** | 1$^{st}$ generation, 2.0% | 6.5 | 12% (at 8 days) | 4.1 | IV |

*This mixture was produced with an increased fly ash content
**Mix F2 was previously produced and tested at AGRA, see our Report VA04526

The flexural strengths of the mixtures exceeded the frequently specified minimum of 4 MPa for shotcrete construction projects in Western Canada. The Japanese Toughness Factors and Toughness Performance Levels for shotcrete show a good correlation between fiber dosage and ductility. The fibers performed at a relatively high level and developed good bond with the cement matrix. The fibers also developed most of their load-carrying capacity as indicated by numerous ruptured fibers in the fractured faces.

2. Australian Panel Test

The Australian Round Panels were tested on a Round Panel Testing machine at age 7 days. The panels was statically determinately supported on three swiveling supports with minimum constraint to radial movement (in the horizontal plane). The central deflection of the panels was measured with a lever mounted LVDT, while the load was determined with a 80 kN load cell. A computer continuously logged the test data. For a more detailed description of the fibers of the present invention provide superior performance at 1.0% volume addition rate.

3. South African Water Bed Test

The 1600×1600×76 mm panels were tested on AGRA's water bed reaction frame, adapted from the South African Water Bed Test developed by Kirsten[4]. The test set-up comprises a reinforced concrete pedestal with a steel confined reinforced rubber water bed, high tensile strength reaction bolts, and 100×100×10 mm rock bolt plates. The reaction bolts, which simulate rock bolts, were located on a 1000 mm square grid. The four cantilevered edges of the panels were supported against downward movement by four square hollow section steel profiles positioned by pairs of hydraulic jacks.

[4] Kirsten, H. A. D., System Ductility of Long Fiber Reinfoiced Shotcrete, Report prepared for Shotcrete Working Group, South Africa, June 1997, pp. 27 and appendices.

The center point deflection of the panels was measured by means of a retracting extensometer mounted on an aluminum bridge and attached to an epoxy glued hook at the center of the panel. A pressure transducer continuously monitored the water pressure in the water bed, which is correlated to the load applied to the shotcrete test panel. A computer continuously recorded the load and deflection signals. The data were then analyzed and used to plot the load versus deflection curves. The electronically monitored data were verified by mechanical measurements of deflection (measuring tape) and water pressure (analog pressure gauge). Application of load to a total deformation of 150 mm took a total of about 40 minutes.

In addition to continuously monitoring the load versus central deflection response of the panel, the sequence of crack formation was recorded. Crack width development with increasing deflection was also recorded.

Conclusions

The test results outlined above indicate that the hybrid fiber of the present invention displays surprisingly good physical properties over known reinforcement fibers. The hybrid fibers of the present invention (60 mm long) could be batched, pumped and shot with standard shotcreting equipment using 38 mm internal diameter nozzle and as-batched fiber addition rates of 1.0 to 1.9% by volume. The fiber dosage utilized in this study appeared to not significantly affect the compressive strength, flexural strength and values of boiled absorption and volume of permeable voids of the shotcrete compared to a plain shotcrete mix. There did, however, appear to be a trend towards a reduced pre-cracking load carrying capacity of the round shotcrete panels with increased fiber addition rate. Test results show that the fibers can develop their full tenacity (tensile strength capacity) in high quality shotcrete. In addition, the bond between the fibers and the shotcrete matrix appeared to be sufficient to prevent fiber pull-out of a majority of the fibers spanning a crack. Moreover, the overall ductility of the shotcrete reinforced with 1.0 to 1.9% by volume of the hybrid fibers appeared to be comparable with other, commercially available high-performance monofilament synthetic fibers. Moreover, tests results show that the shotcrete with 1.0% by volume hybrid fiber provides toughness and system ductility that appears to be acceptable for shotcrete construction work requiring a moderate resistance to post-cracking loads, as in some ground support and slope stabilization projects, and in construction of erosion control in creeks, river banks and dams. The shotcrete with 1.5% by volume hybrid fiber provides toughness and system ductility that appears to be equivalent to some high quality steel fiber or welded wire mesh reinforced shotcretes, especially at larger crack widths. In addition, the shotcrete with 1.9% by volume hybrid fiber provides toughness and system ductility that appears to perform equivalent or better than some high quality steel fiber and welded wire mesh reinforced shotcretes, especially at larger crack widths.

Technical Report No. 1

Subject: Base Wet-Mix Shotcrete Mixture Proportions, SSD Condition

| Material | Mass [kg] | Bulk Density [kg/m³] | Volume [m³] |
|---|---|---|---|
| Cement Type 10 | 400 | 3150 | 0.1270 |
| Silica Fume | 45 | 2200 | 0.0205 |
| Fly Ash | 30 | 2200 | 0.0136 |
| Coarse Aggregate (10–2.5 mm), SSD | 500 | 2650 | 0.1887 |
| Sand (SSD) | 1130 | 2650 | 0.4264 |
| Water (estimate) | 180 | 1000 | 0.1800 |
| Water Reducing Admixture: Masterbuilder ® Pozzolith ® 325-N | 1.40 | 1000 | 0.0014 |
| Superplasticizer: Masterbuilder ® Rheobuild ® 3000 [L]* | 2.00 | 1000 | 0.0020 |
| Air Entraining Admixture: Masterbuilder ® Microair ® | 0.40 | 1000 | 0.0004 |
| Air Content as shot | 4.0% | | 0.0400 |
| Total | 2288.4 | | 1.0000 |

Specified 28 Day Strength = 40 MPa
W/(C + SiF + FA) Ratio = 0.38
Slump (after superplasticizer and fiber addition) = 70 ± 20 mm Technical Report No. 1a Subject: As-Batched Shotcrete Mixture Proportions

| | Batch Identification: F10 Batch Size (bags): 14 Calculated Fiber Content [% by vol.]: 1.01% water/cementing materials ratio: 0.33 | | | |
|---|---|---|---|---|
| Material | Basic shotcrete mass per batch, bone dry [kg] | Water, Admixtures, Fibers, Fly ash added, per batch [kg] | Bulk Density [SSD] [kg/m³] | Calculated SSD Mass per m³ [kg] |
| Cement Type 10 | 81 | 0 | 3150 | 414 |
| Silica Fume | 9 | 0 | 2200 | 47 |
| Fly Ash | 6 | 0 | 2200 | 31 |
| Coarse Aggregate (10–2.5 mm) | 100 | 0 | 2650 | 517 |
| Sand | 224 | 0 | 2650 | 1169 |
| Water | | 35.8 | 1000 | 165 |
| Synthetic Fibers, FORTA ® 1.0% | | 1.790 | 910 | 9.2 |
| Water Reducing Admixture (Pozzolith ® 325-N) [L] | | 0.295 | | 1.52 |
| Superplasticizer Rheobuild ® 3000 [L]* | | 0.200 | | 1.03 |
| Air Entraining Admixture (Microair ® [L] | | 0.090 | | 0.46 |
| Air Content | | | | |
| At Pump | 8.9% | | | |
| As Shot | 1.9% | | | 1.9% |
| Total | 420 | | | 2355 |

Technical Report No. 1b

Subject: As-Batched Shotcrete Mixture Proportions

Batch Identification: F15
Batch Size (bags): 14
Calculated Fiber Content [% by vol.]: 1.51%
water/cementing materials ratio: 0.33

| Material | Basic shotcrete mass per batch, bone dry [kg] | Water, Admixtures, Fibers, Fly ash added, per batch [kg] | Bulk Density [SSD] [kg/m³] | Calculated SSD Mass per m³ [kg] |
|---|---|---|---|---|
| Cement Type 10 | 81 | 0 | 3150 | 412 |
| Silica Fume | 9 | 0 | 2200 | 46 |
| Fly Ash | 6 | 0 | 2200 | 31 |
| Coarse Aggregate (10–2.5 mm) | 100 | 0 | 2650 | 514 |
| Sand | 224 | 0 | 2650 | 1162 |
| Water | | 35.8 | 1000 | 164 |
| Synthetic Fibers, FORTA ® 1.5% | | 2.685 | 910 | 13.7 |
| Water Reducing Admixture (Pozzolith ® 325-N) [L] | | 0.360 | | 1.84 |
| Superplasticizer Rheobuild ® 3000 [L]* | | 0.100 | | 0.51 |
| Air Entraining Admixture (Microair ®) [L] Air Content | | 0.090 | | 0.46 |
| At Pump | 8.0% | | | |
| As Shot | 2.0% | | | 2.0% |
| Total | 420 | | | 2345 |

Technical Report No. 1c

Subject: As-Batched Shotcrete Mixture Proportions

Batch Identification: F20
Batch Size (bags): 14
Calculated Fiber Content [% by vol.]: 1.90%
water/cementing materials ratio: 0.34

| Material | Basic shotcrete mass per batch, bone dry [kg] | Water, Admixtures, Fibers, Fly ash added, per batch [kg] | Bulk Density [SSD] [kg/m³] | Calculated SSD Mass per m³ [kg] |
|---|---|---|---|---|
| Cement Type 10 | 81 | 0 | 3150 | 390 |
| Silica Fume | 9 | 0 | 2200 | 44 |
| Fly Ash | 6 | 10 | 2200 | 78 |
| Coarse Aggregate (10–2.5 mm) | 100 | 0 | 2650 | 487 |
| Sand | 224 | 0 | 2650 | 1100 |
| Water | | 39.8 | 1000 | 174 |
| Synthetic Fibers, FORTA ® 2.0% | | 3.580 | 910 | 17.3 |
| Water Reducing Admixture (Pozzolith ® 325-N) [L] | | 0.360 | | 1.74 |
| Superplasticizer Rheobuild ® 3000 [L]* | | 0.100 | | 0.48 |
| Air Entraining Admixture (Microair ®) [L] Air Content | | 0.090 | | 0.44 |
| At Pump | 8.6% | | | |
| As Shot | 2.6% | | | 2.6% |
| Total | 420 | | | 2293 |

Technical Report No. 2

Subject: Site Conditions and Fresh Shotcrete Properties

| Property | Unit | Mix Identification | | |
|---|---|---|---|---|
| | | F10 | F15 | F20 |
| As-batched Fiber Content | % by vol. | 1.01 | 1.51 | 1.90 |
| Water Reducer Addition Rate | L/m³ | 1.52 | 1.84 | 1.74* |
| Superplasticizer Addition Rate | L/m³ | 1.03 | 0.51 | 0.48* |
| Air Entraining Agent Addition Rate | L/m³ | 0.46 | 0.46 | 0.44 |
| Ambient Temperature | ° C. | 21 | 21 | 22 |
| Ambient Wind Speed (estim.) | m/s | 2 | 1 | 2 |
| Precipitation | | 0 | 0 | 0 |
| AS-BATCHED | | | | |
| Slump (with Fibers and HRWR) | mm | 50 | 30 | 50 |
| Air Content (with Fibers and HRWR) | % | 8.9 | 8.0 | 8.6 |
| Shotcrete Temperature | ° C. | 24 | 26 | 28 |
| AS-SHOT | | | | |
| Pumping Pressure (hydraulic circuit) | MPa | 11 | 13 | 11 |
| Air Content | % | 1.9 | 2** | 2.6 | n.a. Not Available
*mix contains additional fly ash and water for enhanced pumpability
**estimate based on the as-batched air content Technical Report No. 3

Subject: Shotcrete and Fiber Rebound

| Mix No. | Mix Description | Total Rebound (% by mass) | As-batched Fiber Content (kg/m³) | As-batched Fiber Content (% by vol) | As-batched Fiber Content (% by mass) | In-place Fiber Content (kg/m³) | In-place Fiber Content (% by vol) | In-place Fiber Content (% by mass) | Fiber in Rebound (kg/m³) | Fiber in Rebound (% by vol) | Fiber in Rebound (% by mass) | Fiber Retention (%) |
|---|---|---|---|---|---|---|---|---|---|---|---|---|
| F10 | 1.0% Hybrid Fiber | 12.2 | 9.1 | 1.0 | 0.39 | 8.5 | 0.94 | 0.37 | 21.2 | 2.33 | 0.92 | 94 |
| F15 | 1.5% Hybrid Fiber | 17.3 | 13.7 | 1.5 | 0.59 | 10.7 | 1.18 | 0.46 | 28.7 | 3.16 | 1.24 | 78 |
| F20 | 2.0% Hybrid Fiber | 19.0 | 18.2 | 2.0 | 0.79 | 14.4 | 1.58 | 0.62 | 34.7 | 3.82 | 1.50 | 79 |

Technical Report No. 4a

Hybrid Fiber Shotcrete Evaluation

Subject: Compressive Strength of Cored Shotcrete Specimens to CSA A23.2-14C

| Source, Location | Shotcrete Age [days] | Calculated Compressive Strength [MPa] | Average Compressive Strength [MPa] |
|---|---|---|---|
| Panel F10 | 7 | 50.9 | 47.6 |
|  |  | 45.0 |  |
|  |  | 47.0 |  |
| Panel F15 | 7 | 47.6 | 47.7 |
|  |  | 47.5 |  |
|  |  | 48.0 |  |
| Panel F20 | 7 | 48.8 | 48.1 |
|  |  | 45.0 |  |
|  |  | 50.3 |  |

Core Diameter [mm]= 75

Technical Report No. 5

Subject: ASTM C642 Boiled Absorption and Volume of Permeable Voids

| Specimen Identification | Absorption after Immersion [%] | Absorption after Immersion and Boiling [%] | Volume of Permeable Voids [%] | Bulk Specific Gravity after Immersion and Boiling [kg/m3] |
|---|---|---|---|---|
| F10A | 4.5 | 4.7 | 10.6 | 2345 |
| F10B | 4.0 | 4.2 | 9.6 | 2370 |
| F10C | 4.0 | 4.3 | 9.8 | 2368 |
| Average | 4.1 | 4.4 | 10.0 | 2361 |
| F15A | 4.5 | 4.8 | 9.0 | 1956 |
| F15B | 4.6 | 5.0 | 8.2 | 1735 |
| F15C | 4.6 | 5.1 | 11.2 | 2329 |
| Average | 4.6 | 4.9 | 9.5 | 2007 |
| F20A | 4.4 | 4.9 | 10.9 | 2331 |
| F20B | 4.3 | 4.9 | 10.8 | 2330 |
| F20C | 4.2 | 4.5 | 10.1 | 2340 |
| Average | 4.3 | 4.8 | 10.6 | 2333 |

Technical Report No. 6a

Subject: ASTM C1018 Toughness Parameters and Residual Strength Factors

Fiber Type: Hybrid Synthetic Fibers
Fiber Addition Rate: 1.0% by vol.

| Sample No. | First-Crack Strength (MPa) | Ultimate Strength (MPa) | Toughness Indices | | | Residual Strength Factors | |
|---|---|---|---|---|---|---|---|
|  |  |  | $I_{10}$ | $I_{30}$ | $I_{60}$ | $R_{10,30}$ | $R_{30,60}$ |
| F10A | 6.62 | 6.62 | N.A. | 8.6 | 18.7 | N.A. | 33.7 |
| F10B | 6.50 | 6.50 | N.A. | 7.0 | 16.1 | N.A. | 30.3 |
| F10C | 7.17 | 7.17 | N.A. | 4.8 | 11.3 | N.A. | 21.7 |
| Avg. | 6.77 | 6.77 | N.A. | 6.8 | 15.4 | N.A. | 28.6 |

N.A. = not available due to large initial deformations after first-crack

Technical Report No. 6b

Subject: Japanese Toughness Parameters and Toughness Performance Levels

Fiber Type: Hybrid Synthetic Fibers
Fiber Addition Rate: 1.0% by vol.

| Sample No. | First-Crack Strength (MPa) | Ultimate Strength (MPa) | Japanese Toughness Parameters | | Toughness Performance Levels |
|---|---|---|---|---|---|
|  |  |  | Toughness (kN · mm) | Toughness Factor (MPa) |  |
| F10A | 6.62 | 6.62 | 13.8 | 2.08 | III |
| F10B | 6.50 | 6.50 | 12.2 | 1.79 | III |
| F10C | 7.17 | 7.17 | 9.2 | 1.35 | II–III |
| Avg. | 6.77 | 6.77 | 11.7 | 1.74 | III |

Technical Report No. 6c
Subject: ASTM C1018 Toughness Parameters and Residual Strength Factors Fiber Type: Hybrid Synthetic Fibers
Fiber Addition Rate: 1.5% by vol.

| Sample No. | First-Crack Strength (MPa) | Ultimate Strength (MPa) | Toughness Indices | | | Residual Strength Factors | |
|---|---|---|---|---|---|---|---|
| | | | $I_{10}$ | $I_{30}$ | $I_{60}$ | $R_{10,30}$ | $R_{30,60}$ |
| F15A | 6.31 | 6.31 | N.A. | 8.1 | 18.4 | N.A. | 34.3 |
| F15B | 6.22 | 6.22 | N.A. | 8.5 | 18.9 | N.A. | 34.7 |
| F15C | 5.65 | 5.65 | N.A. | 18.5 | 35.5 | N.A. | 56.7 |
| Avg. | 6.06 | 6.06 | N.A. | 11.7 | 24.3 | N.A. | 41.9 |

N.A. = not available due to large initial deformations after first-crack

Technical Report No. 6d
Subject: Japanese Toughness Parameters and Toughness Performance Levels Fiber Type: Hybrid Synthetic Fibers
Fiber Addition Rate: 1.5% by vol.

| Sample No. | First-Crack Strength (MPa) | Ultimate Strength (MPa) | Japanese Toughness Parameters | | Toughness Performance Levels |
|---|---|---|---|---|---|
| | | | Toughness (kN · mm) | Toughness Factor (MPa) | |
| F15A | 6.31 | 6.31 | 12.7 | 1.99 | III |
| F15B | 6.22 | 6.22 | 13.1 | 2.00 | III |
| F15C | 5.65 | 5.65 | 22.3 | 3.33 | IV |
| Avg. | 6.06 | 6.06 | 16.0 | 2.44 | III |

Technical Report No. 6e
Subject: ASTM C1018 Toughness Parameters and Residual Strength Factors Fiber Type: Hybrid Synthetic Fibers
Fiber Addition Rate: 1.9% by vol.

| Sample No. | First-Crack Strength (MPa) | Ultimate Strength (MPa) | Toughness Indices | | | Residual Strength Factors | |
|---|---|---|---|---|---|---|---|
| | | | $I_{10}$ | $I_{30}$ | $I_{60}$ | $R_{10,30}$ | $R_{30,60}$ |
| F20A | 6.22 | 6.22 | N.A. | 18.1 | 34.0 | N.A. | 53.0 |
| F20B | 6.14 | 6.14 | 8.4 | 20.7 | 41.4 | 61.5 | 69.0 |
| F20C | 6.02 | 6.02 | 7.5 | 21.3 | 42.5 | 69.0 | 70.7 |
| Avg. | 6.13 | 6.13 | N.A. | 20.0 | 39.3 | N.A. | 64.2 |

N.A. = not available due to large initial deformations after first-crack

Technical Report No. 6f
Subject: Japanese Toughness Parameters and Toughness Performance Levels Fiber Type: Hybrid Synthetic Fibers
Fiber Addition Rate: 1.9% by vol.

| Sample No. | First-Crack Strength (MPa) | Ultimate Strength (MPa) | Japanese Toughness Parameters | | Toughness Performance Levels |
|---|---|---|---|---|---|
| | | | Toughness (kN · mm) | Toughness Factor (MPa) | |
| F20A | 6.22 | 6.22 | 22.0 | 3.45 | IV |
| F20B | 6.14 | 6.14 | 25.8 | 3.90 | IV |
| F20C | 6.02 | 6.02 | 29.7 | 4.63 | V |
| Avg. | 6.13 | 6.13 | 25.9 | 3.99 | IV |

Technical Report No. 7
Subject: Australian Round Panel Test Results

| Mix Number | Fiber Addition Rate % by vol. | Fiber Addition Rate kg/m³ | In situ Fiber Content % by vol. | Peak Load kN | Energy Nm = J 0–10 mm | Energy Nm = J 0–20 mm | Energy Nm = J 0–30 mm | Energy Nm = J 0–40 mm |
|---|---|---|---|---|---|---|---|---|
| F10 | 1.0 | 9.1 | 0.94 | 32.2 | 163 | 309 | 428 | 525 |
| F15 | 1.5 | 13.7 | 1.18 | 29.8 | 185 | 368 | 515 | 641 |
| F20 | 1.9 | 17.3 | 1.58 | 27.9 | 226 | 445 | 611 | 747 |

Example 3

The performance characteristics, strength and toughness, of concrete mixtures reinforced with the fibers of the present invention were analyzed. A number of three-dimensionally reinforced concrete specimens (beams and cylinders) using four fiber dosages (0.5, 1.0, 1.5, 2.0 percent by volume) had been cast and tested to evaluate the strength and toughness characteristics. The strength tests included the compressive strength, flexural strength (modulus of rupture), first crack strength, and impact strength. The toughness properties evaluated were modulus of elasticity. The toughness indexes I5, I10, I20, I30 and residual strengths were calculated according to the ASTM C 1018 test procedure, and the flexural toughness factor (JCI) and the equivalent flexural strength were calculated according to the Japanese Society of Civil Engineers standard specifications. A new test method (ASTM C1399-98) was also used to determine the average residual strength of the concrete mixtures reinforced with the four different dosages of the present fiber invention.

A total of four mixes, one for each fiber content were made. The basic mixture proportions were the same for all four concrete mixtures, except for two mixes with 1.5 and 2.0 percent by fiber volume, the workability was increased by increasing water cement ratio. The fiber reinforced concrete mixtures were mixed, placed, consolidated, finished and cured under identical conditions. The test results indicate that there was no balling or segregation due to the addition of fibers at the recommended dosages for all four mixes.

Test results show that there was a significant increase in the flexural strength and a slight increase in the first crack strength as the fiber content was increased from 0.5 to 2.0 percent by volume. The ASTM toughness indexes and the Japanese toughness factors and equivalent flexural strengths were also significantly increased as the fiber content increased. There was also a significant increase in impact strength for an increase in fiber content.

Test results further show that very high average residual strengths (ARS) (ASTM C1399) were obtained and the ARS values increased as the fiber content increased. The ARS values were 234 psi, 451 psi, 454 psi, and 654 psi for fiber contents of 0.5, 1.0, 1.5, 2.0 percent by volume, respectively.

Overall, the performance of reinforced concrete incorporating the fibers of the present invention were similar and/or better than the concretes reinforced with the best steel fibers available in the market compared on an equal weight or cost basis. The following performance related tests were performed to determine the physical characteristic of the fibers of the present invention: 1) the properties of fresh concretes with different dosages of fibers; 2) the properties of hardened concretes such as compressive strength, static modulus, static flexure strength, and unit weight; 3) the toughness indices by the ASTM method with the help of load deflection curves; 4) comparisons in the load deflection curves for the four fiber reinforced concretes; 5) comparisons in the toughness factor and equivalent flexural strength calculated according to the Japanese Society of Civil Engineers specifications; and 6) evaluation in the average residual strength (ARS) according to ASTM C 1399 test procedure for the specimens made from all four mixes.

Materials

Hybrid fibers as described herein were used and tested in this experiment. Type I/II Normal Portland cement satisfying ASTM C 150 requirements was used. The cement was supplied by Dakotah Cement, South Dakota. The coarse aggregate used was crushed limestone, obtained from a local source in Rapid City, S.D. The maximum size of the aggregate used was 19 mm (¾") with absorption of 0.45%. The fine aggregate used was natural sand with a water absorption coefficient of 1.6%. Both the coarse and fine aggregates were according to the grading requirements of ASTM C33. The water used was tap water from the Rapid City Municipal water supply system.

Mixes

A total of 4 mixes were prepared. The dosages of fibers added to the concrete were in amounts of 0.5, 1.0, 1.5 and 2.0 percent by volume of concrete. The water cement ratio was kept constant at 0.5 for two mixes with 0.5 and 1.0 percent by volume of fiber and it was increased to 0.55 for concrete with higher dosages of fibers (1.5 and 2.0 percent by volume). The mix proportions and designations are given in Table 4, below.

Mixing Procedure

All mixing was performed in a nine cubic feet capacity mixer. The fibers were weighed accurately and kept in a separate plastic container. First the buffer mix was prepared. Next, coarse aggregates were introduced into the mixer. Thereafter, sand and two thirds of the water were added and mixed for one minute. Cement was then added along with the remaining one third of the water. The fibers of the present invention were added and the ingredients were mixed for three minutes. Following a three minute rest period, the mixture underwent a final mixing stage for 2 minutes to completely distribute the fibers.

Test Specimens

The following specimens were cast from each mix: 1) four 101×101×356 mm (4 in×4 in×14 in) beams for ASTM toughness test; 2) four 101×101×356 mm (4 in×4 in×14 in) beams for ARS Test (ASTM C 1399); 3) three 152×304 mm (6 in×12 in) cylinders for compressive strength and static modulus; and 4) ten 152×63 mm (6 in×2.5 in.) cylinders for impact test. The specimens were cast according to the ASTM standards and covered with plastic sheets for 24 hours at room temperature. The specimens were then placed in a lime saturated water tank maintained at 22.22° C. (72° F.), and remained in water till they were tested for 14-day strengths.

Tests for Fresh Concrete

Freshly mixed concrete was tested for slump (ASTM C143), air content (ASTM C231), fresh concrete unit weight (ASTM C 138), and concrete temperature. No balling or segregation was observed due to the addition of fibers.

Tests for Hardened Concrete

1. Static Modulus and Compressive Strength

Cylinders were tested for static modulus (ASTM C469) and compressive strength (ASTM C39) at 28 days.

2. Static Flexure Test

Beams were tested at 28 days for the static flexural strength (ASTM C 1018). The span length was 12 inches. This test is a deflection-controlled test. The rate of deflection was kept in the range of 0.002 to 0.004 inches per minute as per ASTM C 1018. The load at first crack and the maximum load reached were noted for every beam. From the load and deflections obtained, load-deflection curves were drawn from which the toughness indices and the residual strength factors by ASTM method were calculated.

The deflection measurements were performed using test apparatus according to ASTM standards. A specially designed frame was used to mount the dial gauge. This frame was supported only at the four points, which was on the neutral axis above the supports. The dial gauge was fixed such that it was touching the center point of the bottom surface. This arrangement allowed for the measure of the true deflection excluding any extraneous deformations due to crushing of concrete at supports and load points, and any deformations and strains induced in the testing frame. Because the deflection is measured at the center point, any slight warping or twisting of beam will not affect true deflections measured. Hence the deflections measured were the true deflections of the beam.

3. Load Deflection Behavior

The area under the curve represents the energy absorbed by the beam. Load deflection curves for both the pre first crack and post first crack data, were drawn. Toughness indices and the residual strength indices' were calculated by using these curves.

4. Flexural Toughness (Energy Absorption)

Toughness, or energy absorption, of concrete is increased considerably by the addition of fibers. Toughness index is the measure of the amount of energy required to deflect the 100 mm (4 in) beam in the modulus of rupture test. The most important variable governing the toughness index of fiber reinforced concrete is the fiber efficiency. Other parameters influencing the toughness index are the position of the crack, the fiber type, aspect ratio, volume fraction and the distribution of fibers. Fiber efficiency is controlled by the resistance of the fiber to pull out from the matrix, which is developed as a result of the bond strength at the fiber matrix interface. The advantage of pullout type of failure of fiber is that, it is gradual and ductile, compared to a more rapid and catastrophic failure, which may occur, if fibers are brittle and fail in tension with little or no elongation. The fiber pullout or fracture depends on the yield strength of the fibers, the bond and anchorage between the matrix and the fiber.

Toughness index (ASTM C1018) is a dimensionless parameter, which defines or finger prints the shape of the load deflection curve. Indices have been defined on the basis of three service levels, identified as the multiples of the first crack deflection. The index is computed by dividing the total area under the load deflection curve up to the first crack deflection. The toughness index 15 is calculated at three times the first crack deflection. Likewise I10, I20 and I30 are the indices up to 5.5, 10.5 and 15.5 times the first crack deflection respectively.

5. Average Residual Strength Test

The rate of platen or crosshead movement was set at 0.65+/−0.15 mm/min (0.025+/−0.005 in/min), using the mechanical dial gauge when necessary, before the specimen was loaded. The sample beam was turned on its side with respect to its position as molded and placed on top of the steel plate to be loaded with the specimen. The plate and the beam were placed on the support apparatus so that the steel plate was centered on the lower bearing blocks and the concrete beam was centered on the steel plate. The displacement transducers were adjusted according to the chosen apparatus for obtaining net deflection. Mega-Dac data acquisition system was used in the test. (Note: The purpose of the stainless steel plate is to support the test beam during the initial loading cycle and help control the expected high rate of deflection of the specimen upon cracking. A center hole was placed in the steel plate to accommodate placing a displacement transducer probe directly against the bottom of the test sample.)

A data acquisition system was activated and it was responded to signals from all load and displacement transducers. Thereafter, the specimen and steel plate combination were loaded at the set rate and the loading was continued until the specimen cracked or it reached a deflection of 0.50 mm (0.02 in), whichever occurred first. If cracking had not occurred at this stage, the test is considered invalid. The maximum load to calculate modulus of rupture was not used in accordance with Test Method C 78 as this load includes load carried by the steel plate as well as by the concrete specimen.

In anticipation of reloading the cracked beam specimen only, the steel plate was removed and the cracked beam was centered on the lower bearing blocks retaining the same orientation as during the initial loading test cycle. The displacement transducers were adjusted to lightly contact the beam sample in accordance with the chosen method for obtaining net deflection so that readings were immediately obtained upon beam reloading. The deflection-recording device was again brought to zero and reloaded at the specified rate. The test was terminated at a deflection of 1.25 mm (0.50 in) as measured from the beginning of reloading.

Using the Excel package the graphs were drawn and the residual strengths were calculated by the formulas given below.

Test Apparatus and Set-Up

The test apparatus satisfied the ASTM standards. A specially designed frame was used to mount the dial gauge with 0.0025-mm (0.0001-in.) resolution. This frame was supported only at the four points, which are on the neutral axis above the supports. The dial gauge was fixed such that it was touching the center point of the bottom surface. This arrangement enabled the measurement of the true deflection excluding any extraneous deformations due to crushing of concrete at supports and load points and any deformations and strains induced in the testing frame. Because the deflection is measured at the center point, any slight warping or twisting of beam will not affect true deflections measured. In addition to the dial gage, LVDT was also mounted and the deflections were recorded by a data acquisition system. These readings were used for verification of dial gage readings.

Calculations

The average residual strength for loads at reloading deflections of 0.50, 0.75, 1.00, and 1.25 mm (0.02, 0.03, 0.04, and 0.05 in) are calculated using the following formula:

$$ARS=((P_A+P_B+P_C+P_D)/4) \times K$$

where $K=1/bd^2$, $mm^{-2}$ (($in^{-2}$) and

ARS=Average Residual strength, Mpa (psi)

$P_A+P_B+P_C+P_D$=recorded loads at specified deflections, N (lbf)

l=span length, mm (in), b=average width of specimen, mm (in) and d=average depth of specimen, mm (in)

Impact Test

The specimens were tested for impact strength at an age of 14 days by the drop weight test method (ACI Committee 544). In this method, the equipment consisted of a standard manually operated 4.54 kg (10 lbs) weight with a 457 mm (18 inch) drop (compactor), a 63.5 mm (2½ inch) diameter hardened steel ball, a flat steel base plate with a positioning bracket and four positioning lugs. The specimen was placed on the base plate with its rough surface facing upwards. The hard steel ball was placed on the top of the specimen and within the four positioning brackets. The compactor was placed with its base on the steel ball. The test was performed on a flat rigid surface to minimize the energy losses. The hammer was dropped consecutively, and the number of blows required to cause the first visible crack on the specimens was recorded. The impact resistance of the specimen to ultimate failure was also recorded by the number of blows required to open the crack sufficiently so that the pieces of specimen were touching at least three of the four positioning lugs on the base plate.

Test Results

1. Fresh Concrete Properties

Room temperature, humidity and concrete temperature were recorded to ensure that all the mixes were carried out under similar conditions. The room temperature and humidity varied in the range of 65° F. to 85° F. and 35% to 45% respectively. The concrete temperature varied from 65 to 73° F. (18.3–22.8° C.). The unit weights of higher dosage fiber concrete were slightly less than the concretes with lower fiber dosages. The fresh concrete properties are given in Table 5.

2. Workability

The test results indicate that satisfactory workability can be maintained even with the addition of the fibers. The concrete started to harden in about 40 to 45 minutes. The fibers mixed well and were uniformly distributed throughout the concrete. Overall, there was no bridging, bleeding or segregation. Even though the slump values show the decreasing trend with the addition of the fibers, no difficulty was encountered in placing and consolidating the concrete with the use of the table vibrator.

3. Air Content

The air content ranged from 1.4 to 1.8%. No air-entraining agent was used. Therefore the measured air is considered as entrapped air.

Hardened Concrete Properties

1. Compressive Strength & Static Modulus Test

The results of the compressive strength test are tabulated in Table 6 and show that there is a variation in the compressive strength. Compressive strength depends on water cement ratio and air content. If the water cement ratio is less, compressive strength will be more. Likewise, if the air content is more, the compressive strength will be less.

The average compressive strengths for mixes E1 and E2 with 0.50 w/c ratios were 4960 psi and 4760 psi, respectively. This slight variation is within the normal variation expected in concrete testing. The average compressive strength for mixes E3 and E4 with 0.55 w/c ratios were 3570 Psi and 3860 Psi respectively.

Because the concrete compressive strengths varied, a normalization procedure was used in order to compare the flexural strength, first crack strength, and first crack toughness for all concrete mixtures on an equal compressive strength basis. The comparison was made on the compressive strength of mix E1, which is 4960 psi. It was well-established in literature and codes that the flexural strength of concrete varies proportionally to the square root of the compressive strength of concrete (ACI code 318). Therefore, for the calculation of normalized flexural strength, the following equation was used.

$$f_r = \frac{f_{ra}\sqrt{4960}}{\sqrt{f_c'}}$$

where $f_{ra}$ is the actually measured flexural strength and $f_c'$ is the compressive strength of that particular concrete. The values given in Tables 7 to 9 are normalized values.

A ductile mode of failure, as compared to plain concrete's brittle failure, was observed while testing for compressive strength. The fiber reinforced concrete cylinders continued to sustain the load and underwent deformation without totally breaking into pieces. The change of mode of failure from a brittle type to a ductile type is an important contribution due to the addition of fibers.

The static modulus test served primarily as a means of quality control. The results indicate that the mixes were reasonably consistent and the addition of fibers had no effect on the static modulus. The static modulus values are given in Table 6.

2. Static Flexural Strength (Modulus of Rupture)

Figure 7:
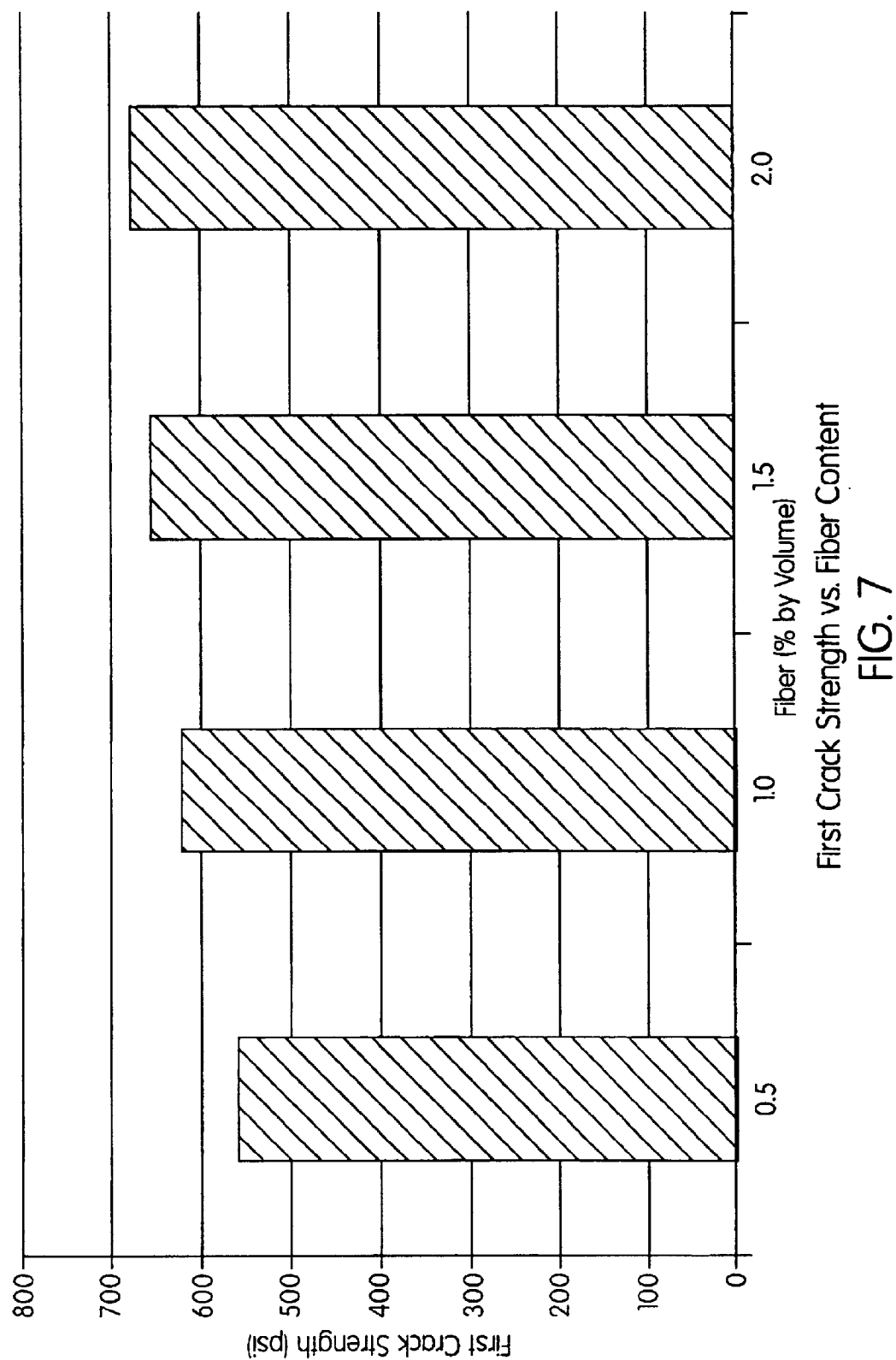
FIG. 7 illustrates a comparison between the first crack strength in slabs containing different amounts of the synthetic fiber blends of the present invention based on percent by volume.
Figure 8:
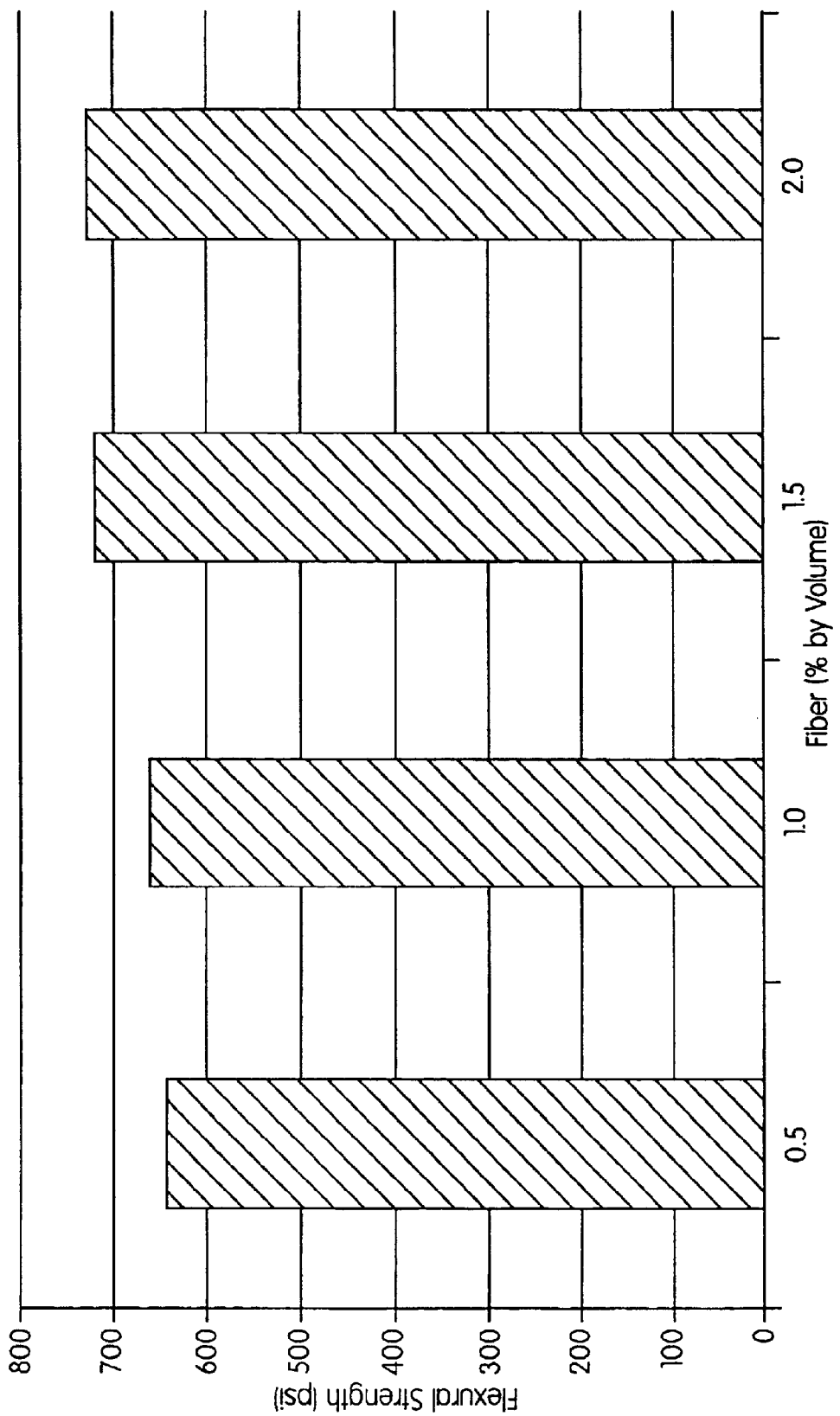
FIG. 8 illustrates a comparison between the modulus of rupture in slabs containing different amounts of the synthetic fiber blends of the present invention based on percent by volume.

The static flexural strength test results, the first crack load, ultimate load and flexural stress are given in Table 7. When the fiber concrete beams were loaded in flexure, the behavior was approximately linear up to the first crick and then the curve was significantly non-linear and reached its peak at the ultimate strength, or at the maximum sustained load. In contrast, the control (plain) concrete beams would fail immediately at the appearance of the first crack and hence the first crack strength and flexural strength (modulus of rupture) would be the same for control concrete. The factors that significantly influence the flexural strength and the toughness are the fiber type and the fiber volume. The first crack strength variation versus fiber content is shown in FIG. 7. As illustrated, there is an increase in the first crack strength as the fiber content increased from 0.5 to 2.0 percent. The modulus of rupture (static flexural strength) versus fiber content is shown in FIG. 8. As illustrated, there is a significant increase in the flexural strengths for 1.5 and 2.0 percent fiber contents. The average flexural strength for mixes E1 and E2 were 643 psi and 658 psi respectively whereas for mixes E3 and E4, the strengths were 720 psi and 731 psi respectively which is a 13.7 percent increase.

3. ASTM Toughness Indexes and Residual Strengths

Figure 9:
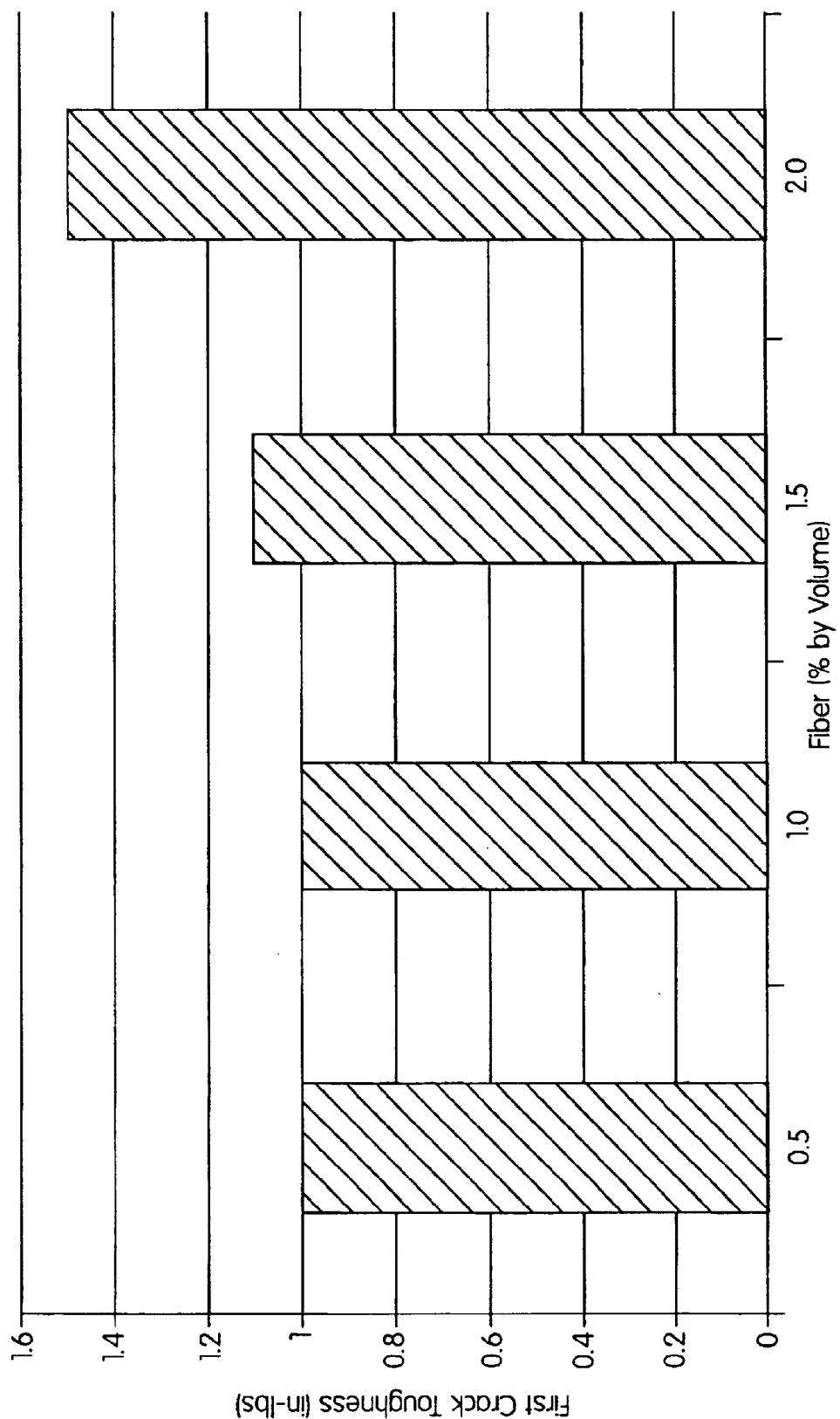
FIG. 9 illustrates a comparison between the first crack toughness in slabs containing different amounts of the synthetic fiber blends of the present invention based on percent by volume.
Figure 10:
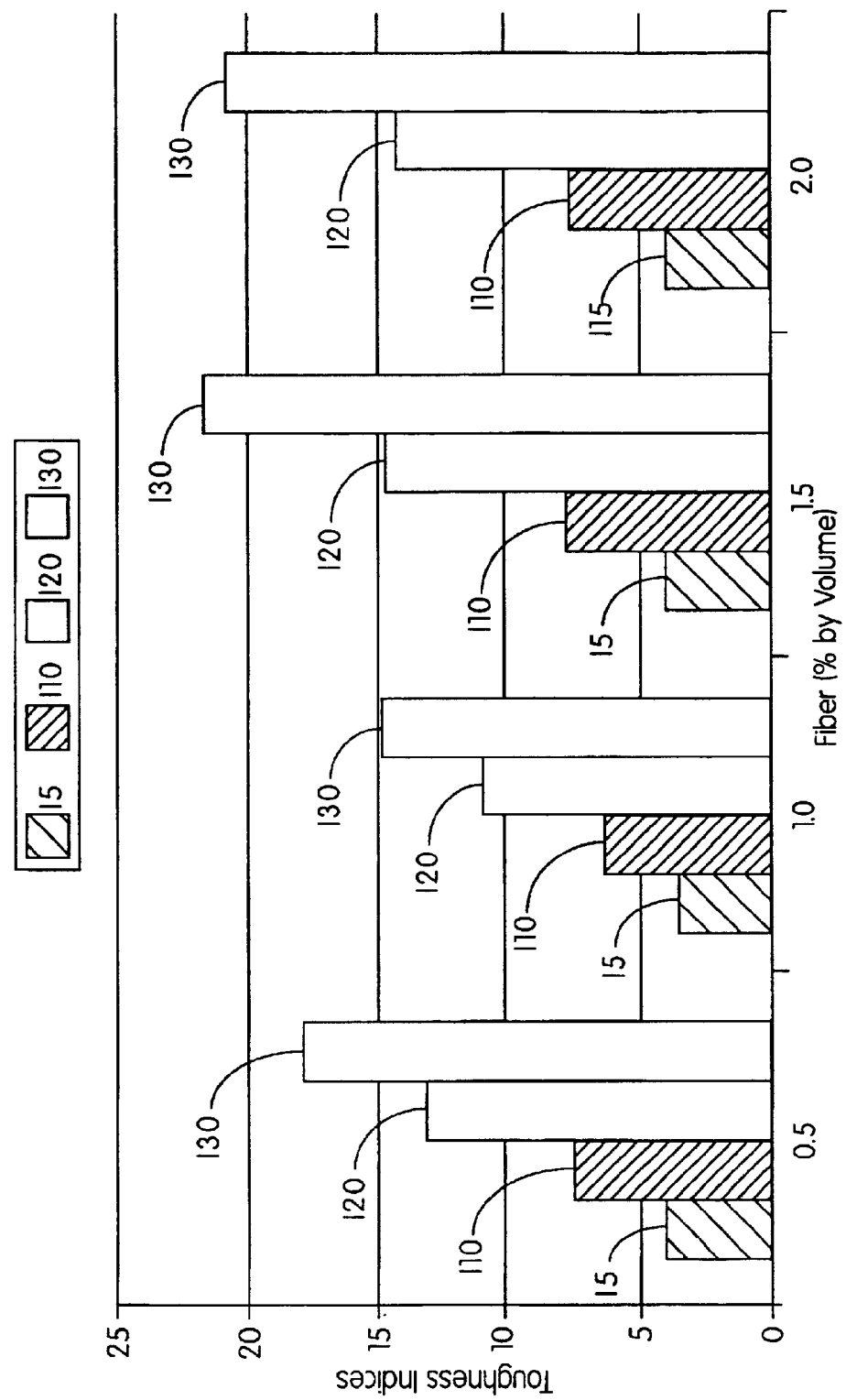
FIG. 10 illustrates toughness indices versus fiber content in concrete slabs having different amounts of the synthetic fiber blends of the present invention based on percent by volume.

The calculated ASTM toughness indexes and residual strengths are given in Table 8. The first crack toughness versus fiber content is shown in FIG. 9 and the ASTM toughness indexes I5, I10, I20, and I30 are shown in FIG. 10. The test results show that when the fibers of the present invention are added to the concrete there is an increase in the toughness and ductility of the concrete. Moreover, the test results show that higher fiber content produces a higher toughness and ductility.

Figure 11:
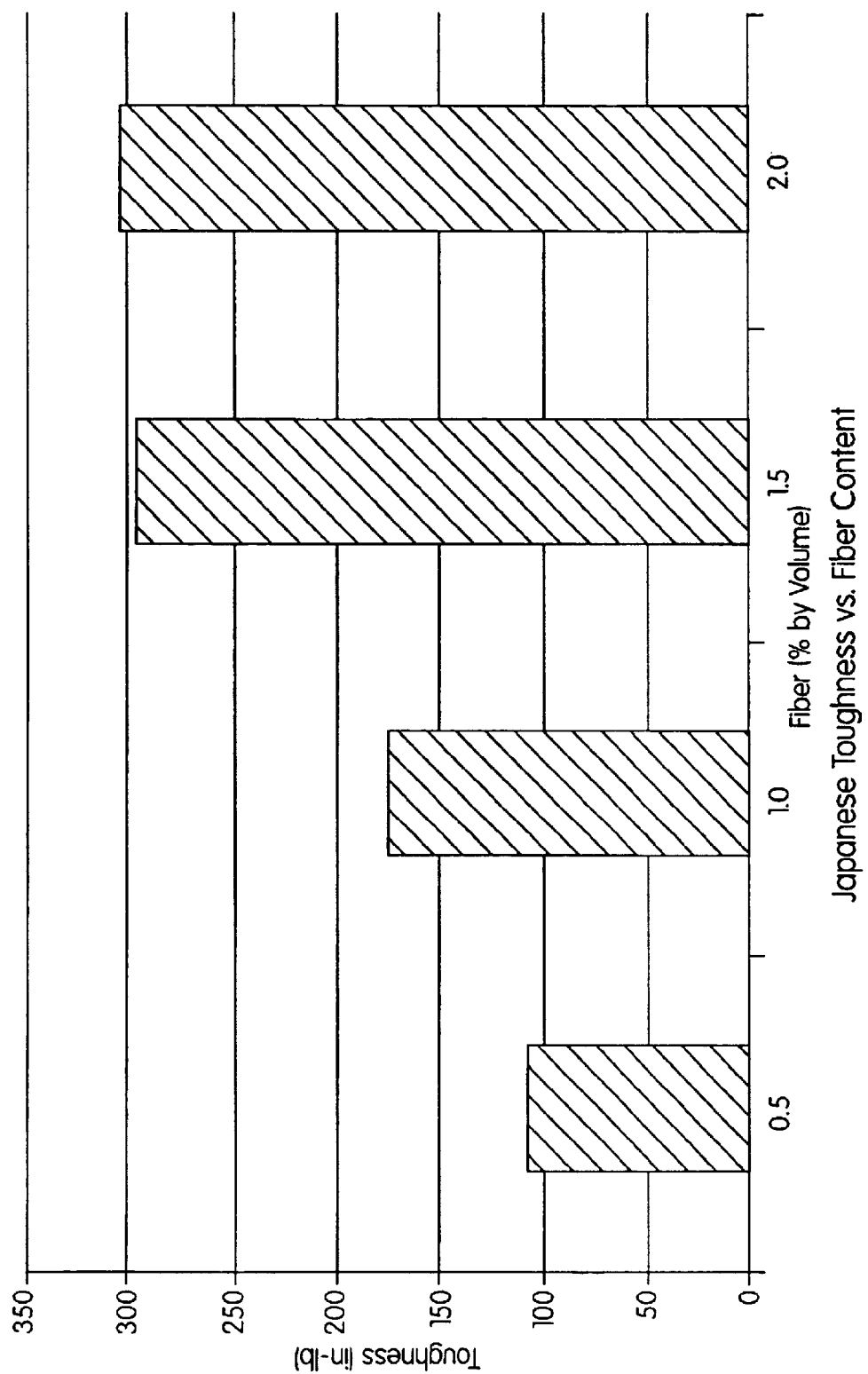
FIG. 11 illustrates Japanese toughness indices versus fiber content in concrete slabs having different amounts of the synthetic fiber blends of the present invention based on percent by volume.
Figure 12:
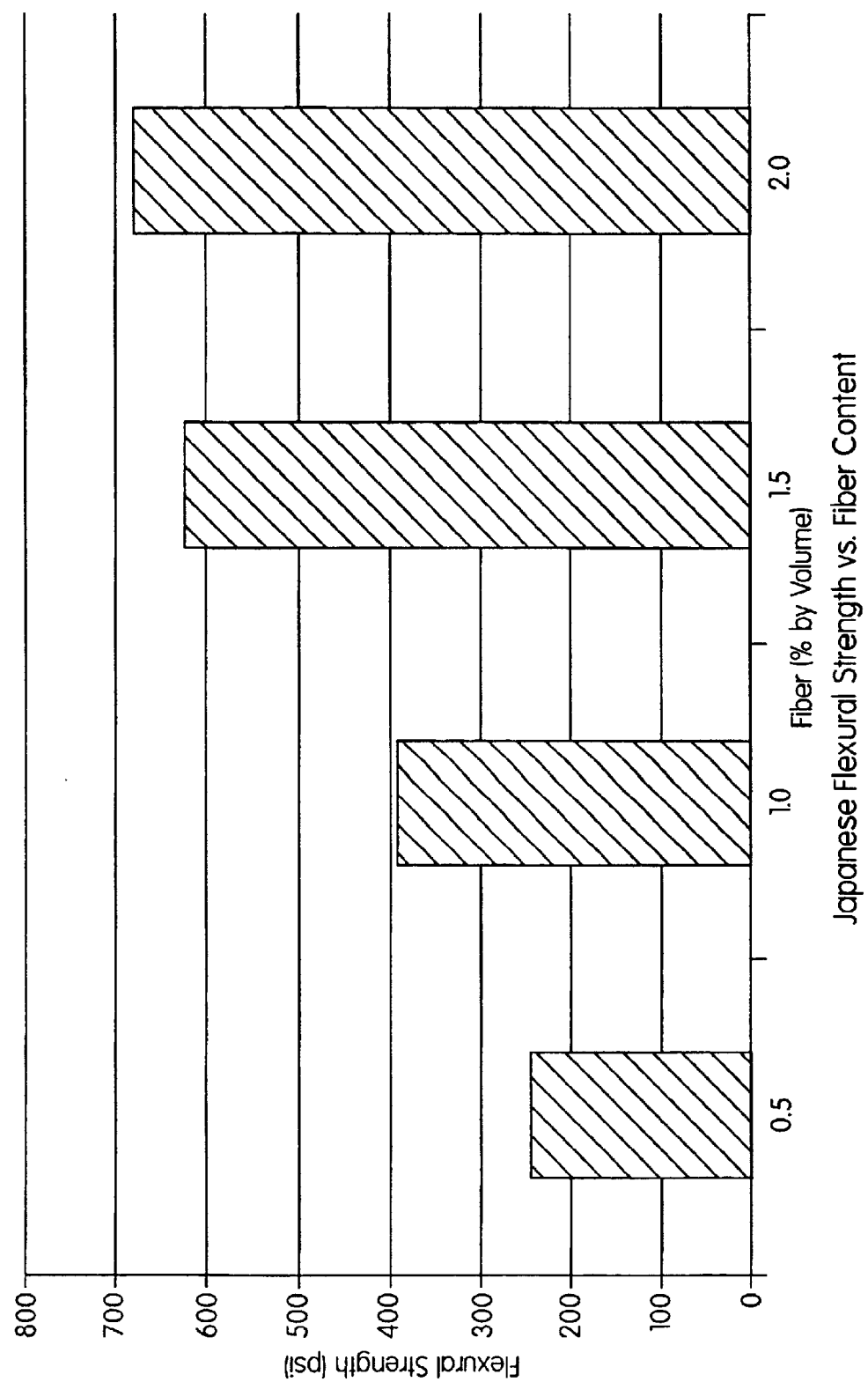
FIG. 12 illustrates Japanese flexural strength versus fiber content in concrete slabs having different amounts of the synthetic fiber blends of the present invention based on percent by volume.
Figure 13:
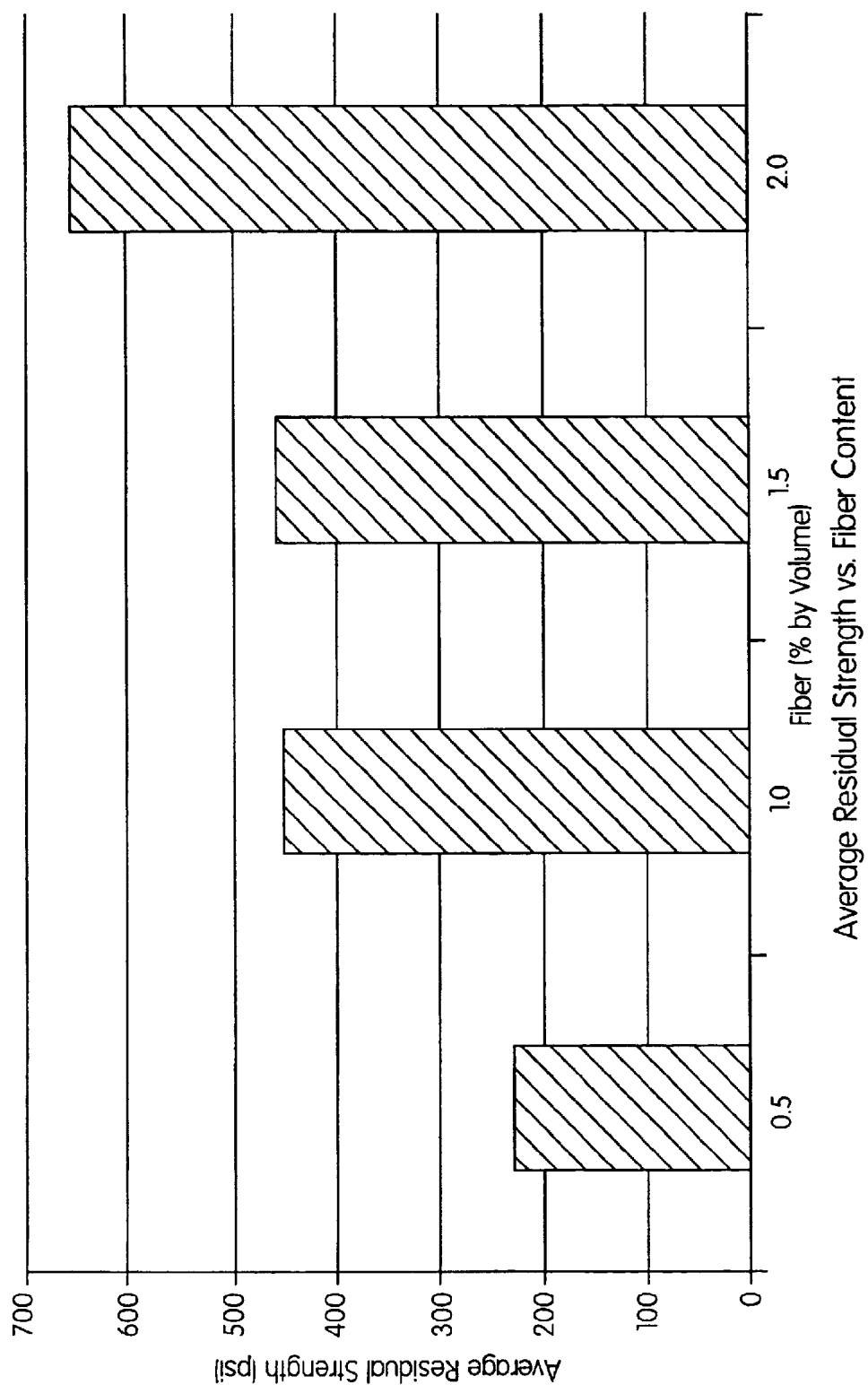
FIG. 13 illustrates average residual strength versus fiber content in concrete slabs having different amounts of the synthetic fiber blends of the present invention based on percent by volume.

4. Japanese Standard Method of Calculating Flexural Toughness Factor and Equivalent Flexural Strength In addition to the ASTM C-1018 toughness indexes, the equivalent flexural strength and the flexural toughness, as specified by the Japanese Society of Civil Engineers (JSCE) were calculated for all the specimens and are given in Table 9. The variation of the Japanese toughness and the equivalent flexural strength with an increase in fiber content from 0.5 to 2.0 percent by volume are shown in FIGS. 11 and 12, respectively. The results show that there is a very clear indication that the toughness and equivalent flexural strength increases with an increase in fiber content and this increase is approximately linear with the increase in fiber content. The toughness increased from 108 in-lbs to 304 in-lbs as the fiber content increased from 0.5 to 2.0 percent. The equivalent flexural strength increased from 244 psi to 679 psi with an increase in fiber content from 0.5 to 2.0 percent.

5. Impact Strength

Figure 14:
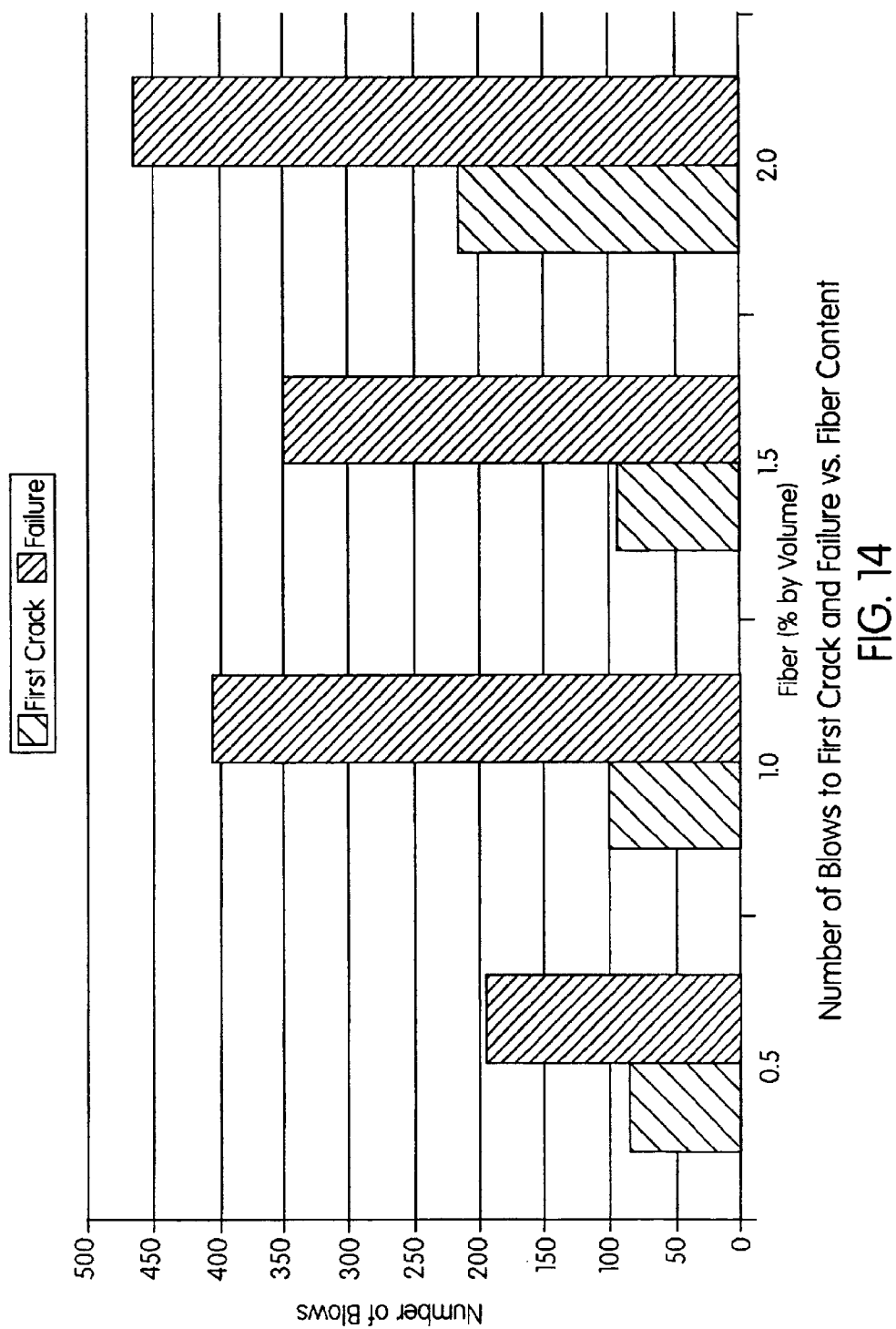
FIG. 14 illustrates the number of blows to first crack and failure versus fiber content in concrete slabs having different amounts of the synthetic fiber blends of the present invention based on percent by volume.
Figure 15:
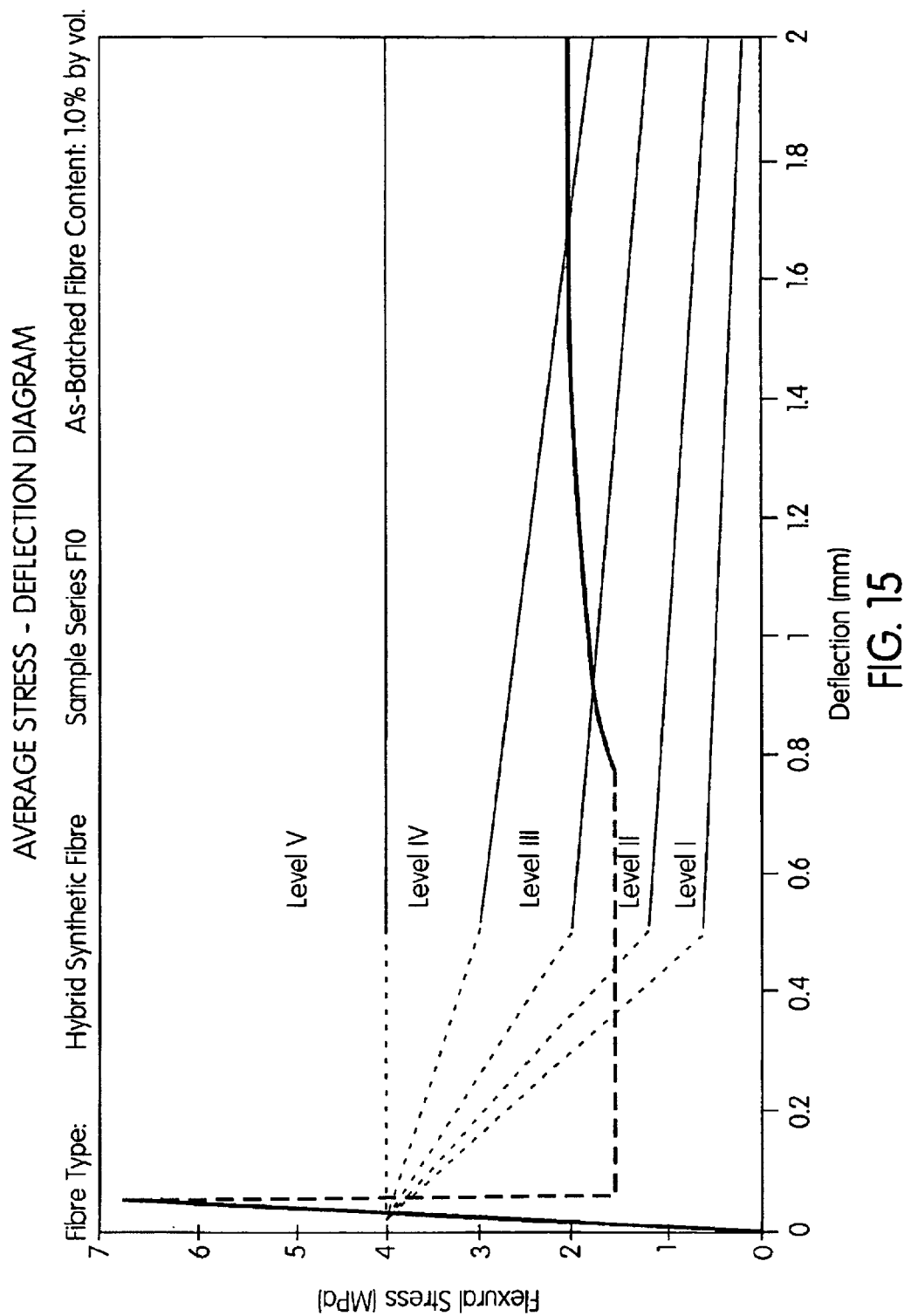
FIG. 15 illustrates an average stress-deflection diagram comparing flexural stress versus deflection at 1.0% by volume.
Figure 16:
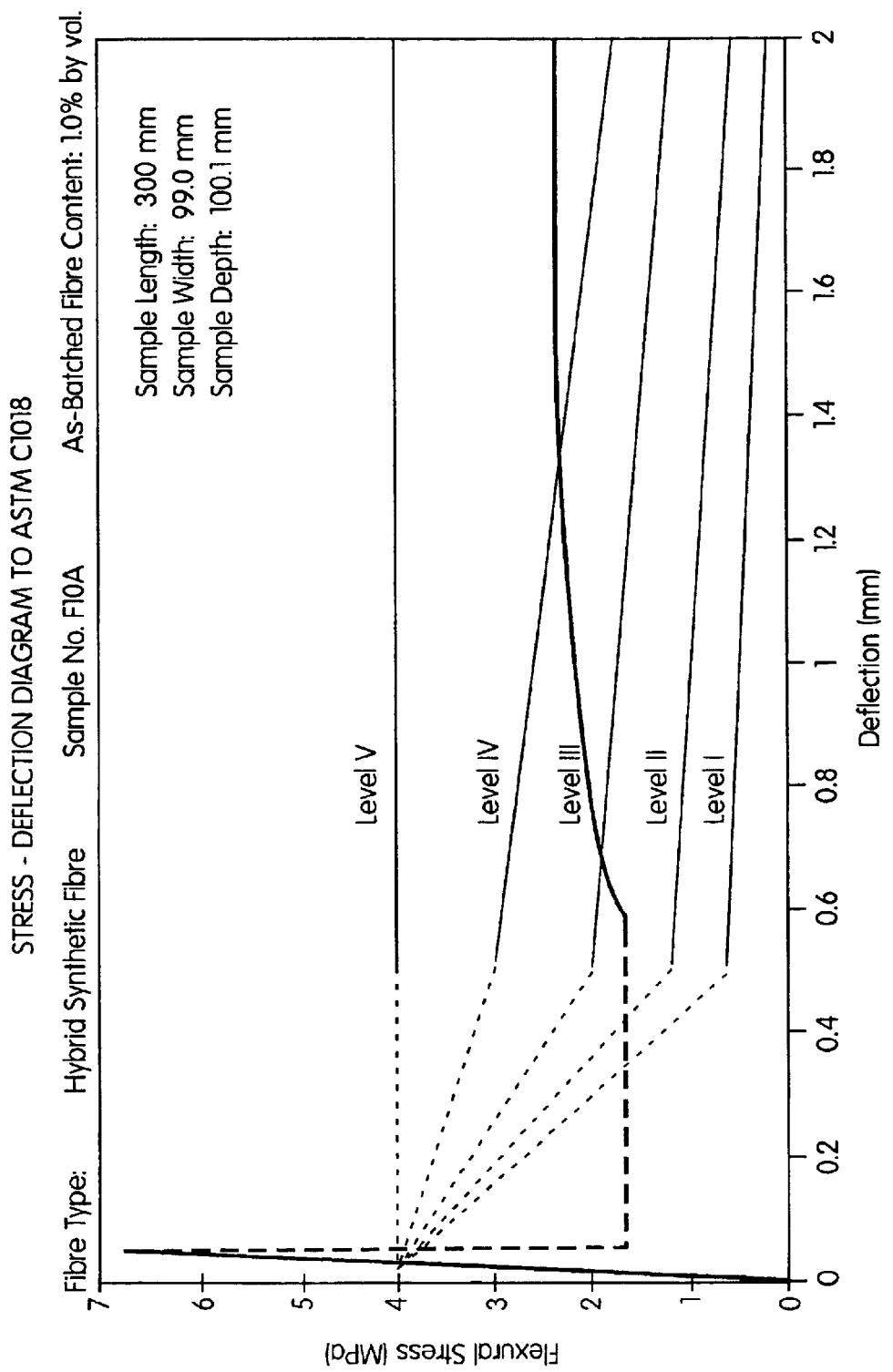
FIG. 16 illustrates a stress-deflection diagram comparing flexural stress versus deflection of the synthetic fiber blends of the present invention at 1.0% by volume.
Figure 17:
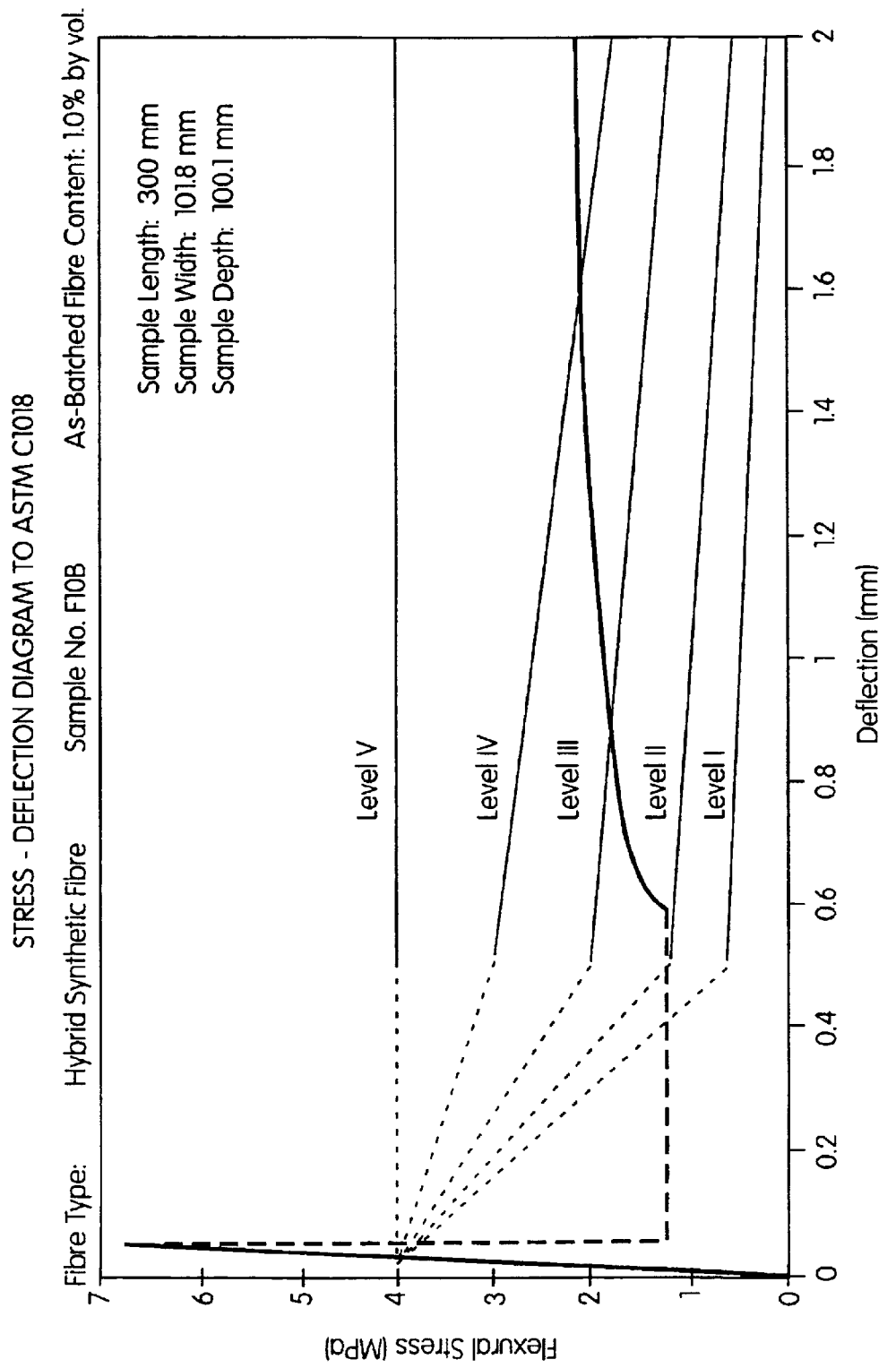
FIG. 17 illustrates a stress-deflection diagram comparing flexural stress versus deflection of the synthetic fiber blends of the present invention at 1.0% by volume.
Figure 18:
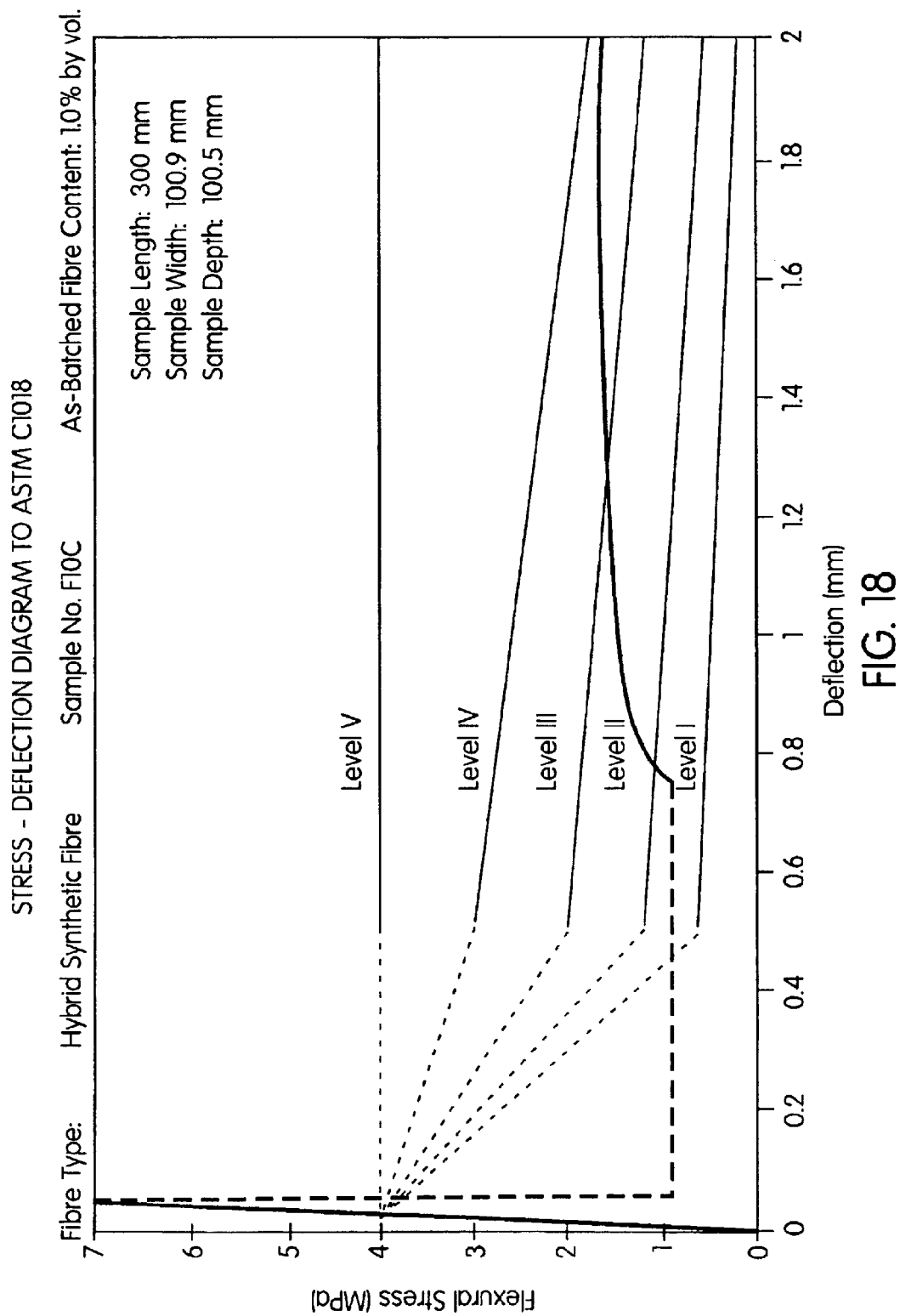
FIG. 18 illustrates a stress-deflection diagram comparing flexural stress versus deflection of the synthetic fiber blends of the present invention at 1.0% by volume.
Figure 19:
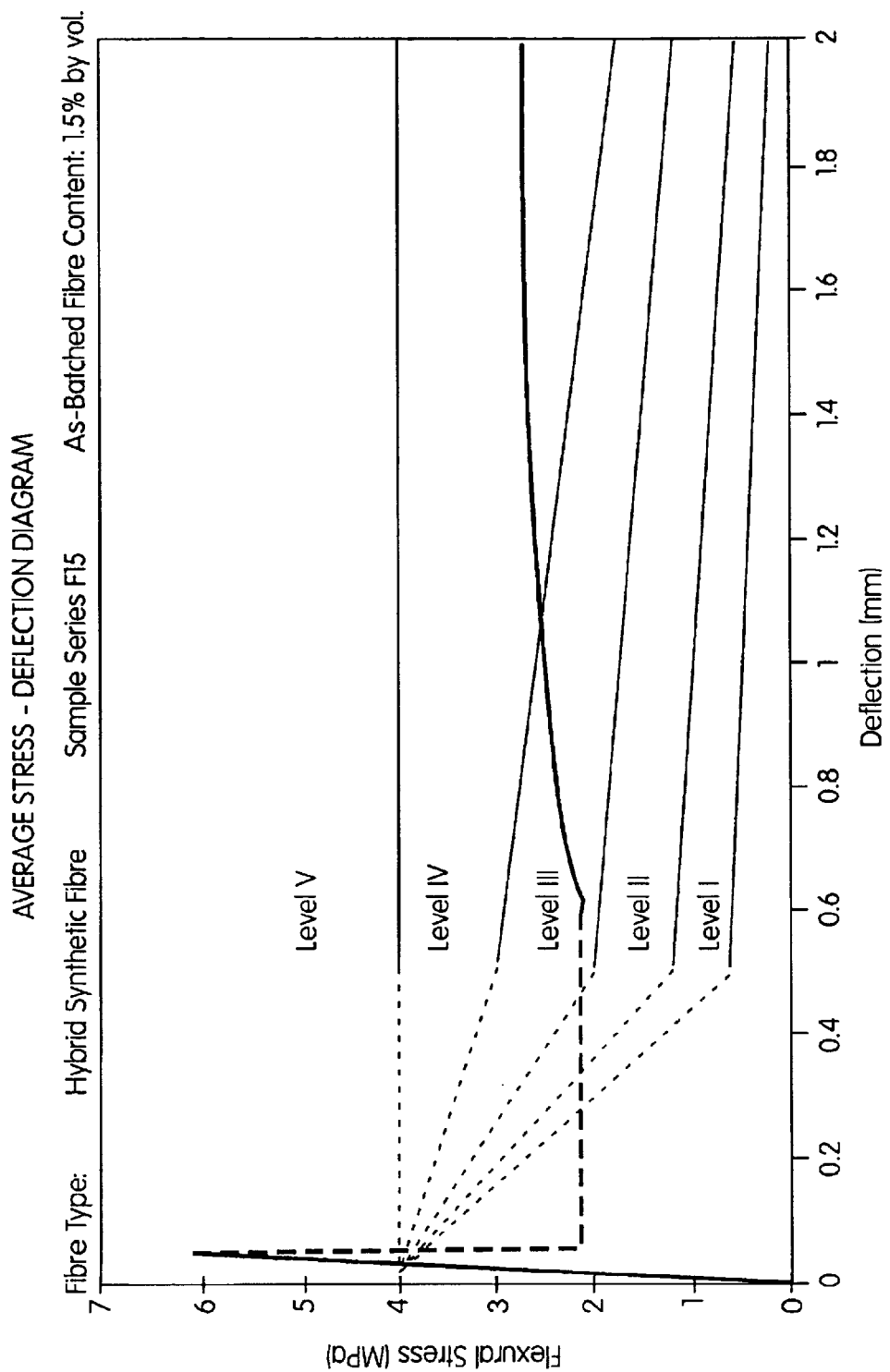
FIG. 19 illustrates a stress-deflection diagram comparing flexural stress versus deflection of the synthetic fiber blends of the present invention at 1.5% by volume.
Figure 20:
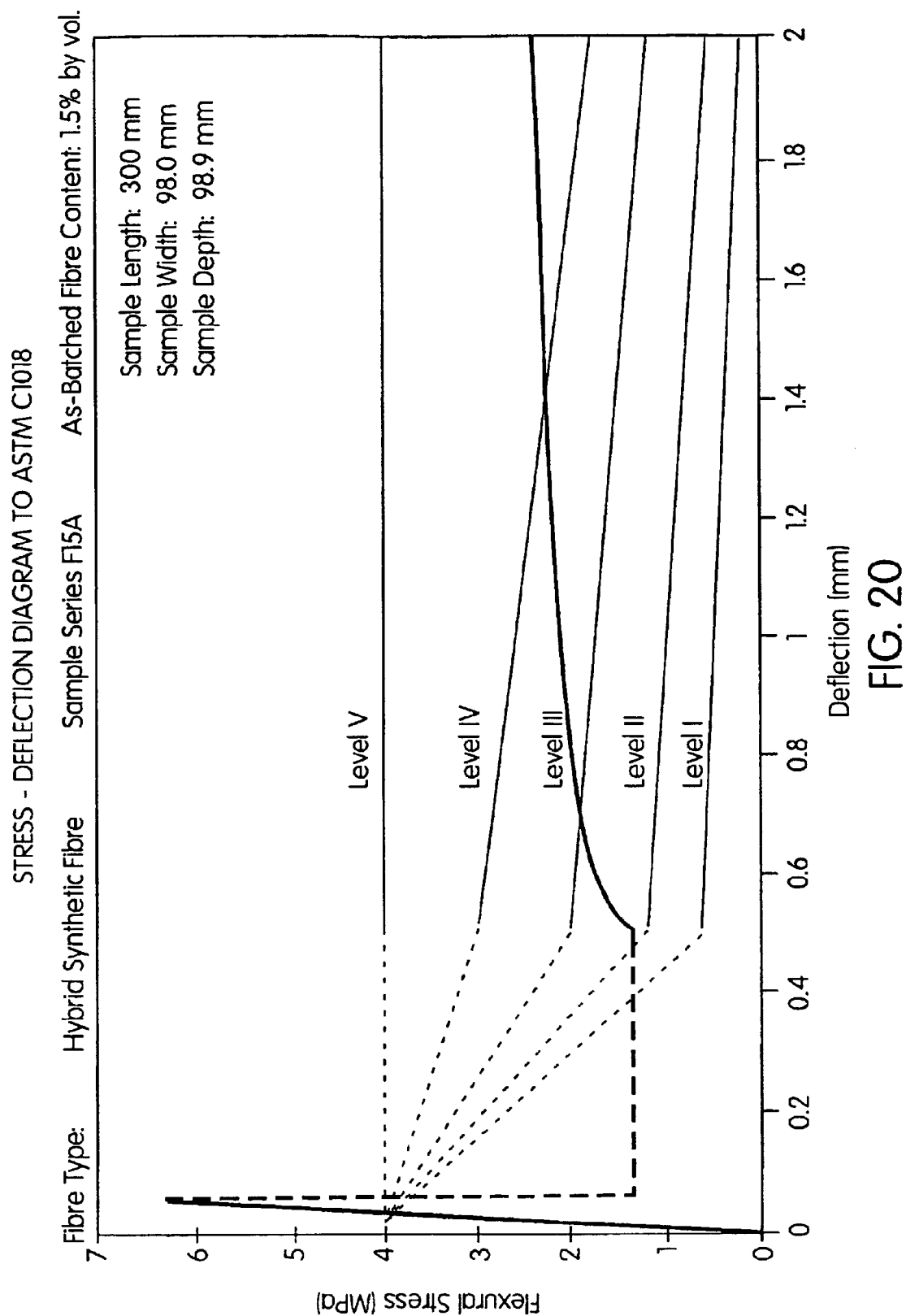
FIG. 20 illustrates a stress-deflection diagram comparing flexural stress versus deflection of the synthetic fiber blends of the present invention at 1.5% by volume.
Figure 21:
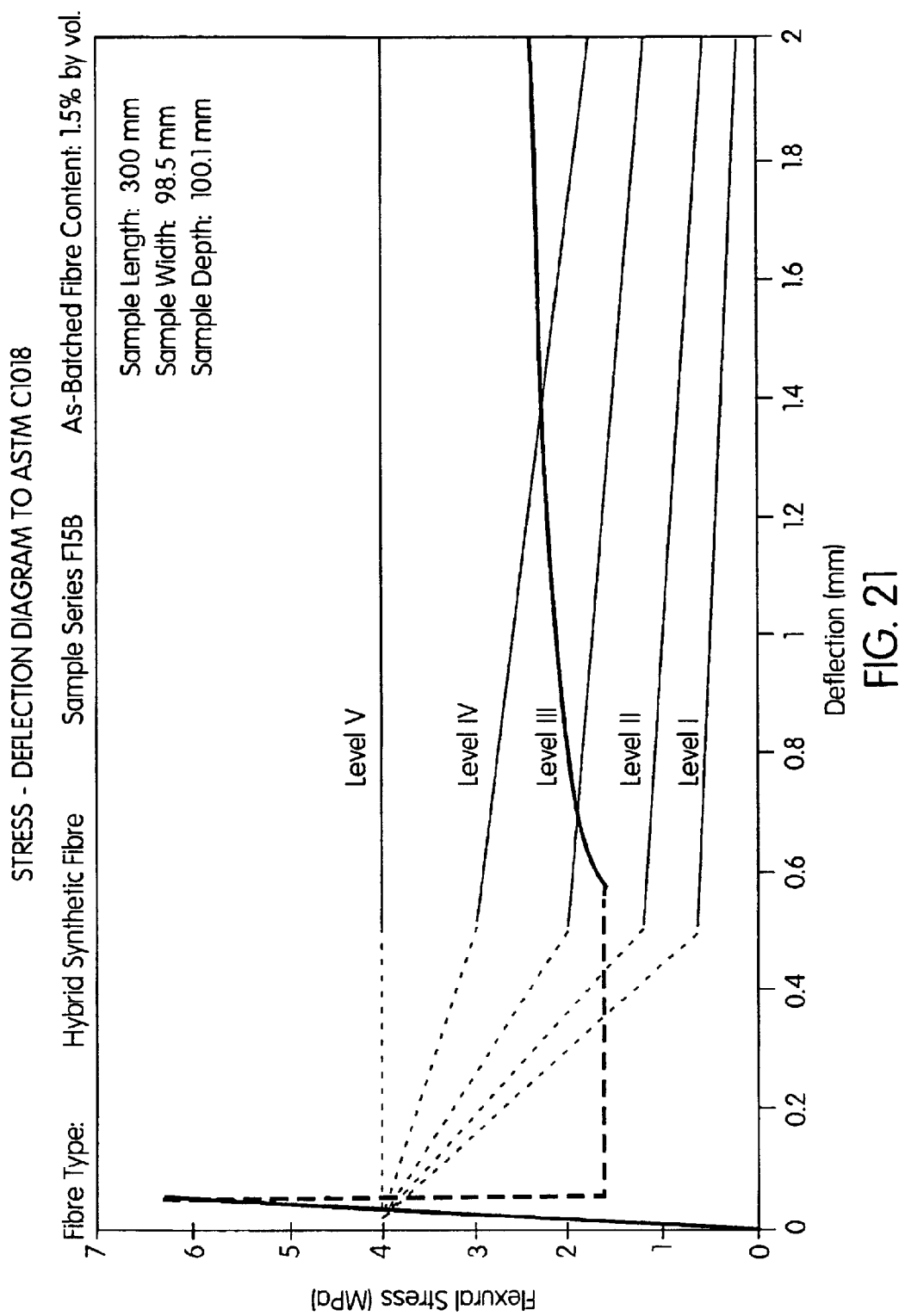
FIG. 21 illustrates a stress-deflection diagram comparing flexural stress versus deflection of the synthetic fiber blends of the present invention at 1.5% by volume.
Figure 22:
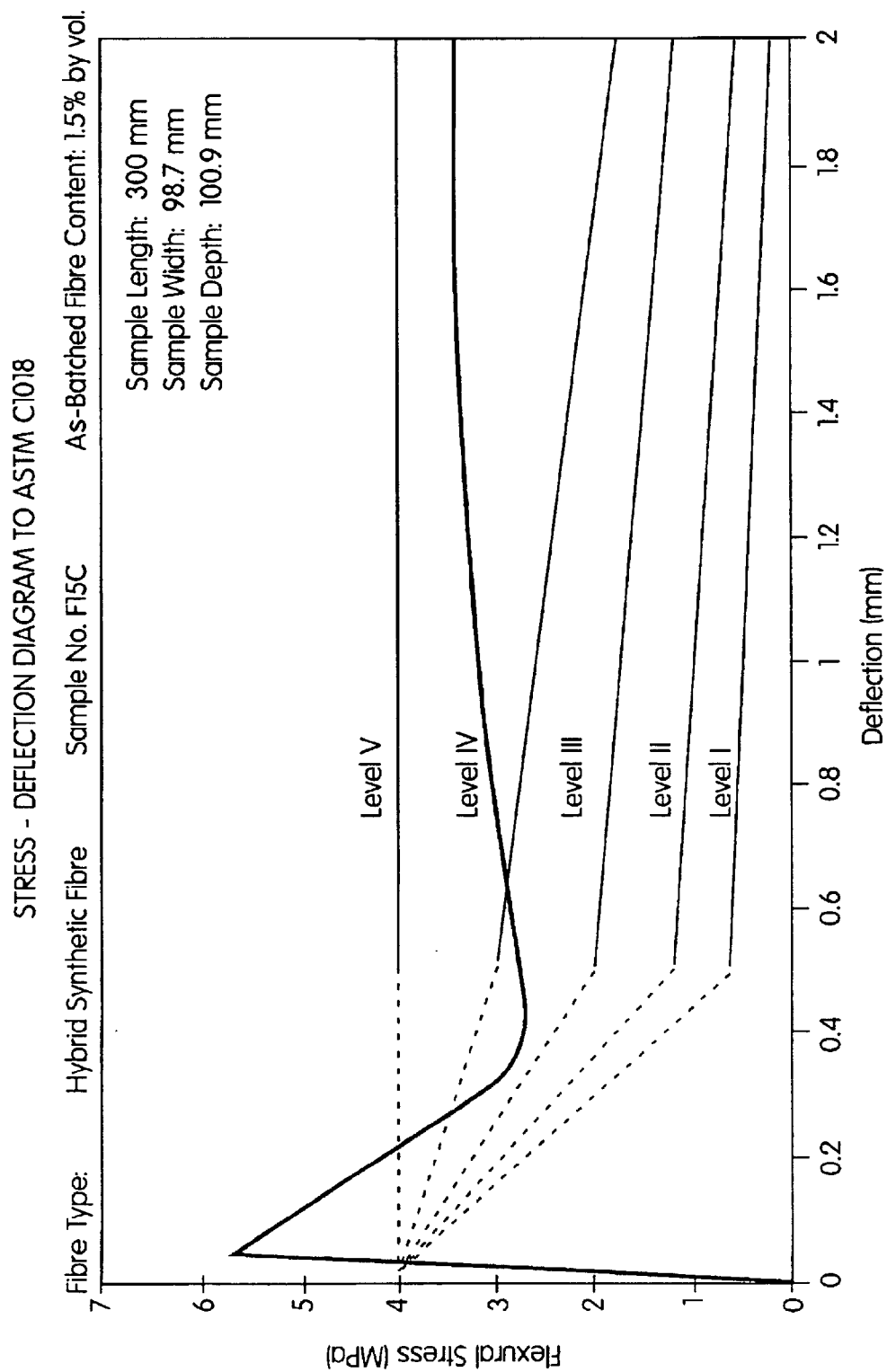
FIG. 22 illustrates a stress-deflection diagram comparing flexural stress versus deflection of the synthetic fiber blends of the present invention at 1.5% by volume.
Figure 23:
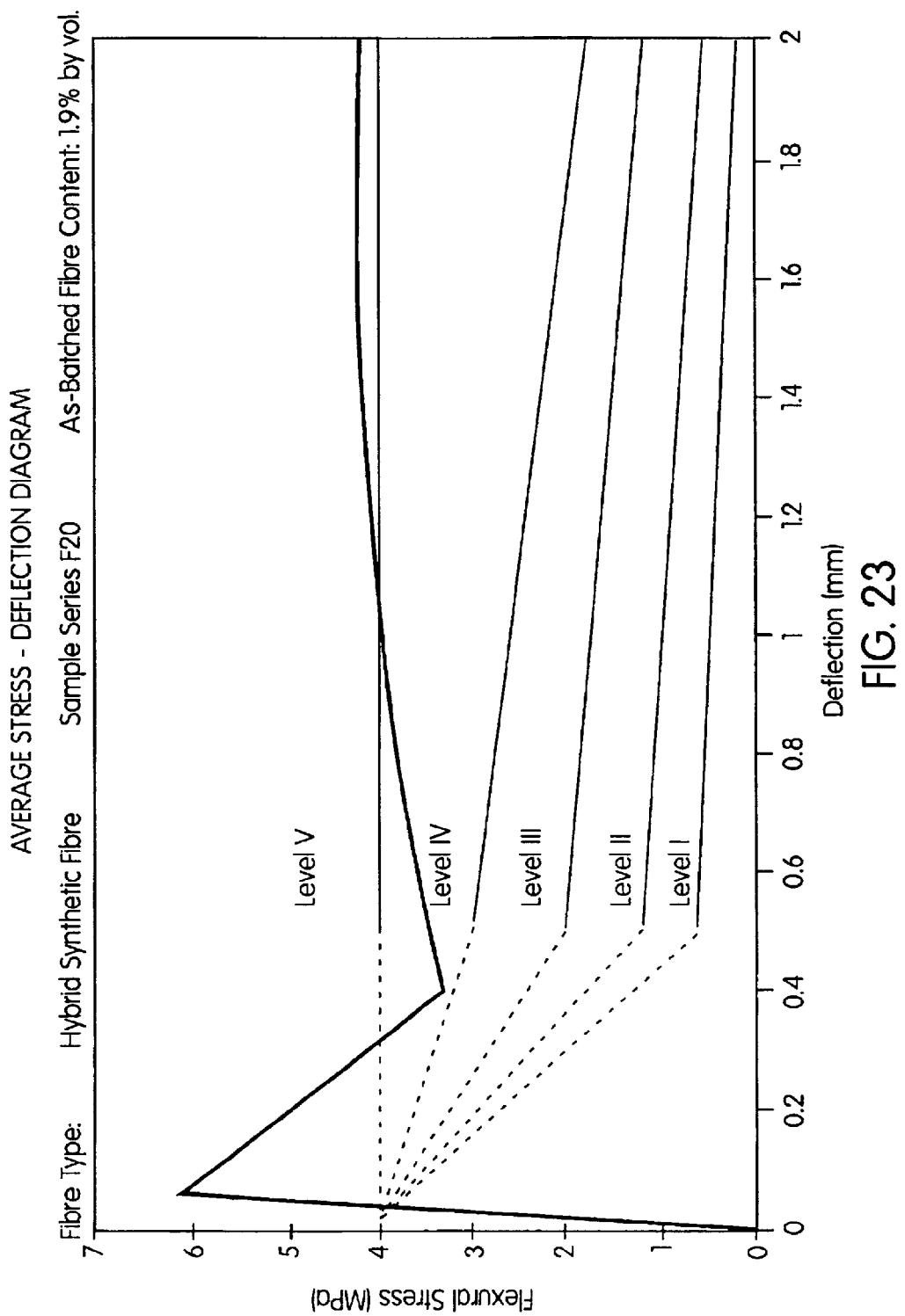
FIG. 23 illustrates a stress-deflection diagram comparing flexural stress versus deflection of the synthetic fiber blends of the present invention at 1.9% by volume.
Figure 24:
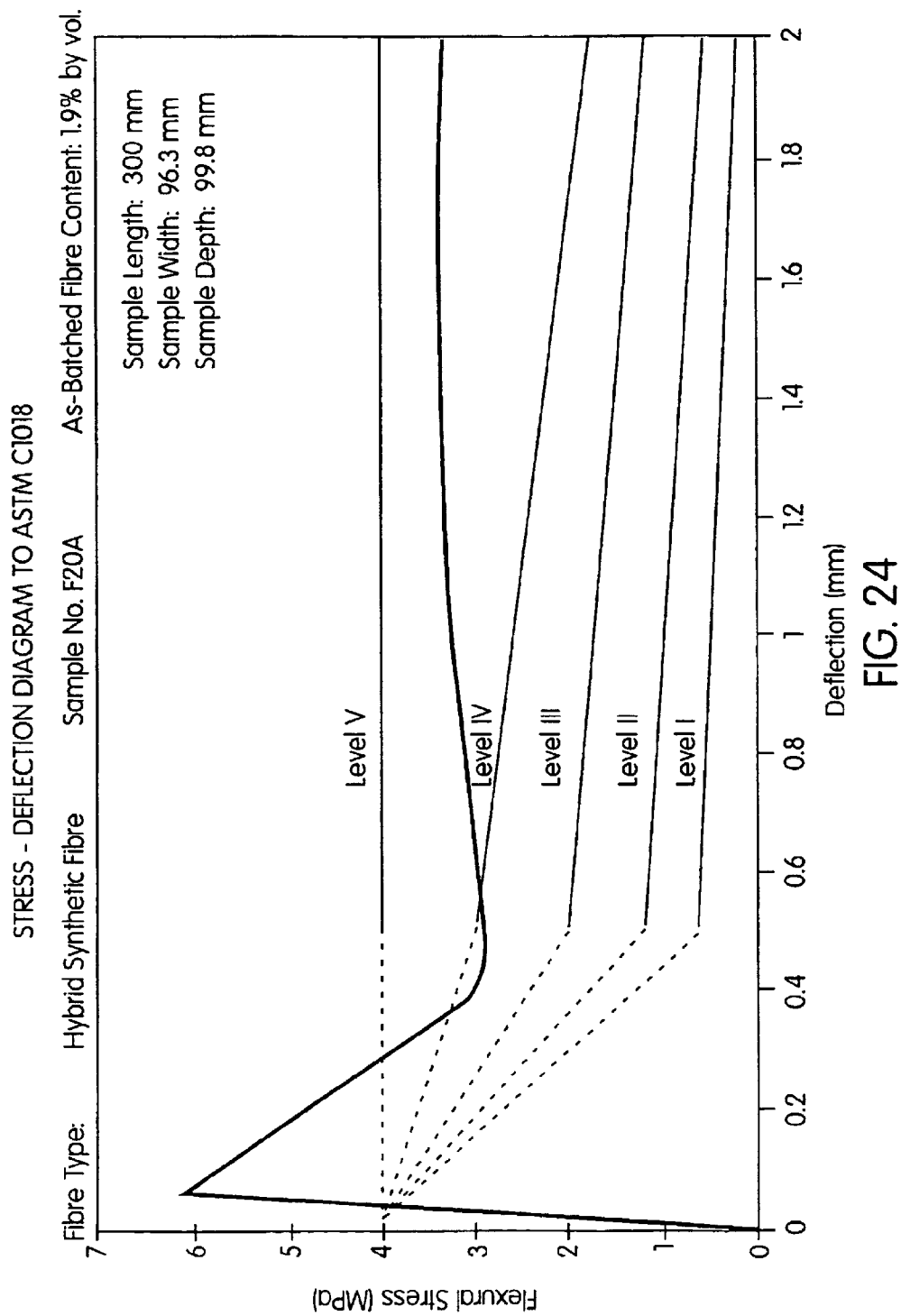
FIG. 24 illustrates a stress-deflection diagram comparing flexural stress versus deflection of the synthetic fiber blends of the present invention at 1.9% by volume.
Figure 25:
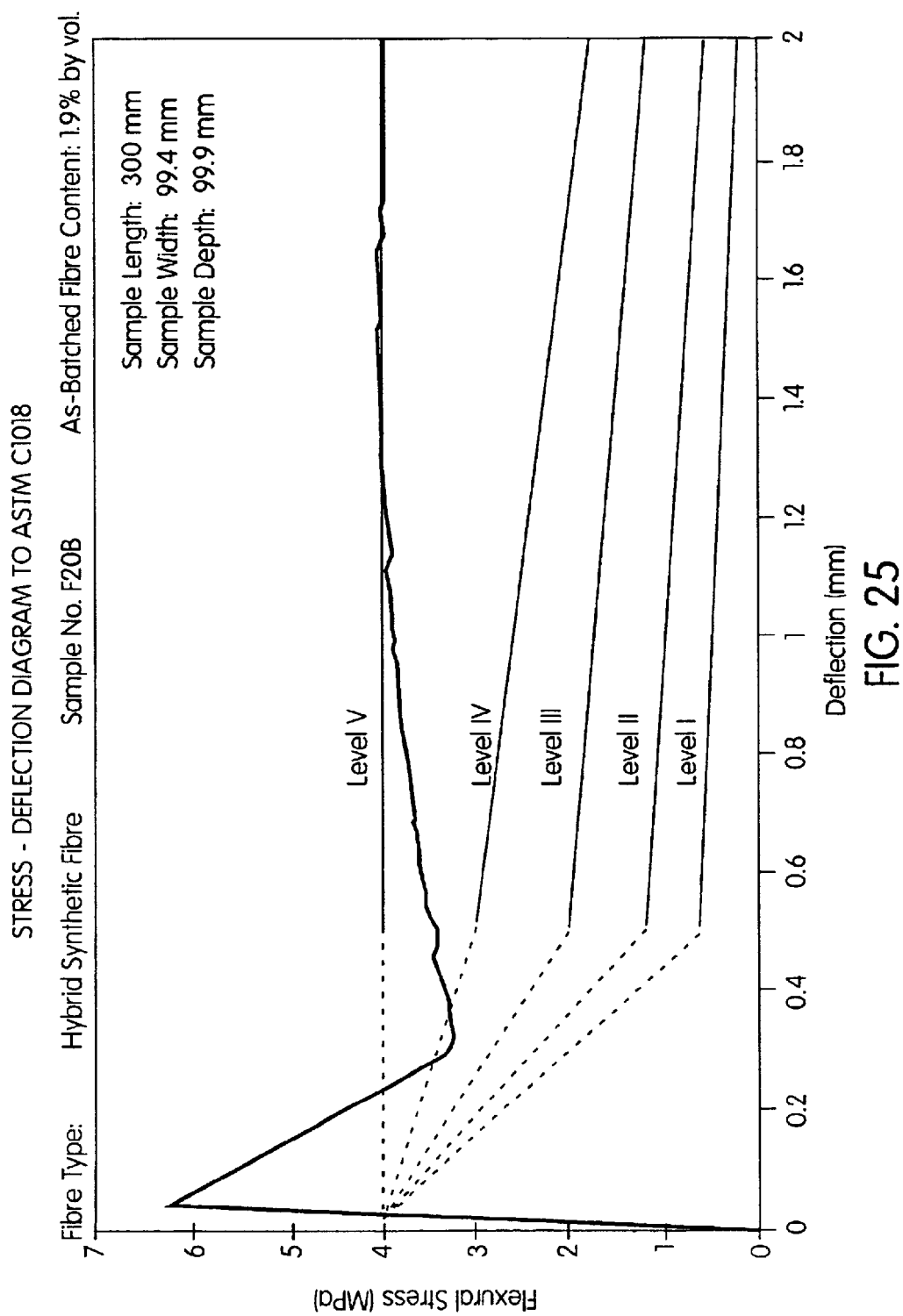
FIG. 25 illustrates a stress-deflection diagram comparing flexural stress versus deflection of the synthetic fiber blends of the present invention at 1.9% by volume.
Figure 26:
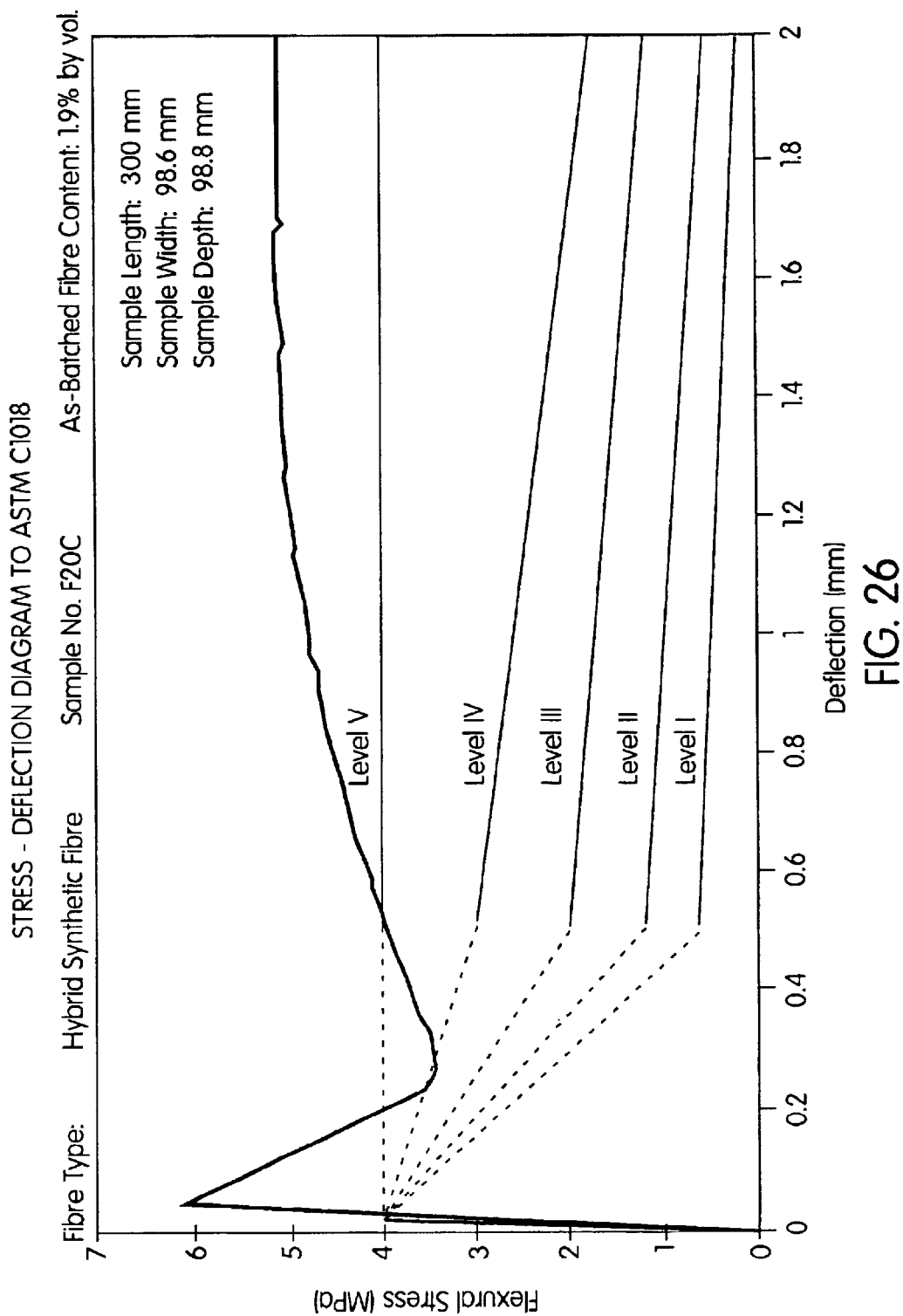
FIG. 26 illustrates a stress-deflection diagram comparing flexural stress versus deflection of the synthetic fiber blends of the present invention at 1.9% by volume.

The drop weight (ACI Committee 544) impact test results are given in Table 10. The number of blows to first crack and final failure versus the fiber content are shown in FIG. 14. Though a relatively simple test, if more specimens are tested, the mean values indicate qualitatively a good index of the impact resistance of the material. Ten specimens were tested for each concrete and the average values are plotted in FIG. 14. The impact resistance increased considerably with an increase in fiber content. It is well known from previous testing that the plain concrete impact resistance will be about ⅙ to ¹⁄₁₅ of that fiber concrete with 0.25 to 2.0 percent by volume.

6. Average Residual Strength

Four beams were tested for fiber content. The average widths and depths of the beams, the loads obtained upon reloading at deflections of 0.5, 0.75, 1.0, and 1.25 mm (0.020, 0.030, 0.040, 0.050 inch), and the average residual strengths (ARS) are given in Table 11. The load-deflection curves obtained by reloading and re-testing the pre-cracked beam (without the steel plate) are given in FIGS. 15–26. The calculated ARS values for all four fiber reinforced concretes are shown in FIG. 7. The test results indicate that the average residual strength increased considerably with an increase in fiber content. The ARS values were 234 psi, 451 psi, 454 psi, and 654 psi for fiber contents of 0.5, 1.0, 1.5, 2.0 percent by volume, respectively. It can be seen that 180 percent increase in ARS was obtained when the fiber content was increased from 0.5 to 2.0 percent by volume.

Since the ARS values are only due to the influence of fiber, irrespective of the compressive strength of the concrete, the ARS values were not normalized. The mixes E1 (with 0.5 percent fiber) and E2 (with 1.0 percent fiber) had compressive strengths of 4960 psi and 4760 psi, respectively, whereas the mixes E3 (with 1.5 percent fiber) and E4 (with 2.0 percent fiber) had lower compressive strengths, 3570 psi and 3860 psi, respectively. Despite these lower compressive strengths, a substantial increase in the ARS values was observed.

Conclusions

The test results discussed above lead to the following conclusions and observations. First, the hybrid fibers of the present invention may be incorporated in concrete up to 2.0 percent by volume without causing any balling, clogging, and segregation. In addition, satisfactory workability was maintained with the addition of four fiber contents at the dosages of 0.5, 1.0, 1.5, and 2.0 percent by volume. Compared to plain concrete, there was a considerable increase in the first crack strength, flexural strength and both ASTM and Japanese toughness values. The first crack strength increased with higher fiber content. Moreover, there was a substantial increase in the impact resistance when the fibers of the present invention are incorporated into concrete when compared to plain concrete. The impact resistance increased with increasing fiber content. Significantly, the impact resistance achieved through the use of the fibers of the present invention was the same or higher than that of the best steel fiber reinforced concrete with the fiber content by volume percentage. In addition, for all fiber reinforced concrete mixtures employing the fiber of the present invention, the mode of failure was changed from a brittle to a ductile failure when subjected to compression or bending. This ductility increased with increasing fiber content. Furthermore, the average residual strengths (ARS) of concrete incorporating the fiber of the present invention, calculated according to the ASTM C 1399 test procedure, was extremely high, which indicated that the fiber was very effective in sustaining the post crack load. The ARS value increased with increases in fiber content. There was an 180 percent increase in the ARS value when the fiber content was increased from 0.5 to 2.0 percent by volume. This increase took place despite a reduction in compressive strength from 4960 psi to 3860 psi. Accordingly, the performance of fiber reinforced concrete mixtures of the present invention were similar or superior than the concrete reinforced with the best steel fibers available in the market compared on an equal weight or cost basis.

TABLE 4

Mix Proportions

| Mix Design. | Water Cement Ratio | Fibers kg (lbs) | Vol % | Cement kg (lbs) | Coarse Agg. kg (lbs) | Fine Agg kg (lbs) | Water kg (lbs) |
|---|---|---|---|---|---|---|---|
| E1 | 0.5 | 0.318 (0.7) | 0.5 | 25.22 (55.6) | 64.86 (143) | 64.86 (143) | 12.61 (27.80) |
| E2 | 0.5 | 0.635 (1.4) | 1.0 | 25.22 (55.6) | 64.86 (143) | 64.86 (143) | 12.61 (27.80) |
| E3 | 0.55 | 0.953 (2.1) | 1.5 | 25.22 (55.6) | 64.86 (143) | 64.86 (143) | 13.88 (30.6) |
| E4 | 0.55 | 1.27 (2.8) | 2.0 | 25.22 (55.6) | 64.86 (143) | 64.86 (143) | 13.88 (30.6) |

TABLE 5

Properties of Fresh Concrete

| Mix Designation | Room Temp (° F.) | Room Humidity | Concrete. Temp. (° F.) | Unit Weight (lb/ft$^3$) | Initial Slump (in) | Air Content (%) |
|---|---|---|---|---|---|---|
| E1 | 65 | 45 | 64.8 | 147.6 | 1.25 | 1.8 |
| E2 | 85 | 35 | 69.1 | 146 | 0.75 | 1.8 |
| E3 | 80 | 45 | 70.9 | 145.2 | 0.40 | 1.4 |
| E4 | 85 | 40 | 73.2 | 145.2 | 0.25 | 1.4 |

SI Unit Conversion
1 in = 25.4 mm
° F. = 5/9 (° F.-32)° C.
ft$^3$ = 0.02832 m$^3$
lb/ft$^3$ = 16.02 kg/m$^3$

TABLE 6

Cylinder Compressive Strength and Static Modulus

| Specimen ID | Age (Days) | Diameter (in.) | Length (in.) | Unit weight (lb/ft$^3$) | Static modulus (10$^6$ psi) | Comp. strength (psi) |
|---|---|---|---|---|---|---|
| E1-1 | 14 | 5.995 | 12.042 | 149 | 3.90 | 5225 |
| E1-2 | 14 | 6.025 | 11.958 | 150 | 3.86 | 4770 |
| E1-3 | 14 | 6.001 | 12.083 | 151 | 3.89 | 4880 |
| Average | | | | 150 | 3.88 | 4960 |
| Std. Dev | | | | 1.00 | 0.02 | 237 |
| % C. V | | | | 0.67 | 0.54 | 4.79 |
| E2-1 | 14 | 6.078 | 12.083 | 146 | 3.79 | 4640 |
| E2-2 | 14 | 5.989 | 12.167 | 150 | 3.90 | 4950 |
| E2-3 | 14 | 6.000 | 12.083 | 149 | 3.89 | 4685 |
| Average | | | | 148 | 3.86 | 4760 |
| Std. Dev | | | | 2.08 | 0.06 | 168 |
| % C. V | | | | 1.40 | 1.58 | 3.52 |
| E3-1 | 14 | 6.012 | 12.167 | 147 | 3.87 | 3435 |
| E3-2 | 14 | 6.000 | 12.000 | 148 | 3.89 | 3820 |
| E3-3 | 14 | 5.967 | 12.083 | 149 | 3.28 | 3450 |
| Average | | | | 148 | 3.68 | 3570 |
| Std. Dev | | | | 1.00 | 0.35 | 218 |
| % C. V | | | | 0.68 | 9.42 | 6.11 |
| E4-1 | 14 | 5.973 | 12.083 | 147 | 3.27 | 3785 |
| E4-2 | 14 | 6.006 | 12.042 | 147 | 3.24 | 3850 |
| E4-3 | 14 | 5.991 | 12.083 | 146 | 3.25 | 3940 |
| Average | | | | 147 | 3.25 | 3860 |
| Std. Dev | | | | 0.58 | 0.02 | 78 |
| % C. V | | | | 0.39 | 0.47 | 2.02 |

SI Unit Conversion Factors
1 inch = 25.4 mm
1 lb = 0.4536 kg
1 psi = 703 kg/m$^2$
lb/ft$^3$ = 16.02 kg/m$^3$

TABLE 7

FIRST CRACK STRENGTH AND MAXIMUM FLEXURAL STRENGTH 14 DAYS

| Mixture Type | Specimen # | Age (Days) | First Crack Load (lbs) | First Crack Stress (psi) | Maximum Load (lbs) | Flexural Strength (psi) |
|---|---|---|---|---|---|---|
| E1 | E1-1 | 14 | 3500 | 623 | 3600 | 641 |
|    | E1-2 | 14 | 3000 | 527 | 3598 | 632 |
|    | E1-3 | 14 | 3000 | 545 | 3522 | 640 |
|    | E1-4 | 14 | 3000 | 509 | 3885 | 659 |
|    | Average |  |  | 551 |  | 643 |
| E2 | E2-1 | 14 | 3062 | 589 | 3267 | 628 |
|    | E2-2 | 14 | 3573 | 612 | 3840 | 658 |
|    | E2-3 | 14 | 3573 | 629 | 3915 | 689 |
|    | E2-4 | 14 | 3573 | 648 | 3628 | 658 |
|    | Average |  |  | 619 |  | 658 |
| E3 | E3-1 | 14 | 2947 | 504 | 3438 | 588 |
|    | E3-2 | 14 | 3536 | 626 | 4078 | 722 |
|    | E3-3 | 14 | 4125 | 677 | 4427 | 726 |
|    | E3-4 | 14 | 4715 | 804 | 4938 | 842 |
|    | Average |  |  | 653 |  | 720 |
| E4 | E4-1 | 14 | 3967 | 679 | 4203 | 719 |
|    | E4-2 | 14 | 3401 | 593 | 3838 | 670 |
|    | E4-3 | 14 | 3967 | 698 | 4529 | 797 |
|    | E4-4 | 14 | 3967 | 703 | 4178 | 740 |
|    | Average |  |  | 668 |  | 731 |

SI Unit Conversion Factors
1 inch = 25.4 mm
1 lb = 0.4536 kg
1 psi = 703 kg/m$^2$

TABLE 8

ASTM - TOUGHNESS INDICES - 14 DAYS

| Mixture Type | Specimen # | First Crack Toughness (inch-lbs) | Toughness I5 | Toughness I10 | Toughness I20 | Toughness I30 | Toughness Ratios I10/I5 | Toughness Ratios I20/I10 | Toughness Ratios I30/I20 | Residual Strength Indices $R_{5,10}$ | Residual Strength Indices $R_{10,20}$ |
|---|---|---|---|---|---|---|---|---|---|---|---|
| E1 | E1-1 | 0.8 | 3.66 | 6.83 | 12.67 | 17.84 | 1.9 | 1.9 | 1.4 | 63.4 | 58.4 |
|    | E1-2 | 1.0 | 3.29 | 6.07 | 11.10 | 15.45 | 1.8 | 1.8 | 1.4 | 55.6 | 50.3 |
|    | E1-3 | 1.3 | 4.57 | 8.67 | 15.68 | 21.11 | 1.945 | 1.8 | 1.3 | 82.0 | 70.1 |
|    | E1-4 | 1.0 | 4.36 | 7.89 | 12.75 | 16.77 | 1.8 | 1.6 | 1.3 | 70.6 | 48.6 |
|    | Average | 1.0 | 3.97 | 7.37 | 13.05 | 17.79 | 1.9 | 1.8 | 1.4 | 67.9 | 56.9 |
| E2 | E2-1 | 0.9 | 3.4 | 6.0 | 10.8 | 16.0 | 1.7 | 1.8 | 1.5 | 50.6 | 48.7 |
|    | E2-2 | 1.5 | 3.8 | 6.8 | 11.4 | 15.7 | 1.8 | 1.7 | 1.4 | 61.0 | 45.8 |
|    | E2-3 | 0.9 | 3.3 | 6.0 | 10.3 | 13.5 | 1.8 | 1.7 | 1.3 | 52.8 | 43.1 |
|    | E2-4 | 0.9 | 3.3 | 6.0 | 10.6 | 14.1 | 1.8 | 1.8 | 1.3 | 53.8 | 45.6 |
|    | Average | 1.0 | 3.5 | 6.2 | 10.8 | 14.8 | 1.8 | 1.7 | 1.4 | 54.6 | 45.8 |
| E3 | E3-1 | 0.7 | 3.7 | 7.1 | 14.1 | 21.4 | 1.9 | 2.0 | 1.5 | 68.0 | 70.2 |
|    | E3-2 | 0.7 | 4.0 | 7.6 | 14.6 | 21.2 | 1.955 | 1.9 | 1.5 | 72.4 | 69.5 |
|    | E3-3 | 0.8 | 4.1 | 7.8 | 15.2 | 21.7 | 1.9 | 1.9 | 1.4 | 75.6 | 74.0 |
|    | E3-4 | 2.1 | 4.3 | 7.8 | 14.8 | 22.3 | 1.8 | 1.9 | 1.5 | 71.8 | 69.7 |
|    | Average | 1.1 | 4.0 | 7.6 | 14.7 | 21.6 | 1.9 | 1.9 | 1.5 | 72.0 | 70.9 |
| E4 | E4-1 | 1.2 | 3.6 | 6.6 | 11.8 | 17.1 | 1.8 | 1.8 | 1.4 | 59.6 | 52.3 |
|    | E4-2 | 1.1 | 4.2 | 7.9 | 14.7 | 20.4 | 1.9 | 1.9 | 1.4 | 75.0 | 67.6 |
|    | E4-3 | 2.6 | 3.4 | 6.4 | 12.5 | 18.5 | 1.9 | 1.9 | 1.5 | 60.2 | 60.5 |
|    | E4-4 | 1.3 | 4.7 | 9.3 | 18.4 | 27.1 | 2.0 | 2.0 | 1.5 | 91.8 | 90.6 |
|    | Average | 1.5 | 4.0 | 7.6 | 14.3 | 20.8 | 1.9 | 1.9 | 1.5 | 71.7 | 67.8 |

Conversion Factor: 1 in-lb = 0.113KN.m

TABLE 9

JAPANESE STANDARD - TOUGHNESS & EQUIVALENT FLEXURAL STRENGTH - 14 DAYS

| Mixture Type | Specimen # | Age (Days) | Toughness (inch-lbs) | Equivalent Flexural Strength (psi) |
|---|---|---|---|---|
| E1 | E1-1 | 14.0 | 93.5 | 219 |
|  | E1-2 | 14.0 | 101.1 | 226 |
|  | E1-3 | 14.0 | 99.7 | 226 |
|  | E1-4 | 14.0 | 137.5 | 304 |
|  | Average |  | 107.9 | 244 |
| E2 | E2-1 | 14.0 | 177.2 | 428 |
|  | E2-2 | 14.0 | 202.1 | 434 |
|  | E2-3 | 14.0 | 154.6 | 343 |
|  | E2-4 | 14.0 | 164.3 | 377 |
|  | Average |  | 174.6 | 395 |
| E3 | E3-1 | 14.0 | 250.3 | 542 |
|  | E3-2 | 14.0 | 240.1 | 523 |
|  | E3-3 | 14.0 | 320.7 | 657 |
|  | E3-4 | 14.0 | 368.6 | 776 |
|  | Average |  | 294.9 | 624 |
| E4 | E4-1 | 14.0 | 290.2 | 642 |
|  | E4-2 | 14.0 | 213.9* | 482* |
|  | E4-3 | 14.0 | 331.5 | 744 |
|  | E4-4 | 14.0 | 290.5 | 651 |
|  | Average |  | 304.1 | 679 |

*Omitted as outlier
Conversion Factors:
1 MPa = 145 psi
1 in-lb = 0.113 Nm

TABLE 10

IMPACT TEST RESULTS - 14 DAYS

| Mixture Type | Age (Days) | Specimen # | Number of Blows to First Crack | Number of Blows to Failure | Difference in no. of blows from first crack to failure |
|---|---|---|---|---|---|
| E1 | 14 | E1-1 | 48 | 201 | 153 |
|  | 14 | E1-2 | 106 | 192 | 86 |
|  | 14 | E1-3 | 177 | 246 | 69 |
|  | 14 | E1-4 | 189 | 270 | 81 |
|  | 14 | E1-5 | 20 | 112 | 92 |
|  | 14 | E1-6 | 107 | 211 | 104 |
|  | 14 | E1-7 | 23 | 127 | 104 |
|  | 14 | E1-8 | 58 | 195 | 137 |
|  | 14 | E1-9 | 51 | 186 | 135 |
|  | 14 | E1-10 | 62 | 193 | 131 |
|  |  | Average | 84 | 193 | 109 |
| E2 | 14 | E2-1 | 54 | 289 | 235 |
|  | 14 | E2-2 | 58 | 337 | 279 |
|  | 14 | E2-3 | 95 | 410 | 315 |
|  | 14 | E2-4 | 110 | 405 | 295 |
|  | 14 | E2-5 | 99 | 442 | 343 |
|  | 14 | E2-6 | 105 | 433 | 328 |
|  | 14 | E2-7 | 110 | 428 | 318 |
|  | 14 | E2-8 | 130 | 413 | 283 |
|  | 14 | E2-9 | 113 | 429 | 316 |
|  | 14 | E2-10 | 115 | 450 | 335 |
|  |  | Average | 99 | 404 | 305 |
| E3 | 14 | E3-1 | 43 | 192 | 149 |
|  | 14 | E3-2 | 125 | 374 | 249 |
|  | 14 | E3-3 | 84 | 282 | 198 |
|  | 14 | E3-4 | 123 | 632 | 509 |
|  | 14 | E3-5 | 110 | 370 | 260 |
|  | 14 | E3-6 | 58 | 210 | 152 |
|  | 14 | E3-7 | 115 | 390 | 275 |
|  | 14 | E3-8 | 105 | 350 | 245 |
|  | 14 | E3-9 | 95 | 380 | 285 |
|  | 14 | E3-10 | 80 | 330 | 250 |
|  |  | Average | 94 | 351 | 257 |
| E4 | 14 | E4-1 | 210 | 484 | 274 |
|  | 14 | E4-2 | 190 | 460 | 270 |
|  | 14 | E4-3 | 170 | 425 | 255 |
|  | 14 | E4-4 | 260 | 495 | 235 |
|  | 14 | E4-5 | 288 | 505 | 217 |
|  | 14 | E4-6 | 240 | 489 | 249 |
|  | 14 | E4-7 | 180 | 435 | 255 |
|  | 14 | E4-8 | 205 | 455 | 250 |
|  | 14 | E4-9 | 236 | 482 | 246 |
|  | 14 | E4-10 | 185 | 410 | 225 |
|  |  | Average | 216 | 464 | 248 |

TABLE 11

AVERAGE RESIDUAL STRENGTH (ARS)

| Mixture Type | Age (Days) | Specimen # | Load in lbs at Deflection 0.02 in | 0.03 in | 0.04 in | 0.05 in | Breadth (in) | Depth (in) | ARS (psi) |
|---|---|---|---|---|---|---|---|---|---|
| E1 | 14 | E1-5 | — | — | — | — | — | — | — |
|  | 14 | E1-6 | 1002 | 997 | 975 | 921 | 4.225 | 4.098 | 165 |
|  | 14 | E1-7 | 1502 | 1558 | 1592 | 1592 | 4.175 | 4.055 | 273 |
|  | 14 | E1-8 | 1521 | 1525 | 1510 | 1472 | 4.167 | 4.056 | 264 |
|  | Average |  |  |  |  |  |  |  | 234 |
| E2 | 14 | E2-5 | 2522 | 2617 | 2598 | 2507 | 4.238 | 4.043 | 444 |
|  | 14 | E2-6 | 2637 | 2707 | 2685 | 2650 | 4.201 | 4.031 | 469 |
|  | 14 | E2-7 | 3322 | 3490 | 3522 | 3496 | 4.353 | 4.130 | 559 |
|  | 14 | E2-8 | 2012 | 2044 | 2059 | 1992 | 4.282 | 4.142 | 331 |
|  | Average |  |  |  |  |  |  |  | 451 |
| E3 | 14 | E3-5 | 1868 | 1929 | 1969 | 1979 | 4.292 | 3.881 | 359 |
|  | 14 | E3-6 | 2781 | 2958 | 3147 | 3238 | 4.196 | 3.959 | 553 |
|  | 14 | E3-7 | 2435 | 2399 | 2428 | 2412 | 4.204 | 4.008 | 430 |

TABLE 11-continued

AVERAGE RESIDUAL STRENGTH (ARS)

| Mixture Type | Age (Days) | Specimen # | Load in lbs at Deflection 0.02 in | 0.03 in | 0.04 in | 0.05 in | Breadth (in) | Depth (in) | ARS (psi) |
|---|---|---|---|---|---|---|---|---|---|
| | 14 | E3-8 | 2485 | 2601 | 2764 | 2827 | 4.233 | 3.996 | 474 |
| | | Average | | | | | | | 454 |
| E4 | 14 | E4-5 | 2817 | 3249 | 3356 | 3377 | 4.293 | 4.161 | 517 |
| | 14 | E4-6 | 4215 | 4709 | 4790 | 4734 | 4.333 | 4.082 | 767 |
| | 14 | E4-7 | 4225 | 4818 | 4904 | 4905 | 4.312 | 4.086 | 786 |
| | 14 | E4-8 | 3398 | 2999 | 3253 | 3247 | 4.287 | 4.064 | 546 |
| | | Average | | | | | | | 654 |

SI Unit Conversion Factors
1 inch = 25.4 mm
1 lb = 0.4536 kg
1 psi = 703 kg/m$^2$ The foregoing examples demonstrate that the hybrid fibers of the present invention when used in building material, such as cementitious material, perform as well or better than many or all prior art reinforcement fibers, including steel reinforcement fibers. Further, the foregoing experiments demonstrate that relatively small concentrations of fiber will support substantially improved results. These observations are both surprising and unexpected.

The synthetic fiber reinforced material of the present invention, and the method by which it formed may be used to form a building material formed of, for example cementitious material, that exhibits reduced permeability, increased fatigue strength, improved toughness, and reduced plastic shrinkage.

Although the foregoing description has necessarily presented a limited number of embodiments of the invention, those of ordinary skill in the relevant art will appreciate that various changes in the configurations, compositions, details, materials, and arrangement of the elements that have been herein described and illustrated in order to explain the nature of the invention may be made by those skilled in the art, and all such modifications will remain within the principle and scope of the invention as expressed herein in the appended claims. In addition, although the foregoing detailed description has been directed to an embodiment of reinforcement fiber incorporated into cementitious material, such as concrete, it will be understood that the present invention has broader applicability and, for example, may be used in connection with all building materials that may incorporate suitable reinforcement fibers. All such additional applications of the invention remain within the principle and scope of the invention as embodied in the appended claims.

What is claimed is:

1. A synthetic fiber blend for use as reinforcement for cementitious material, comprising:
   a first fiber component formed of a homopolymer polypropylene fiber wherein the first fiber component is fibrillated; and a second fiber component being discrete from the first fiber component and being a copolymer formed of a polypropylene and a high density polyethylene, the second fiber component being a plurality of monofilaments twisted to form a non-interconnected bundle.

2. The synthetic fiber blend of claim 1, wherein the first fiber component is present in the synthetic fiber blend in amounts ranging from about 5 to about 50 by total weight percent.

3. The synthetic fiber blend of claim 1, wherein the first fiber component is present in the synthetic fiber blend in about 6.7 percent by total weight percent.

4. The synthetic fiber blend of claim 1, wherein the first fiber component is about 100 to about 20,000 denier per filament.

5. The synthetic fiber blend of claim 1, wherein the second fiber component is present in the synthetic fiber blend in amounts ranging from about 50 to about 95 by total weight percent.

6. The synthetic fiber blend of claim 1, wherein the second fiber component is present in the synthetic fiber blend in about 93.3 percent by total weight percent.

7. The synthetic fiber blend of claim 1, wherein the second fiber component is made of one or more nonfibrillating monofilaments of about 350 to about 6000 denier per filament.

8. The synthetic fiber blend of claim 1, wherein the first fiber component has a fiber length of about 19 to about 60 mm and the second fiber component has a fiber length of about 19 to about 60 mm.

9. The synthetic blend of claim 1, wherein the first fiber component and the second fiber component are blended in the absence of a wetting agent.

10. The synthetic blend of claim 1, wherein the monofilaments of the second fiber component, in the absence of a wetting agent, are twisted.

11. The synthetic fiber blend of claim 8, wherein the first fiber component and the second fiber component have about the same fiber length.

12. A synthetic fiber blend for use as reinforcement for cementitious material, comprising:
   a first fiber component formed of a homopolymer polypropylene fiber wherein the first fiber component is fibrillated; and a second fiber component being discrete from the first fiber component and being a copolymer formed of a polypropylene and a high density polyethylene, the second fiber component being a plurality of monofilaments twisted to form a non-interconnected bundle,
   the first fiber component being present in the synthetic fiber blend in amounts ranging from about 5 to about 50 by total weight percent, and the second fiber component being present in the synthetic fiber blend in amounts ranging from about 50 to about 95 by total weight percent.

13. The synthetic fiber blend of claim 12, wherein the first fiber component is about 100 to about 20,000 denier per filament, and the second fiber component is about 350 to about 6000 denier per filament.

14. The synthetic fiber blend of claim 12, wherein the first fiber component is a fibrillated fiber having a fiber length of about 19 to about 60 mm and the second fiber component is in the form of nonfibrillating monofilaments having a fiber length of about 19 to about 60 mm.

15. The synthetic fiber blend of claim 12, wherein the first fiber component is present in the synthetic blend in about 6.7 total weight percent and second fiber component is present in the synthetic fiber blend in about 93.3 percent by total weight percent.

16. The synthetic fiber blend of claim 12 wherein the second fiber is formed of about 70 to 80 percent by weight polypropylene and about 20 to 30 percent by weight high density polyethylene.

17. The synthetic blend of claim 12, wherein the first fiber component and the second fiber component are blended in the absence of a wetting agent.

18. The synthetic blend of claim 12, wherein the monofilaments of the second fiber component, in the absence of a wetting agent, are twisted.

19. A synthetic fiber blend for use as reinforcement for cementitious material, comprising:

a first fiber component formed of a homopolymer material wherein the first fiber component is fibrillated; and a second fiber component being discrete from the first fiber component and being a copolymer formed of a polypropylene and a high density polyethylene, the second fiber component being a plurality of monofilaments twisted to form a non-interconnected bundle.

20. The synthetic blend of claim 19, wherein the first fiber component is added to the synthetic blend in amounts ranging from about 5 to about 50 weight percent, and the second fiber component is added to the synthetic blend in amounts ranging from about 95 weight percent.

21. The synthetic blend of claim 19, wherein the second fiber component is twisted to form the non-interconnected bundle in the absence of a wetting agent.

22. A synthetic fiber blend for use as reinforcement for cementitious material, comprising:

a first fiber component formed from a homopolymer of polypropylene and composed of fibers in fibrillated form; and a second fiber component, discrete from the first fiber component, formed from a copolymer of polypropylene and high density polyethylene, and composed of bundles of monofilaments that have been twisted.

* * * * *

UNITED STATES PATENT AND TRADEMARK OFFICE
CERTIFICATE OF CORRECTION

| | |
|---|---|
| PATENT NO. | : 6,753,081 B1 |
| APPLICATION NO. | : 09/790353 |
| DATED | : June 22, 2004 |
| INVENTOR(S) | : Lovett et al. |

It is certified that error appears in the above-identified patent and that said Letters Patent is hereby corrected as shown below:

Title Page #56 - Under U.S. Patent Documents, Patent No. 3,591,395, remove "Zonsveid" and replace with --Zonsveld--.

Column 2, line 60, remove "nonlibrillating" and replace with --nonfibrillating--.

Column 3, line 49, remove "rack" and replace with --crack--.

Column 28, line 63, remove "Reinfoiced" and replace with --Reinforced--.

Column 43, line 5, remove "crick" and replace with --crack--.

Signed and Sealed this

Fifth Day of December, 2006

JON W. DUDAS
*Director of the United States Patent and Trademark Office*